(12) United States Patent
Durham et al.

(10) Patent No.: US 11,575,504 B2
(45) Date of Patent: Feb. 7, 2023

(54) CRYPTOGRAPHIC COMPUTING ENGINE FOR MEMORY LOAD AND STORE UNITS OF A MICROARCHITECTURE PIPELINE

(71) Applicant: Intel Corporation, Santa Clara, CA (US)

(72) Inventors: David M. Durham, Beaverton, OR (US); Michael LeMay, Hillsboro, OR (US); Michael E. Kounavis, Portland, OR (US); Santosh Ghosh, Hillsboro, OR (US); Sergej Deutsch, Hillsboro, OR (US); Anant Vithal Nori, Bangalore (IN); Jayesh Gaur, Bangalore (IN); Sreenivas Subramoney, Bangalore (IN); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 16/776,467

(22) Filed: Jan. 29, 2020

(65) Prior Publication Data

US 2020/0169383 A1    May 28, 2020

Related U.S. Application Data

(63) Continuation-in-part of application No. 16/722,342, filed on Dec. 20, 2019.
(Continued)

(51) Int. Cl.
*H04L 9/06* (2006.01)
*G06F 9/30* (2018.01)
*G06F 12/1027* (2016.01)

(52) U.S. Cl.
CPC ........ *H04L 9/0631* (2013.01); *G06F 9/30043* (2013.01); *G06F 12/1027* (2013.01); *G06F 2212/681* (2013.01)

(58) Field of Classification Search
CPC .............. H04L 9/0631; G06F 9/30043; G06F 12/1027
See application file for complete search history.

(56) References Cited

U.S. PATENT DOCUMENTS

| 6,570,989 B1 | 5/2003 | Ohmori et al. |
| 7,043,016 B2 | 5/2006 | Roelse |

(Continued)

FOREIGN PATENT DOCUMENTS

| DE | 102018125786 A1 | 5/2019 |
| EP | 2073430 A1 | 6/2009 |

(Continued)

OTHER PUBLICATIONS

USPTO Non-Final Office Action in U.S Appl. No. 16/723,977 dated Aug. 3, 2021 (37 pages).
(Continued)

*Primary Examiner* — Matthew T Henning
(74) *Attorney, Agent, or Firm* — Alliance IP, LLC

(57) ABSTRACT

A processor comprises a first register to store an encoded pointer to a memory location. First context information is stored in first bits of the encoded pointer and a slice of a linear address of the memory location is stored in second bits of the encoded pointer. The processor also includes circuitry to execute a memory access instruction to obtain a physical address of the memory location, access encrypted data at the memory location, derive a first tweak based at least in part on the encoded pointer, and generate a keystream based on the first tweak and a key. The circuitry is to further execute the memory access instruction to store state information associated with memory access instruction in a first buffer,
(Continued)

and to decrypt the encrypted data based on the keystream. The keystream is to be generated at least partly in parallel with accessing the encrypted data.

25 Claims, 29 Drawing Sheets

Related U.S. Application Data

(60) Provisional application No. 62/868,884, filed on Jun. 29, 2019.

(56) References Cited

U.S. PATENT DOCUMENTS

| | | | |
|---|---|---|---|
| 7,254,718 B2 | 8/2007 | Kaminaga et al. | |
| 7,907,723 B2 | 3/2011 | Rubin | |
| 8,085,934 B1 | 12/2011 | Bhooma | |
| 8,675,868 B1 | 3/2014 | Yearsley et al. | |
| 8,798,263 B2 | 8/2014 | Pasini et al. | |
| 9,213,653 B2 | 12/2015 | Durham et al. | |
| 9,350,534 B1 | 5/2016 | Poo et al. | |
| 9,436,847 B2 | 9/2016 | Durham et al. | |
| 9,514,285 B2 | 12/2016 | Durham et al. | |
| 9,811,661 B1 | 11/2017 | Golovkin et al. | |
| 9,830,162 B2 | 11/2017 | LeMay | |
| 9,990,249 B2 | 6/2018 | Durham et al. | |
| 10,216,522 B2 | 2/2019 | LeMay | |
| 10,387,305 B2 | 8/2019 | Durham et al. | |
| 10,536,266 B2 | 1/2020 | Courtney | |
| 10,585,809 B2 | 3/2020 | Durham et al. | |
| 10,706,164 B2 | 7/2020 | LeMay et al. | |
| 10,769,272 B2 | 9/2020 | Durham et al. | |
| 10,860,709 B2 | 12/2020 | LeMay et al. | |
| 2002/0094081 A1* | 7/2002 | Medvinsky | H04L 9/12 380/44 |
| 2003/0091185 A1 | 5/2003 | Swindlehurst et al. | |
| 2003/0101362 A1 | 5/2003 | Dia | |
| 2003/0126349 A1 | 7/2003 | Nalawadi et al. | |
| 2003/0149869 A1 | 8/2003 | Gleichauf | |
| 2004/0123288 A1 | 6/2004 | Bennett et al. | |
| 2004/0215895 A1 | 10/2004 | Cypher | |
| 2004/0268057 A1 | 12/2004 | Landin et al. | |
| 2007/0152854 A1 | 7/2007 | Copley | |
| 2007/0201691 A1* | 8/2007 | Kumagaya | G11B 20/00449 380/30 |
| 2008/0080708 A1 | 4/2008 | McAlister et al. | |
| 2008/0130895 A1 | 6/2008 | Jueneman et al. | |
| 2008/0263117 A1 | 10/2008 | Rose et al. | |
| 2009/0172393 A1 | 7/2009 | Tanik et al. | |
| 2009/0220071 A1 | 9/2009 | Gueron et al. | |
| 2009/0254774 A1 | 10/2009 | Chamdani et al. | |
| 2010/0023707 A1 | 1/2010 | Hohmuth et al. | |
| 2011/0099429 A1 | 4/2011 | Varma et al. | |
| 2011/0161680 A1 | 6/2011 | Grube et al. | |
| 2011/0296202 A1 | 12/2011 | Henry et al. | |
| 2012/0163453 A1 | 6/2012 | Horowitz | |
| 2012/0284461 A1 | 11/2012 | Larin et al. | |
| 2013/0275766 A1 | 10/2013 | Plainecassagne et al. | |
| 2014/0173293 A1 | 6/2014 | Kaplan | |
| 2014/0270159 A1 | 9/2014 | Youn et al. | |
| 2015/0234728 A1 | 8/2015 | Coleman et al. | |
| 2015/0244518 A1 | 8/2015 | Koo et al. | |
| 2015/0378941 A1 | 12/2015 | Rozas et al. | |
| 2016/0056954 A1 | 2/2016 | Lee et al. | |
| 2016/0092702 A1 | 3/2016 | Durham et al. | |
| 2016/0094552 A1 | 3/2016 | Durham et al. | |
| 2016/0104009 A1 | 4/2016 | Henry et al. | |
| 2016/0154963 A1 | 6/2016 | Kumar et al. | |
| 2016/0188889 A1 | 6/2016 | Trivedi et al. | |
| 2016/0285892 A1 | 9/2016 | Kishinevsky et al. | |
| 2016/0364707 A1 | 12/2016 | Varma | |
| 2017/0063532 A1 | 3/2017 | Bhattacharyya et al. | |
| 2017/0285976 A1 | 10/2017 | Durham et al. | |
| 2018/0095812 A1 | 4/2018 | Deutsch et al. | |
| 2018/0095906 A1 | 4/2018 | Doshi et al. | |
| 2018/0109508 A1 | 4/2018 | Wall et al. | |
| 2018/0287785 A1 | 10/2018 | Pfannenschmidt et al. | |
| 2018/0365069 A1 | 12/2018 | Nemiroff et al. | |
| 2019/0026236 A1 | 1/2019 | Barnes | |
| 2019/0042369 A1 | 2/2019 | Deutsch et al. | |
| 2019/0042481 A1 | 2/2019 | Feghali et al. | |
| 2019/0042734 A1 | 2/2019 | Kounavis et al. | |
| 2019/0042766 A1 | 2/2019 | Pappachan et al. | |
| 2019/0042796 A1 | 2/2019 | Bokern et al. | |
| 2019/0042799 A1 | 2/2019 | Durham et al. | |
| 2019/0044954 A1 | 2/2019 | Kounavis et al. | |
| 2019/0045016 A1 | 2/2019 | Dewan et al. | |
| 2019/0050558 A1 | 2/2019 | LeMay et al. | |
| 2019/0095350 A1 | 3/2019 | Durham et al. | |
| 2019/0097794 A1 | 3/2019 | Nix | |
| 2019/0102567 A1 | 4/2019 | LeMay et al. | |
| 2019/0102577 A1 | 4/2019 | Gueron et al. | |
| 2019/0227951 A1 | 7/2019 | Durham et al. | |
| 2019/0319781 A1 | 10/2019 | Chhabra et al. | |
| 2019/0347445 A1 | 11/2019 | Chen | |
| 2019/0354726 A1 | 11/2019 | Critelli et al. | |
| 2020/0004953 A1 | 1/2020 | LeMay et al. | |
| 2020/0007332 A1 | 1/2020 | Girkar et al. | |
| 2020/0076585 A1 | 3/2020 | Sheppard et al. | |
| 2020/0117810 A1 | 4/2020 | Kounavis et al. | |
| 2020/0125501 A1 | 4/2020 | Durham et al. | |
| 2020/0125502 A1 | 4/2020 | Durham et al. | |
| 2020/0125742 A1 | 4/2020 | Kounavis et al. | |
| 2020/0125769 A1 | 4/2020 | Kounavis et al. | |
| 2020/0125770 A1 | 4/2020 | LeMay et al. | |
| 2020/0134234 A1 | 4/2020 | LeMay et al. | |
| 2020/0145187 A1 | 5/2020 | Kounavis et al. | |
| 2020/0145199 A1 | 5/2020 | Kounavis et al. | |
| 2020/0159676 A1 | 5/2020 | Durham et al. | |
| 2020/0169383 A1 | 5/2020 | Durham et al. | |
| 2020/0201789 A1 | 6/2020 | Durham et al. | |
| 2020/0257827 A1 | 8/2020 | Kounavis et al. | |
| 2020/0380140 A1 | 12/2020 | Medwed et al. | |
| 2020/0382289 A1 | 12/2020 | Xue et al. | |
| 2021/0004470 A1 | 1/2021 | Babic et al. | |
| 2021/0058379 A1 | 2/2021 | Bursell et al. | |
| 2021/0117340 A1 | 4/2021 | Trikalinou et al. | |
| 2021/0117342 A1 | 4/2021 | Durham | |
| 2021/0149825 A1 | 5/2021 | Durham et al. | |
| 2021/0150040 A1 | 5/2021 | Durham et al. | |
| 2021/0218547 A1 | 7/2021 | Weiler et al. | |
| 2022/0019698 A1 | 1/2022 | Durham et al. | |

FOREIGN PATENT DOCUMENTS

| | | |
|---|---|---|
| EP | 3326102 A1 | 5/2018 |
| JP | 2009139899 A | 6/2009 |
| WO | 2017014885 A1 | 1/2017 |

OTHER PUBLICATIONS

USPTO Non-Final Office Action in U.S. Appl. No. 16/740,359 dated Sep. 27, 2021 (8 pages).
USPTO Notice of Allowance in U.S. Appl. No. 16/723,468 dated Oct. 18, 2021 (10 pages).
USPTO Notice of Allowance in U.S. Appl. No. 16/723,927 dated Dec. 24, 2021 (13 pages).
USPTO Notice of Allowance in U.S. Appl. No. 16/724,105 dated Nov. 16, 2021 (9 pages).
USPTO Non-Final Office Action in U.S. Appl. No. 16/723,927 dated Jun. 8, 2021 (32 pages).
USPTO Non-Final Office Action in U.S. Appl. No. 16/724,105 dated Jul. 13, 2021 (10 page).
Bernstein, Daniel J., "Gimli," Sep. 27, 2019, retrieved from https://csrc.nist.gov/CSRC/media/Projects/lightweight-cryptography/documents/round-2/spec-doc-md2/gimli-spec-round2.pdf, (48 pages).
Biin, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.
Boivie, Rick, IBM Research Report, SecureBlue++: CPU Support for Secure Execution, May 23, 2012, available online at https://

(56) References Cited

OTHER PUBLICATIONS domino.research.ibm.com/library/cyberdig.nsf/papers/E605BDC5439097F085257A13004D25CA/$File/rc25287.pdf, (10 pages).

Dworkin, Morris,"Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).

Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).

Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).

Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).

Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).

Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).

Liljestrand, Hans et al. "PACStack: an Authenticated Call Stack," Sep. 3, 2019, retrieved from https://arxiv.org/pdf/1905.10242.pdf, (20 pages).

Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).

Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).

Serebryany, Kostya, "ARM Memory Tagging Extension and How it Improves C/C++ Memory Safety," Summer 2019, (5 pages).

The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).

Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.

EPO; Extended European Search Report issued in Patent Application No. EP 20163518.2, dated Aug. 19, 2020; 10 pages.

USPTO Notice of Allowance in U.S. Appl. No. 16/722,707 dated Mar. 28, 2022 (10 pages).

USPTO Notice of Allowance in U.S. Appl. No. 16/724,105 dated Mar. 31, 2022 (8 pages).

USPTO Notice of Allowance in U.S. Appl. No. 16/740,359 dated Mar. 22, 2022 (9 pages).

USPTO Supplemental Notice of Allowance in U.S. Appl. No. 16/722,707 dated Apr. 8, 2022 (5 pages).

EPO; Extended European Search Report issued in EP Patent Application No. 21195529.9, dated Mar. 1, 2022; 6 pages.

EPO; Extended European Search Report issued in EP Patent Application No. 21196104.0, dated Feb. 15, 2022; 10 pages.

USPTO Non-Final Office Action in U.S. Appl. No. 16/709,612 dated Feb. 17, 2022 (16 pages).

"Armv8.5-A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Borghoff, Julia et al., "PRINCE—A Low-Latency Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).

Carr, Scott A. et al., "DataShield: Configurable Data Confidentiality and Integrity," Purdue University, ASIA CCS, '17, Apr. 2-6, 2017, Abu Dhabi, United Arab Emirates (12 pages).

Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.

EPO; Extended European Search Report issued in EP Patent Application No. 20163534.9, dated Sep. 24, 2020; 3 pages.

EPO; Extended European Search Report issued in EP Patent Application No. 20163546.3, dated Sep. 28, 2020; 3 pages.

EPO; Extended European Search Report issued in EP Patent Application No. 20163670.1, dated Sep. 29, 2020; 3 pages.

EPO; Extended European Search Report issued in EP Patent Application No. 20163907.7, dated Oct. 6, 2020; 9 pages.

EPO; Extended European Search Report issued in EP Patent Application No. 20164326.9, dated Oct. 2, 2020; 9 pages.

EPO; Extended European Search Report issued in EP Patent Application No. 20164636.1, dated Oct. 6, 2020; 8 pages.

EPO; Extended European Search Report issued in EP Patent Application No. 20168972.6, dated Jul. 3, 2020; 9 pages.

EPO; Extended European Search Report issued in EP Patent Application No. 20181907.5, dated Nov. 2, 2020; 9 pages.

EPO; Extended European Search Report issued in EP Patent Application No. 20193625.9, dated Feb. 22, 2021; 7 pages.

EPO; Extended European Search Report issued in European Patent Application No. EP 20163095.1, dated Aug. 10, 2020; 9 pages.

EPO; Extended European Search Report issued in Patent Application No. EP 20163661.0, dated Aug. 17, 2020; 9 pages.

Liljestrand, Hans, et al., "PAC it up: Towards Pointer Integrity using ARM Pointer Authentication", accessed at https://arxiv.org/pdf/1811.09189.pdf, last updated May 24, 2019, 21 pages.

Neagu, Madalin, et al.; "Increasing Memory Security Through Data Scrambling and Information Entropy Models," 2014 IEEE 15th International Symposium on Computational Intelligence and Informatics; Nov. 2014; 5 pages.

The Electronics Resurgence Initiative, "SSITH: TA1 (Hardware) Performers", accessed at: https://eri-summit.darpa.mil/docs/ERIPoster_Applications_SSITH_DARPA.pdf, Mar. 20, 2020, 1 page.

Watson, Robert N.M., et al., "An Introduction to CHERI", Technical Report UCAM-CL-TR-941, University of Cambridge Computer Labratory, Cambridge, United Kingdom, Sep. 2019, 43 pages.

Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).

Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).

Pyo, Changwoo, "Encoding Function Pointers and Memory Arrangement Checking against Buffer Overflow Attack," in Proceedings of the 4th International Conference on Information and Communications Security (ICICS 2002) (12 pages).

(56) References Cited

OTHER PUBLICATIONS

USPTO Final Office Action in U.S. Appl. No. 16/720,059 dated Jan. 21, 2022 (20 pages).
USPTO Non-Final Office Action in U.S. Appl. No. 17/134,406 dated Jan. 21, 2022 (11 pages).
USPTO Notice of Allowance in U.S. Appl. No. 16/723,977 dated Feb. 3, 2022 (13 pages).
Yang, Jun et al., "Improving Memory Encryption Performance in Secure Processors," IEEE Transactions on Computers, vol. 54, No. 5, May 2005 (11 pages).
Andreatos et al., "A comparison of random number sequences for image encryption", Mathematical Methods in Science and Engineering, 2014, pp. 146-151 (Year: 2014) (7 pages).
Nasahl, Pascal et al., "CrypTag: Thwarting Physical and Logical Memory Vulnerabilities using Cryptographically Colored Memory", https://doi.org/10.48550/arXiv.2012.06761, Arxiv ID: 2012.06761, Dec. 12, 2020. (13 pages).
Tuck, Nathan et al., "Hardware and Binary Modification Support for Code Pointer Protection From Buffer Overflow," 37th International Symposium on Microarchitecture (MICRO-37'04), 2004, pp. 209-220 (12 pages).
USPTO Final Office Action in U.S. Appl. No. 16/724,059 dated Sep. 2, 2022 (34 pages).
USPTO Non-Final Office Action in U.S. Appl. No. 16/722,342 dated Aug. 29, 2022 (14 pages).
USPTO Non-Final Office Action in U.S. Appl. No. 17/134,405 dated Aug. 1, 2022 (15 pages).
USPTO Notice of Allowance in U.S. Appl. No. 16/709,612 dated Aug. 23, 2022 (18 pages).
USPTO Notice of Allowance in U.S. Appl. No. 16/724,026 dated Aug. 10, 2022 (9 pages).
USPTO Notice of Allowance in U.S. Appl. No. 17/134,406 dated Oct. 5, 2022 (10 pages).
Whelihan, David et al., "A Key-Centric Processor Architecture for Secure Computing," 2016 IEEE International Symposium on Hardware Oriented Security and Trust (HOST), 2016, pp. 173-178. (6 pages).
Zhu, Ge et al., "Protection against indirect overflow attacks on pointers," Second IEEE International Information Assurance Workshop, 2004. Proceedings., 2004, pp. 97-106 (10 pages).

* cited by examiner

2110
LINEAR ADDRESS, SIZE OF
MEMORY ACCESS REQUEST, ID
OF THE MEMORY ACCESS
REQUEST

2120
ENCODED POINTER, ID OF
MEMORY ACCESS
REQUEST, CONTEXT
INFORMATION,
KEYSTREAM

2010
LINEAR ADDRESS, ENCODED POINTER, SIZE OF
MEMORY ACCESS REQUEST, ID OF THE
MEMORY ACCESS REQUEST, CONTEXT
INFORMATION, KEYSTREAM

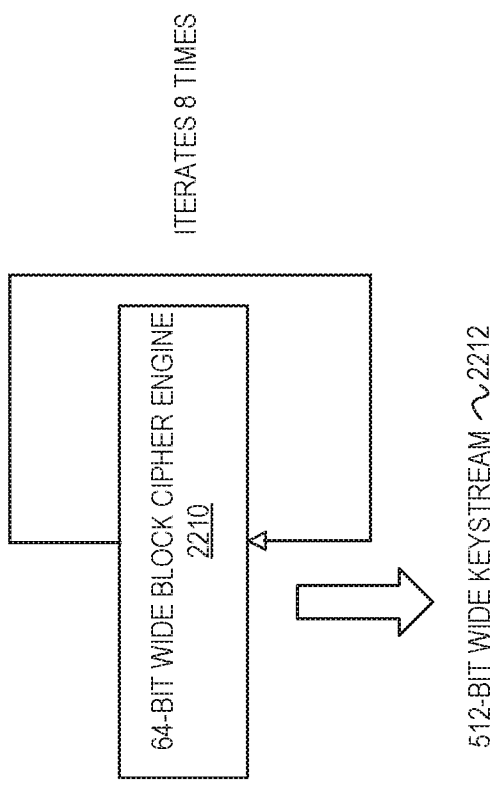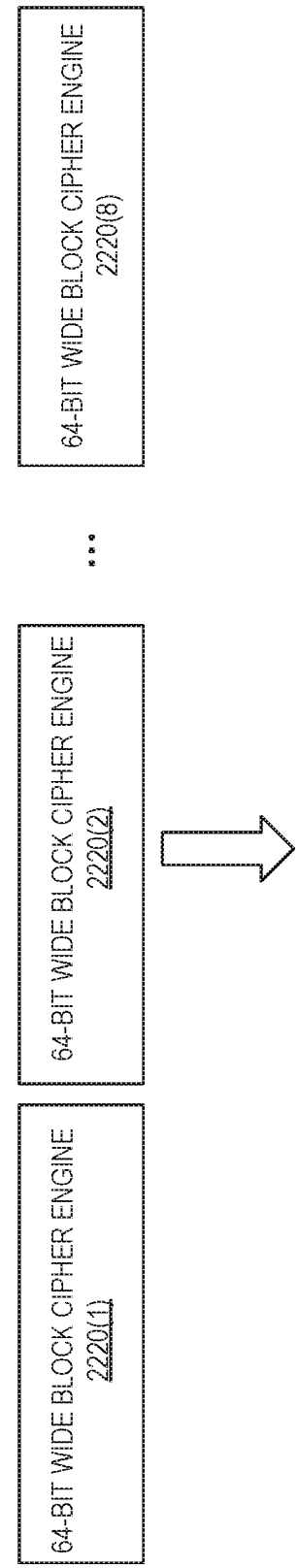
FIG. 22A
FIG. 22B

CRYPTOGRAPHIC COMPUTING ENGINE FOR MEMORY LOAD AND STORE UNITS OF A MICROARCHITECTURE PIPELINE

CROSS REFERENCE TO RELATED APPLICATIONS

This Application is a continuation-in-part of (and claims the benefit of and priority to) U.S. patent application Ser. No. 16/722,342 filed Dec. 20, 2019, which claims priority to U.S. Provisional Application No. 62/868,884 filed Jun. 29, 2019, and which is incorporated herein by reference. This application also claims the benefit of and priority to U.S. Provisional Application No. 62/868,884 filed Jun. 29, 2019, which is incorporated herein by reference.

TECHNICAL FIELD

This disclosure relates in general to the field of computer systems, and more particularly, a cryptographic computing engine for memory load and store units of a microarchitecture pipeline.

BACKGROUND

Protecting memory in computer systems from software bugs and security vulnerabilities is a significant concern. Examples of computer memory safety violations include overflowing a buffer causing adjacent memory locations to be overwritten, reading past the end of a buffer, and creating a dangling pointer that is not resolved to a valid destination. Current computing techniques have used architecture and metadata to provide data protection. For example, in previous solutions, a processor would use lookup tables to encode policy or data about the data for ownership, memory size, location, type, version, etc. However, this metadata requires additional storage (memory overhead) and negatively impacts performance, particularly for implementations with fine-grain metadata. Thus, different approaches are needed to provide efficient memory safety to computing systems without causing a significant negative impact on performance.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 22A-22B are block diagrams illustrating possible block cipher options for producing a particular-sized keystream;

DETAILED DESCRIPTION

Figure 1:
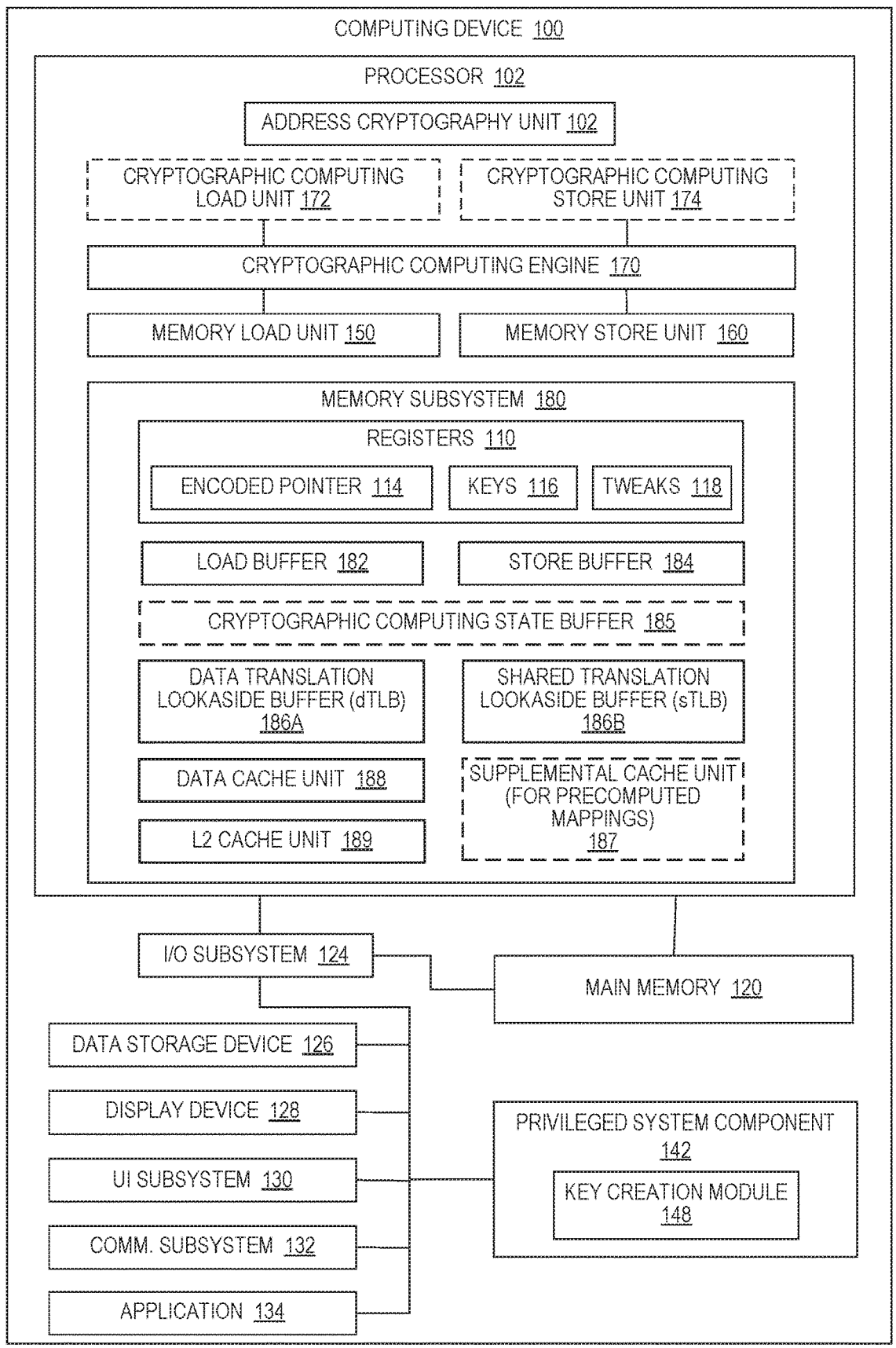
FIG. 1 is a simplified block diagram of an example computing device configured with a cryptographic computing engine according to at least one embodiment of the present disclosure.

The following disclosure provides various possible embodiments, or examples, for implementations of cryptographic computing. Cryptographic computing may refer to computer system security solutions that employ cryptographic mechanisms inside processor components. Some cryptographic computing systems may involve the encryption and decryption of pointers (or a portion of pointers), keys, data, and code in a processor core using new encrypted memory access instructions. Thus, the microarchitecture pipeline of the processor core may be configured in such a way to support such encryption and decryption operations.

Embodiments disclosed in this application are related to modifications to a microarchitecture pipeline to support and optimize cryptographic computing. In one or more embodiments, state machines and logic that service memory load and store requests in a typical microarchitecture pipeline are augmented with at least one new cryptographic computing engine. A cryptographic computing engine can be configured to perform pointer-based encryption and decryption of data or code. In one or more embodiments, a pointer is encoded with a linear address (also referred to herein as "memory address") of a memory location and with context information (e.g., a tag and/or other metadata). In some pointer encodings, a slice or segment of the address in the pointer includes a plurality of bits and is encrypted (and decrypted) based on a secret address key and an address tweak that may include the encoded context information. Other pointers can be encoded with a plaintext memory address (i.e., linear address) and context information.

An encoded pointer can be used to derive at least a portion of a pointer-based tweak (referred to herein as "data tweak" or "code tweak") for input into one or more cryptographic algorithms. The data or code tweak, along with a key, can be used by the one or more cryptographic algorithms to decrypt or encrypt the actual user data or code that is being read from, or written to, the memory location corresponding to the linear address. Thus, a cryptographic binding can be created between the cryptographic addressing layer and data/code encryption and decryption.

In one embodiment, a pointer-based tweak for data or code can be created based, at least in part, on an encrypted slice of a linear address in the encoded pointer and the context information in the encoded pointer. In other embodiments, the memory address may be decrypted and decoded, and combined with context information encoded in the pointer and/or additional context information, to create the pointer-based tweak for encrypting/decrypting the data or code. In further embodiments, a plaintext memory address (linear address) encoded in a pointer can be used as the pointer-based tweak, potentially along with context information encoded in the pointer. At least some of the context information for the data or code tweak can be directly obtained from the encoded pointer via a decoding process. Thus, in at least some embodiments, the context information does not need separate memory accesses to be fetched as it is directly obtained from the encoded pointer via a decoding process. In other embodiments, however, some of the context information may be obtained via a memory access or via an operand (e.g., immediate operand, register operand) of a load or store instruction.

In one embodiment, a cryptographic computing engine performs encryption and decryption of data or code using a cryptographic algorithm such as a counter mode of a block cipher. In this embodiment, the cryptographic computing engine may encrypt a tweak, which comprises the context information (and possibly one or more other portions of the encoded pointer and/or decoded linear address), to produce a keystream and subsequently perform an encryption/decryption operation (e.g., exclusive-OR (XOR)) on the keystream and the user data or code. In this case the encryption operations of the tweak can proceed in parallel with the memory accesses and the overheads associated with cryptographic computing can be substantially or even completely hidden. Also, various implementation options are possible for one or more cryptographic computing engines in a processor.

Other augmentations of state machines and logic that service memory load and store requests can include storing new state that is related to cryptographic computing in a load or store buffer, depending on the particular request being serviced. Alternatively, this new state may be held in a separate cryptographic computing buffer. Additional optimizations for cryptographic computing can include storing an encoded pointer in one buffer and a decoded linear address in another buffer, storing in a cache unit precomputed mappings between encoded pointers and keystreams for encrypting and decrypting user data, and/or storing different keystream instances to address scenarios in which data that is being read or stored crosses boundaries between different keystreams. Another optimization includes a speculative search for a physical address of the data being read or stored based on plaintext address bits of an encoded pointer. Yet another optimization involves a shortcut between a load buffer and store buffer, where data being stored is accessed from the store buffer to satisfy a load request for the data, before the data is stored to memory.

Variations of a different tweak for encrypting and decrypting a slice of the memory address to be embedded in the pointer are possible in one or more embodiments. For example, different and/or additional context information such as various types of metadata, cryptographic context identifier, portions of the plaintext memory address, or any suitable combination thereof may be used in the tweak used to encrypt/decrypt the slice of the memory address in the pointer. Similarly, variations of the tweak for encrypting and decrypting the data referenced by the encoded pointer are also possible. In other embodiments, additional parts of the encoded pointer may be used in the pointer-based tweak or the entire encoded pointer may be used as the pointer-based tweak. Furthermore, in at least some embodiments, different and/or additional context information such as metadata, cryptographic context identifier, slices of the plaintext address, or any suitable combination thereof may also be used in the tweak used to encrypt/decrypt the data referenced by the encoded pointer.

For purposes of illustrating the several embodiments of a cryptographic computing engine for memory load and store units of a microarchitecture pipeline, it is important to first understand the operations and activities associated with cryptographic computing. Accordingly, the following foundational information may be viewed as a basis from which the present disclosure may be properly explained.

Many of today's security solutions are costly. Current security techniques (e.g., page tables for process/kernel separation, virtual machine managers, managed runtimes, etc.) may use architecture and metadata to provide data protection. For example, a processor may use lookup tables to encode policy or data about the data for ownership, memory size, location, type, version, etc. These lookup tables may be large, stored in external memory units, and time consuming to access. Typical overheads may be associated with accessing tables, memory ranges, or other context information. For example, dynamically storing and loading metadata requires additional storage (memory overhead) and impacts performance, particularly for fine grain metadata (such as function as a service (FaaS) workloads or object bounds information).

Cryptographic computing can resolve many of the aforementioned issues (and more). Cryptographic computing may make redundant the legacy modes of process separation, user space, and kernel with a fundamentally new fine-grain protection model. With cryptographic computing, protections are cryptographic, with processors and accelerators alike utilizing secret keys and ciphers to provide access control and separation at increasingly finer granularities. Further, instead of virtual machine and process separation in current systems, with cryptographic computing, individual functions may become the boundary, allowing address spaces to be shared via pointers that are encrypted, with the encrypted pointers and keys providing controlled access down to individual data objects.

Cryptographic computing embodiments disclosed herein may leverage the concept of a cryptographic addressing layer where the processor encrypts and decrypts software allocated memory addresses (linear/virtual address space, referred to herein as "pointers") or a slice of the memory address based on implicit and/or explicit metadata. The implicit and explicit metadata are forms of context information and may be embodied in a tweak for input to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and a key. A tweak comprises one or more bits that represent a value. In one or more embodiments, a tweak may compose all or part of an initialization vector (IV) for a block cipher. When decryption of an address is performed, if the information used to create the tweak (e.g., implicit and explicit metadata, encrypted slice of the memory address, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor. These cryptographic addresses (or cryptographic address slices) may be further used by the processor as at least a portion of a tweak to the data encryption cipher used to encrypt/decrypt data or code they refer to (data referenced by the cryptographically encoded pointer), creating a cryptographic binding between the cryptographic addressing layer and data/code encryption. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

By cryptographically encoding metadata into addresses and their referenced data, cryptographic computing may reduce or remove the need for extra separate memory/storage to provide policy and context information/metadata. This can save up to billions of dollars in the computing industry (e.g., in dynamic random access memory (DRAM) expenses) due to the reduction of metadata alone. Customers can reap these savings in memory costs while still getting the security, safety and error-free functionality they want with cryptographic computing. By allowing safe speculation, the fundamentally cryptographic separation policies of cryptographic computing may allow the processor to speculate freely and provide increased performance.

A common characteristic of cryptographic computing systems is that they employ encryption and/or other cryptographic mechanisms inside a central processing unit (CPU) core on code pointers or user data before such data leave the CPU boundary and enter some external memory unit, or are communicated to some device. Although these flexible encryption operations can substantially reduce the typical overheads associated with providing security today, implementing this functionality as an extension of the functions of a typical computer microarchitecture pipeline is challenging. Implementations of cryptographic computing need to encrypt data as quickly as possible, in a small number of clock cycles, and have minimum impact on the performance of the pipeline.

Cryptography continues to become faster and lighter. For instance, the Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for a 64-bit computer architecture, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64-bit, 48-bit, 32-bit, 16-bit, etc. using Simon, Speck, tweakable K-cipher, PRINCE, Gimli, or any other block cipher).

Lightweight ciphers suitable for pointer encryption have emerged recently. The PRINCE cipher, for example, can be implemented in 3 clocks requiring as little as 799 $\mu m^2$ of area in the 10 nm process, providing half the latency of AES in a tenth the Silicon area. Cryptographic computing may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the reference data, or any suitable combination thereof as tweaks for the data encryption. A variety of encryption modes that are tweakable can be used for this purpose of including metadata (e.g. counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption.

FIG. 1 is a simplified block diagram of an example computing device 100 configured with a cryptographic computing engine 170 for optimizing cryptographic computing according to at least one embodiment of the present disclosure. In the example shown, the computing device 100 includes a processor 102 comprising the cryptographic computing engine 170, a memory load unit 150, a memory store unit 160, and a memory subsystem 180. In some embodiments, the processor 102 may also include a cryptographic computing load unit 172 and a cryptographic computing store unit 174, which can be responsible computing keystreams to be used to encrypt and decrypt data (or code) for the load and store operations. The cryptographic computing engine 170 may be configured to encrypt data and/or code for a memory load unit 150 based on various keys and/or tweaks and to decrypt data and/or code for a memory store unit 160 based on various keys and/or tweaks. An address cryptography unit 102 may also be configured in processor 102 to decrypt and encrypt a linear address (or a portion of the linear address) encoded in a pointer to the data or code referenced by the linear address. In some embodiments, the address cryptography unit 102 may be part of, or in communication with, an address generation unit (AGU).

Memory subsystem 180 includes registers 110, which may include e.g., general purpose registers and special purpose registers (e.g., control registers, model-specific registers (MSRs), etc.). Registers 110 may contain various data that may be used in one or more embodiments, such as an encoded pointer 114, keys 116, and possibly tweaks 118 or other context information used in tweaks 118. The encoded pointer 114 may be cryptographically encoded or non-cryptographically encoded. An encoded pointer is encoded with context information (e.g., a tag, a version, a size/power value, and/or other metadata). If the encoded pointer is cryptographically encoded, at least a portion (or slice) of the address bits is encrypted.

Memory subsystem 180 also includes a load buffer 182 and a store buffer 184. Load buffer 182 is used to store entries associated with a memory access instruction that includes an operand containing an encoded pointer to data or code. Load buffer 182 can store entries received from an address cryptography unit (or any other source with access to the information to be stored), for example, such as the encoded pointer, a size of the read request, an identifier (ID) of the read request, and context information associated with the encoded pointer. The context information in the load buffer 182 may contain metadata encoded in the pointer and, in some embodiments, additional external context information. Once the encoded pointer is decoded to produce a decoded (plaintext) linear address, the decoded linear address may also be stored in load buffer 182. Load buffer 182 may store encrypted data (or code) that is read from memory based on the operand's encoded pointer, and/or decrypted data (or code) resulting from decryption operations performed on the encrypted data (or code). In one or more embodiments, the data (or code) may be indexed in the load buffer by the encoded pointer.

Store buffer 184 is used to store entries associated with a store instruction that includes an encoded pointer to data or code as an operand. Store buffer 184 may store data (or code) that is being written to memory based on the operand's encoded pointer, an identifier (ID) of the store request, and context information associated with the encoded pointer. The context information in the store buffer 184 may contain metadata encoded in the pointer and, in some embodiments, additional external context information. In one or more embodiments, the data (or code) may be indexed in the load buffer by the encoded pointer. The data (or code) to be written to memory may be stored in store buffer 184 as plaintext or ciphertext. If the data (or code) is stored as plaintext, then encryption occurs before it is moved from the store buffer to memory. If the data (or code) is stored as ciphertext, then encryption occurs before it is stored in the store buffer, which may reduce latency when forwarding the data (or code) to memory.

In at least some embodiments, a cryptographic computing state buffer 185 is also part of memory subsystem 180. In these embodiments, the load buffer 182 contains information for a typical load instruction, such as data (or code) that is being read from memory based on an encoded pointer, a size of the read request, an identifier (ID) of the read request, and context information associated with the encoded pointer. Similarly, the store buffer 184 can contain information for a typical store instruction, such as data (or code) that is being written to memory based on an encoded pointer, an identifier (ID) of the store request, and context information associated with the encoded pointer. Cryptographic computing state buffer 185 may hold the cryptographic computing state for load and store instructions. This state can include a linear address obtained by decoding the encoded pointer, and a keystream for encrypting/decrypting the data (or code). In some embodiments, two cryptographic computing state buffers may be provisioned for holding the cryptographic computing state for load instructions in one buffer and the cryptographic computing state for store instructions in the other buffer.

In some embodiments, memory subsystem 180 may include a supplemental cache unit 187 for storing precomputed mappings between encoded pointers and keystreams for encrypting and decrypting user data (or code). Instead of encrypting data (or code) tweaks or initialization vectors (IVs) during the encryption/decryption of data or code during execution of memory access or store instructions, when a supplemental cache unit 187 is provisioned, it may be searched, based on the encoded pointer to the data or code being encrypted/decrypted, to find a precomputed keystream for that encoded pointer. In this implementation, at least some keystreams may be precomputed and stored in supplemental cache unit 187 before the keystreams are needed to decrypt or encrypt a particular memory block based on a memory access or store request. In some embodiments, instead of precomputing the keystreams (or in addition to precomputing a subset of the required keystreams), keystreams that are computed during the execution of a program may be dynamically stored in supplemental cache unit 187 for subsequent use in a memory access or store instruction. In addition, if multiple load and store buffers share the same cryptographic computing engine, then the precomputed keystreams generated by the shared cryptographic computing engine can be stored in some central buffer that can be allocated and shared among the different load and store buffers. The keystreams in the shared buffer can be accessed as needed for use by the shared cryptographic computing engine. In at least one embodiment, the supplemental cache unit 187 may be implemented as a content-addressable memory (CAM) unit.

In at least one embodiment, supplemental cache unit 187 stores two different instances of precomputed keystreams in order to manage scenarios in which a data read crosses the boundary between two different keystreams. For example, a memory block is a block of data or code that is aligned to a cryptographic block boundary. Thus, if a keystream is 512 bits and if the base memory address is aligned to the cryptographic block size, then two stored keystreams cover encryption/decryption up to 1024 bits; if a keystream is 128 bits and if the base memory address is aligned to the cryptographic block size, then two stored keystreams cover encryption/decryption of data up to 256 bits, etc. In addition, two keystreams can resolve a scenario in which a memory access crosses a boundary between memory regions aligned to the cryptographic block size. For example, the last byte in a memory block aligned to the cryptographic block size may be calculated from a first keystream, while the rest of the data is contained in the next memory block aligned to the cryptographic block size. If two keystreams are stored, the first keystream can be used for encryption/decryption of the first memory block, and the second keystream can be used for encryption/decryption of the next memory block. For memory accesses that cross additional boundaries between memory regions aligned to the cryptographic block size, a corresponding number of keystreams is needed.

Additionally, some processors, such as a graphics processing unit (GPU) and some central processing units that include prefetchers that can recognize predictable patterns of memory accesses and stores issued by the processor. In this scenario, the processor can precompute the keystream(s) that are predicted to be needed and store the precomputed keystream(s) in supplemental cache unit 187. Accordingly, a precomputed keystream may be retrieved immediately without any delay for computing it, when an encoded pointer arrives (e.g., is used in a memory access or store instruction that is executed). Memory access patterns for GPUs and vectorized CPU software may be especially predictable, due to the common usage of GPUs to process large regions of data in a linear order. In some embodiments, pointers containing an encoded size indicator may enable optimization of memory prefetching based on linear addresses. The memory prefetcher may observe when it has reached the end of an allocation based on the size indicator and avoid continuing to prefetch data past the end of the allocation. In embodiments performing integrity checks to determine a more precise end to an allocation than can be determined solely from the pointer, the prefetcher may cease prefetching as soon as an integrity violation is detected.

Memory subsystem 180 may further include a translation lookaside buffer (TLB). For example, a data translation lookaside buffer (dTLB) 186A and a shared translation lookaside buffer (sTLB) 186B may be provisioned in computing device 100. Generally, a TLB maps linear addresses (which may also be referred to as virtual addresses) to physical addresses. A TLB entry is populated after a page miss where a page walk of the paging structures determines the correct linear to physical memory mapping, caching the linear to physical mapping for fast lookup. Typically, a TLB lookup is performed by using a linear address to find a corresponding physical address to which the linear address is mapped. The TLB lookup itself may be performed for a page number. In an example having 4 Kilobyte (KB) pages, the TLB lookup may ignore the twelve least significant bits since those addresses pertain to the same 4 KB page.

As an optimization, the behavior of the TLB may be modified to allow a TLB lookup to be performed using an encoded pointer to find a corresponding physical address. More particularly, the TLB (e.g., dTLB 186A) may instead cache an encoded pointer to a physical address mapping, using a Content Addressable Memory (CAM) circuit to match the encoded pointer to the correct physical address translation. In this way, the TLB may determine the physical memory mapping prior to the completion of encoded pointer being decoded to reveal a decoded (plaintext) linear address, and instructions dependent on this cached memory mapping may immediately proceed.

In other embodiments, a TLB lookup may be optimized by using plaintext linear address bits from a cryptographically encoded pointer as a partial linear address mapping into the TLB. For example, a TLB lookup can be performed against only the plaintext linear address bits of the cryptographically encoded pointer. If found, instructions dependent on this cached memory mapping may speculatively proceed, using this "likely" physical memory translation (i.e., physical address) as needed (e.g., to retrieve encrypted data stored in memory). Once the cryptographically encoded pointer is decoded, the resulting decoded (plaintext) linear address can be used to determine whether the likely physical address obtained from the partial linear address match is the correct physical address. In particular, if the resulting decoded linear address matches the linear address that was partially matched during the TLB lookup, then the likely physical address obtained from that lookup is the correct physical address. If the resulting decoded linear address does not match the linear address that was partially matched during the TLB lookup, then the processor pipeline operations may be aborted, preventing the execution of dependent instructions, or cleaning up the execution of dependent instructions by returning processor register state and/or memory to its prior state before the TLB misprediction (incorrect memory mapping).

In addition, it should be noted that a TLB lookup may still be performed based on a plaintext linear address. This can occur, for example, after the encoded pointer has been decoded and a decoded linear address has been generated. It may also occur when a canonical address is used to enable compatibility with legacy instruction set architectures. A canonical address is not encrypted and may be indicated when the upper unused bits of a linear address are encoded as all zeros or all ones.

In some implementations, the sTLB 186B may be slower than the dTLB 186A. For example, the sTLB may be implemented as a shared second-level TLB in the cache memory hierarchy of one or more embodiments. Therefore, sTLB 186B is likely to be used when performing a lookup for a physical address based on a decoded linear address. Conversely, the dTLB 186A may be faster, and therefore, partial linear address matches and encoded pointer lookups may be performed using the dTLB 186A. Additionally, the memory subsystem 180 may also provide an instruction translation lookaside buffer (iTLB) (not shown), a data cache unit (DCU) 188 (also known as a level one (L1) cache), and a level two (L2) cache 189. The iTLB maps a linear address to a physical address in memory for storing or fetching instructions. DCU 188 and L2 cache 189 can be used to store copies of data that is frequently accessed from main memory during a process. In one or more embodiments, data stored in DCU 188 or L2 cache 189 is stored in an encrypted form where the encryption is based at least in part on a tweak derived from an encoded pointer that points to (or references) the data at its memory location in the main memory. Some processors, e.g., some GPUs, include scratchpad memory that is small and fast like a cache, but that is accessed explicitly by software rather than implicitly as part of an access to non-cache memory. In one or more embodiments, data stored in scratchpad memory is stored in an encrypted form where the encryption is based at least in part on a tweak derived from an encoded pointer that points to (or references) the data at its memory location in the scratchpad memory.

The cryptographic computing engine 170 utilizes context information (e.g., metadata), which is encoded into unused bits of encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding can prevent the encoded pointer 114 from being manipulated to cause a buffer overflow, and/or can prevent program code from accessing memory that it does not have permission to access. Logic to encode a pointer may be invoked when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

In one example configuration of an encoded pointer, the address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments that will be further described herein, other metadata (or context information) can be encoded in the unused bits of encoded pointer 114 such as a size of plaintext address slices (e.g., number of bits in a plaintext slice of a memory address embedded in the indirect address), a memory allocation size (e.g., bytes of allocated memory referenced by the indirect address), a type of the data or code (e.g., class of data or code defined by programming language), permissions (e.g., read, write, and execute permissions of the indirect address), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the indirect address that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Memory load unit 150 and memory store unit 160 may be embodied as part of processor instructions (e.g., as part of the processor instruction set architecture), or microcode (e.g., instructions that are stored in read-only memory and executed directly by the processor 102). In other embodiments, portions of the memory load unit 150 and memory store unit 160 may be embodied as hardware, firmware, software, or a combination thereof (e.g., as programming code executed by a privileged system component 142 of the computing device 100). Memory load unit 150 and memory store unit 160 verify the encoded metadata on memory read and write operations that utilize processor instructions (e.g., which may be counterparts to existing processor instructions such as MOV), where a general purpose register is used as a memory address to read a value from memory (e.g., load) or to write a value to memory (e.g., store), as well as on other operations that involve the "use" of memory (such as arithmetic instructions with memory operands, e.g., ADD, and control transfer instructions, e.g., CALL/JMP etc.). Memory operands of control transfer instructions may specify a location in memory at which the destination address for the control transfer is stored.

Memory load unit 150 and memory store unit 160 are executable by the computing device 100 to provide security for encoded pointers "inline," e.g., during execution of a program (such as a user space software application) by the computing device 100. As used herein, the terms "indirect address" and "pointer" may each refer to, among other things, an address (e.g., virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory store instruction" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory.

However, the pointer encoding/decoding technology disclosed herein is not limited to MOV or load/store instructions. For example, control transfer instructions such as call and jump instructions can be adapted to handle encoded pointers and to perform encryption and decryption of code within the core in a similar manner as described herein with respect to MOV or load/store instructions, at least some of which may be new instructions, where code that is to be encrypted or decrypted is to execute within a valid address range. Likewise, the instruction pointer (e.g., register) may be range bound given the encoded address specified by the control transfer instruction (e.g. JMP/CALL) results in an encoded address being used for the instruction pointer, thus restricting valid program execution to within a valid address range (effectively, the program counter can increment correctly until it reaches the end of the encoded range). Furthermore, in some architectures, any number of processor instructions may have a memory operand in the form of an encoded pointer (e.g. arithmetic operations such as ADD, SUB, MUL, AND, OR, XOR, etc. may have a source/destination memory reference in the form of an encoded pointer and/or a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example address cryptography unit 102 can include circuitry and logic to perform address decoding, including decryption if needed (e.g., an encoded pointer with an encrypted portion of a linear address) based at least in part on a tweak derived from an encoded pointer to a memory location of data (or code). The cryptographic computing engine 170 can include circuitry and logic to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 170 may use a tweak, which includes at least a portion of the encoded pointer 114 (or the linear address generated from the encoded pointer), and a secret key (e.g., keys 116) in order to secure the data or code at the memory location referenced by the encoded pointer 114 by binding the data/code encryption and decryption to the encoded pointer.

Various operations such as pointer encoding, pointer decoding, address encrypting, address decrypting, data/code encrypting, and/or data/code decrypting may be embodied in processor instructions associated with cryptographic computing engine 170, cryptographic computing load unit 172, cryptographic computing store unit 174, address cryptography unit 102, memory load unit 150, and/or memory store unit 160, may be embodied in other processor instructions, or as a separate instruction or series of instructions, or as higher-level code executed by a privileged system component such as an operating system kernel or virtual machine monitor, or as an instruction set emulator. As described in more detail below, the pointer decoder unit 102, memory load unit 150, and memory store unit 160 each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key), in order to secure the encoded pointer 114 at the memory allocation/access level.

The example encoded pointer 114 is embodied as a register 112 (e.g., a general purpose register of the processor 102). The example secret keys 116 may be generated by a key creation module 148 of a privileged system component 142, and stored in one of the registers 112 (e.g., a special purpose register or machine specific register (MSR)), or another memory location that is readable by the processor 102. In some embodiments, the secret keys 116 may be stored in a location that is readable only by the processor. In other embodiments, the secret keys 116 used to secure encoded pointers, data, and code can be stored in another memory location, such as in firmware, in a secure portion of a data storage device 126 or another data storage device, or another form of memory suitable for performing the functions described herein. In some embodiments, the secret keys 116 may be transmitted across a secure communications channel and restored by an executive (such as an operating system or a virtual machine monitor, e.g., the privileged system component 142 described below). In virtualized environments in which virtual machines are migrated from one machine to another, and/or in cases in which a virtual machine, process or program running on the computing device 100 begins a sleeping/hibernating mode after an encoded pointer and the referenced data and/or code are secured using secret keys, and then later resumes, the secret keys will need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 142).

It should be noted that embodiments described herein allow for any number of secret keys and/or tweaks to be used for a particular program. In one example, the same secret key may be used for all encoded pointers used in a program. In another example, a different secret key may be used for each encoded pointer associated with a different memory allocation or for each predefined group of memory addresses associated with different memory allocations. In yet further embodiments, the same secret key used for an address encryption/decryption may also be used for encrypting the data bound to that address. In other embodiments, one secret key may be used for address encryption/decryption, while a different secret key may be used for data or code encryption/ decryption bound to that address. For ease of explanation, embodiments further described herein refer to "secret address key" or "address key" to refer to the use of a secret key in encryption and decryption operations of memory addresses and "secret data key" or "data key" to refer to the use of a secret key in operations to encrypt and decrypt data or code.

On (or during) a memory allocation operation (e.g., a "malloc"), a range of memory for a buffer is allocated, and a pointer is returned along with the metadata (e.g., one or more of range, permission metadata, size (power), memory allocation size, type, location, ownership, version, tag, privilege level, crypto context ID, etc.). In one example, the memory allocation operation may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation operation logic may be embodied in a memory manager module 144 of the privileged system component 142. The memory allocation operation causes the pointer to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments), is encrypted using a secret address key (e.g., keys 116) and an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using the secret key (e.g., keys 116) and the address tweak, as described further below. In one or more embodiments, the portion of encoded pointer 114 that is encrypted contains linear address bits.

The linear address encoded in the encoded pointer 114 is returned to its original (e.g., canonical) form, based on appropriate operations in order to restore the true, original linear memory address. To do this in at least one possible embodiment, the address metadata encoded in the unused bits of the encoded pointer 114 may be removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 will be corrupted as a result of the decrypting process performed on the encrypted address bits in the pointer. A corrupted encoded pointer will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. In this way, the cryptographic computing engine 170 enables the computing device 100 to provide encoded pointer security against buffer overflow attacks and similar exploits.

Embodiments of the cryptographic computing security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed cryptographic computing security technologies can operate without any additional memory reads/writes, or without any additional instructions, or without any binary modifications, or without the need to recompile legacy code. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the x86 instruction set, as well as ARM, MIPS, PowerPC and other processor architectures, including wider (e.g., greater than 64-bit) address bit architectures and smaller (e.g. 32-bit) architectures by reserving address ranges for the metadata containing addresses.

Some embodiments of the disclosed technologies utilize aspects of address adjustment logic and address restoration logic to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor. "Legacy code" also refers to a version of computer code designed without using or being adapted to use dedicated instructions for encoding and encrypting indirect addresses as described herein. At least some embodiments disclosed herein can be implemented without using new program instructions and accordingly, without the need for recompiling legacy code.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the cryptographic computing engine 170.

The computing device 100 also includes other memory 120 (e.g., main memory), an input/output subsystem 124, a data storage device 126, a display device 128, a user interface (UI) subsystem 130, a communication subsystem 132, at least one user space application 134, and the privileged system component 142 (which, illustratively, includes the key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a multi-core processor, other multiple-CPU processor or processing/controlling circuit, or multiple diverse processing units or circuits (e.g., CPU and GPU, etc.).

Memory subsystem 180 may be provisioned inside processor 102 and other memory 120 may be provisioned outside the processor. The processor 102 has a number of registers 110, which include general purpose registers and special purpose registers. These registers may be used to store encoded pointers (e.g., 114), keys (e.g., 116) for encryption and decryption of address bits, data, or code. In some embodiments, registers 110 may also be used to store data and/or address tweaks 118, or context information to be used for generating tweaks. In other embodiments, however, tweaks may be managed by software. The memory subsystem 180 of processor 102 may also include DCU 188 (e.g., L1 cache) and L2 cache 189, in which data is stored when it is retrieved from other memory 120 in anticipation of being fetched by processor 102 or when it is received from store buffer 184 in anticipation of being stored to other memory.

The other memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of other memory 120 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, other memory 120 comprises one or more memory modules, such as dual in-line memory modules (DIMMs). In some embodiments, the other memory 120 may be located on one or more integrated circuit chips that are distinct from an integrated circuit chip comprising processor 102 or may be located on the same integrated circuit chip as the processor 102. Other memory 120 may comprise any suitable type of memory and is not limited to a particular speed or technology of memory in various embodiments. In operation, the other memory 120 may store various data and software used during operation of the computing device 100, as well as operating systems, applications, programs, libraries, and drivers.

The other memory 120 is communicatively coupled to the processor 102, e.g., via the I/O subsystem 124. The I/O subsystem 124 may be embodied as circuitry and/or components to facilitate input/output operations with the processor 102, the other memory 120, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the other memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as the user space application 134 and the privileged system component 142. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes the key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates secret keys 116 (e.g., secret address keys and secret data keys) and writes them to a register or registers to which the processor 102 has read access (e.g., a special purpose register). To create a secret key, the key creation module 148 may execute, for example, a random number generator or another algorithm capable of generating a secret key that can perform the functions described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor (not shown), or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2:
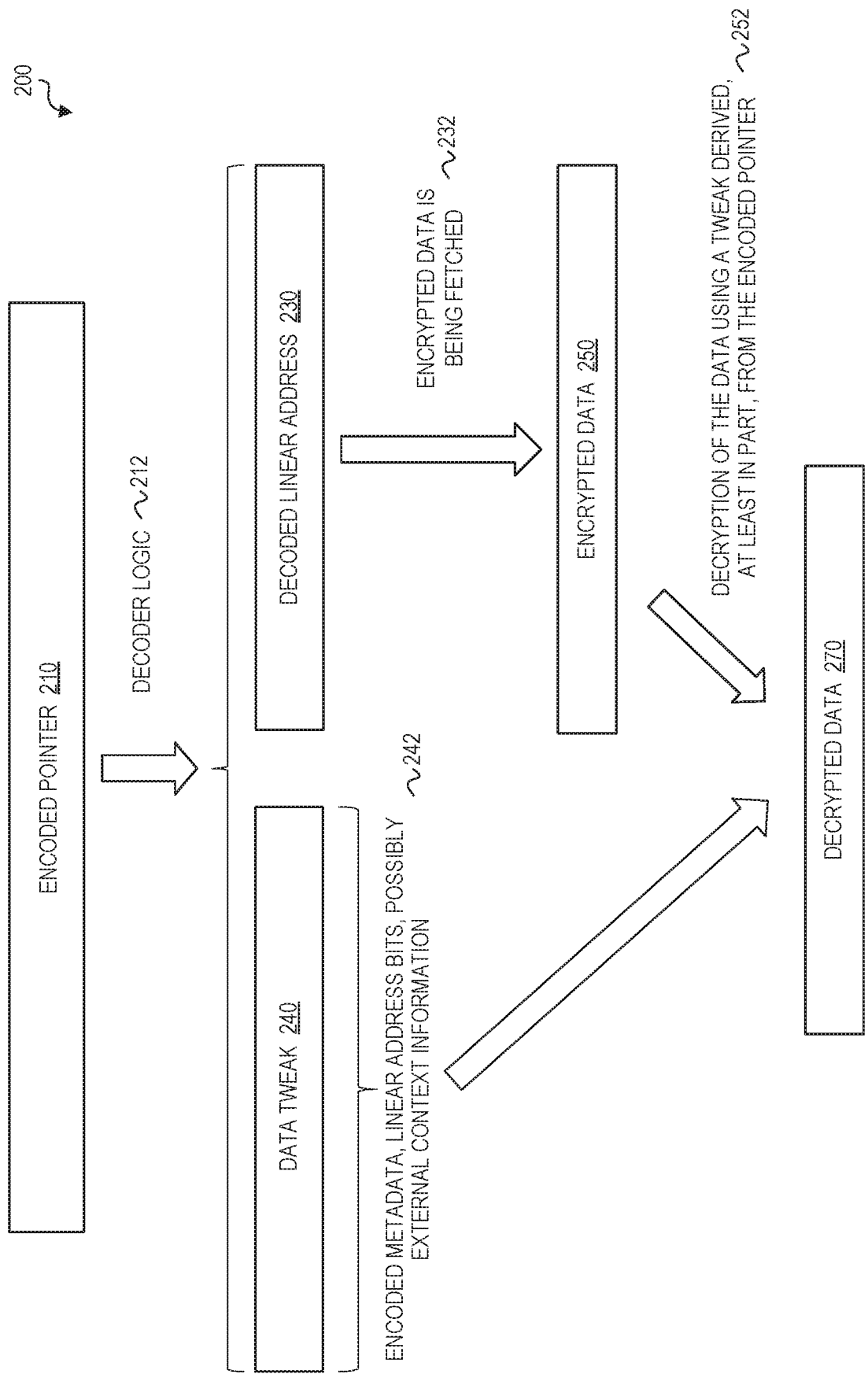
FIG. 2 is flow diagram illustrating a process of binding a generalized encoded pointer to encryption of data referenced by that pointer according to at least one embodiment.

FIG. 2 is a simplified flow diagram illustrating a general process 200 of cryptographic computing based on embodiments of an encoded pointer 210. Process 200 illustrates obtaining (e.g., reading, loading, fetching) data that is referenced by encoded pointer 210, where encryption and decryption of the data is bound to the contents of the pointer according to at least one embodiment. At least some portions of process 200 may be executed by hardware, firmware, and/or software of the computing device 100. In the example shown, pointer 210 is embodied as an encoded linear address including a metadata portion. The metadata portion is some type of context information (e.g., size/power metadata, tag, version, etc.) and the linear address may be encoded in any number of possible configurations, at least some of which will be further described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, or a version number.

Generally, process 200 illustrates a cryptographic computing flow in which the encoded pointer 210 is used to fetch encrypted data from memory, and to decrypt the encrypted data based, at least in part, on a tweak derived from the encoded pointer 210. First, decoder logic 212, which may be part of address cryptography unit 102, decodes the encoded pointer 210 to obtain a decoded linear address 230, which is used to fetch encrypted data 250, as indicated at 232. A data tweak 240 is derived, at least in part, from the encoded pointer. For example, the data tweak 240 may include the entire encoded pointer, one or more portions of the encoded pointer, a portion of the decoded linear address, the entire decoded linear address, and/or external context information (e.g., context information that is not encoded in the pointer).

At 252, the encrypted data 250 is decrypted by a decryption algorithm such as a keystream generator, which may be implemented as an AES-CTR mode block cipher, at a particular size granularity (any suitable size). In this embodiment, the data tweak 240 may be used as an initialization vector (IV) and a plaintext offset of the encoded pointer 210 may be used as the counter value (CTR). The keystream generator can encrypt the tweak to produce a keystream and then perform a cryptographic operation (e.g., exclusive-or (XOR), or other more complex operations) on the encrypted data and the keystream in order to generate decrypted data 270. It should be noted that the generation of the keystream may commence while the encrypted data is being fetched at 232. Thus, the parallel operations may increase the efficiency of decrypting the encrypted data.

Similarly, when storing plaintext data back to cache/memory the same operations may be performed, where cryptographic operation (e.g., XOR or other more complex operation) may be performed on the plaintext data from a processor register and a keystream generated from the data tweak 240. The resulting encrypted data can be written back to memory.

Figure 3:
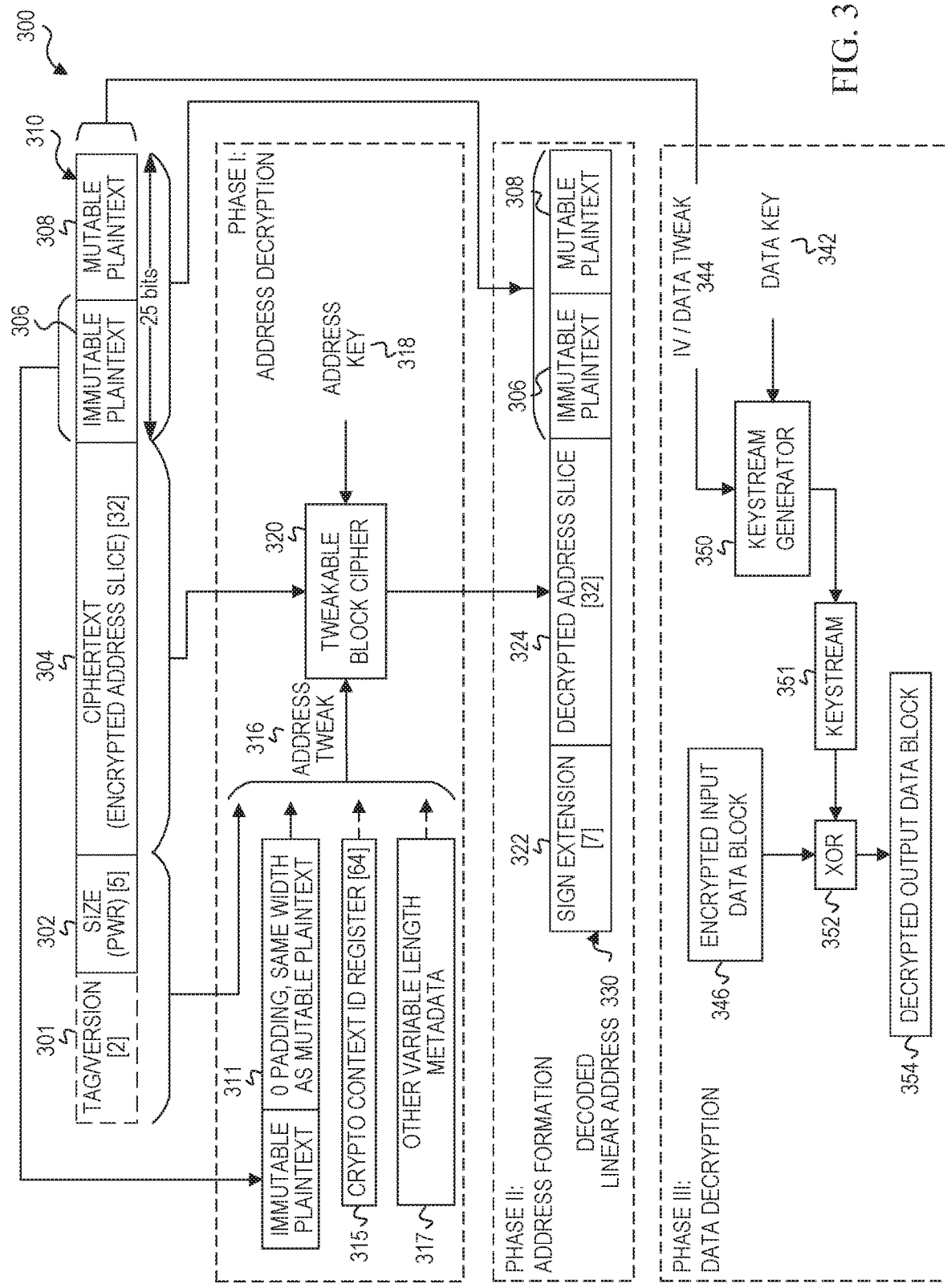
FIG. 3 is flow diagram illustrating a process of binding one possible embodiment of an encoded pointer to encryption of data referenced by that pointer according to at least one embodiment.

FIG. 3 is a flow diagram illustrating an example process 300 of cryptographic computing based on embodiments of a pointer 310, which is cryptographically encoded with a linear address. Process 300 illustrates obtaining (e.g., reading, loading, fetching) data that is referenced by cryptographically encoded pointer 310, where encryption and decryption of the data is bound to the contents of the pointer. At least some portions of process 300 may be executed by hardware, firmware, and/or software of the computing device 100. In the example shown, pointer 310 is embodied as a cryptographically encoded 64-bit pointer in its base format, using exponent (power) metadata but not an offset. Encoded pointer 310 includes context information such as a tag/version portion (e.g., 2 bits in the example shown) and a size (power) metadata portion 302 (e.g., 5 bits in the example shown). The encoded pointer also includes a variable-bit immutable plaintext portion 306 and a variable-bit mutable plaintext portion 308. In the example shown, each of the immutable plaintext portion 306 and the mutable plaintext portion 308 may contain 0-25 bits, with the total number of bits contained in the combined portions 306 and 308 equaling 25 bits.

In at least one embodiment, the size (power) metadata portion 302 indicates a size of the mutable plaintext portion 308, which are a number of low order address bits that may be manipulated freely by software for pointer arithmetic. In some embodiments, the size/power portion metadata 302 may include power (exponent) metadata bits that indicate a size based on a power of 2. The size/power metadata portion 302 can also be used to determine the number of bits that compose the immutable plaintext portion 306. In certain embodiments, the total number of bits that make up the immutable plaintext portion 306 and the mutable plaintext portion 308 may be constant, with the sizes of the respective portions being dictated by the size/power metadata portion 302. For example, if the size/power metadata value is 0, there are no mutable plaintext bits and all 25 remaining address bits compose the immutable plaintext portion 306. To further illustrate encoding of the size/power metadata in the example shown (where the combined plaintext portions 306 and 306 total twenty-five bits), if the size/power metadata value is 1, then there is one bit of mutable plaintext and twenty-four bits of immutable plaintext, if the power metadata value is 2, then there are two bits of mutable plaintext and twenty-three bits of immutable plaintext. Up to twenty-five bits of mutable plaintext may be indicated by the size/power metadata 302, resulting in no immutable plaintext bits (306). The mutable plaintext portion 308 may be manipulated by software, e.g., for pointer arithmetic or other operations.

The immutable plaintext portion 306 can be used as a tweak to generate ciphertext portion 304 from an address slice (i.e., a subset of linear address bits of the linear address), where the ciphertext portion 304 is adjacent to and more significant than the immutable plaintext portion 306. The ciphertext portion 304 (e.g., thirty-two bits in the example shown) of the pointer 310 may be encrypted with a small tweakable block cipher (e.g., a SIMON, SPECK, or tweakable K-cipher at a 32-bit block size, or other variable bit size tweakable block cipher). The remaining address bits compose immutable plaintext portion 306 and may be used as part of the tweak for the tweakable block cipher used to encrypt the ciphertext portion 304. While these bits are also a plaintext (non-encrypted) portion of the address, they cannot be modified by software (e.g. pointer arithmetic) like the bits of mutable plaintext portion 308 without causing the ciphertext portion 304 to decrypt incorrectly. The base pointer format of pointer 310 allows for cryptographically describing object sizes and their location in memory. In some cases, the exponent/power/size metadata portion 302 could be provided as a separate parameter in addition to the pointer; however, in some cases (e.g., as shown) the bits of the size/power metadata portion 302 may be integrated with the pointer 310 to provide legacy compatibility in certain cases.

The tag/version portion 301 of pointer 310 may be a random or deterministically different value. In other embodiments, the tag/version portion 301 may be omitted and additional bits may be added to the plaintext portion 306 and 308 (e.g., twenty-seven total bits), to size/power portion (e.g., seven total bits), or to any other portion of pointer 310. In yet other embodiments, the two upper bits may be reserved bits that allow cryptographically encoded pointers to be used concurrently with legacy pointers. For example, the most significant bit can be used to indicate whether the address is located within the supervisor address space (e.g., "1") or within the user mode address space (e.g., "0"). The next most significant bit can be set to the opposite value of the supervisor bit to indicate that the pointer is cryptographically encoded or can be set to the same value of the supervisor bit to indicate that the pointer is not cryptographically encoded. In other embodiments, the legacy encoding may be achieved without dedicated reserved bits. Instead, legacy encoding can be achieved by encoding particular values in the size/power metadata portion 302 (e.g., all 1s, all 0s). If the pointer 310 includes the tag/version portion 301, then these bits may also be encoded with the particular values (e.g., all 1s, all 0s) to allow legacy and conventional encoding to be used concurrently. In yet other embodiments, legacy encoding may be eliminated entirely if, for example, the concepts are not implemented to be compatible with legacy programs.

It should be noted that the size/power metadata portion 302 may not be encrypted as it is used to determine the number of bits in the mutable and immutable plaintext portions of the pointer and, therefore, the number of bits used in the address tweak (e.g., immutable plaintext portion 306). The tag/version portion 301, however, is not used to determine the size of the address tweak. Therefore, the tag/version portion 301 may alternatively be included as part of the encrypted portion of the address (i.e., ciphertext 304) as long as the tag/version portion 301 is not used in the address tweak. In this alternative embodiment, the block cipher would have a correspondingly larger block size to fit the tag/version portion, or the address bits included in the ciphertext would be reduced and a corresponding number of address bits would be included in the plaintext portion (i.e., 306 and 308). Additionally, it should be noted that, although the process 300 is illustrated with the encoding shown in pointer 310, which includes a tag/version (or reserved bits) portion 301, process 2300 could be performed with other pointer encodings having a size/power metadata portion that do not include a tag/version (or reserved bits) portion. In this scenario, the tag/version (or reserved bits) portion may simply be eliminated from the address tweak.

Generally, the operations of process 300 are identified in three phases: address decryption (Phase I), address formation (Phase II), and data decryption (Phase III). In Phase I, the linear address embedded in pointer 310 is decrypted. Specifically, ciphertext portion 304 of the encoded linear address is decrypted by a decryption algorithm such as a tweakable block cipher 320 using an address key 318 and an address tweak 316. The address tweak 316 can include context information encoded in the pointer such as tag/version portion 301 and size/power metadata portion 302. The address tweak 316 can also include immutable plaintext portion 306, in addition to zeros padding 311. The size/power metadata portion 302 is used to determine the number of bits in immutable plaintext portion 306 and the number of bits in mutable plaintext portion 308, which equals the number of bits for padding 311 in the address tweak 316. In at least some embodiments, an additional one or more items of variable length metadata 317 may also be used as part of address tweak 316 for the tweakable block cipher 320. For example, the variable length metadata 317 may include other context information or metadata (e.g., permissions, privilege level, type, location, ownership, etc.) as previously described herein. In yet further embodiments, a crypto context identifier register 315 may be used as part of address tweak 316. The crypto context identifier register 315 may contain a unique value (e.g., randomly or deterministically generated) associated with a particular functional group (e.g., processes, subset of processes, virtual machines (VM), subset of VMs, etc.). The block cipher 320 may be any suitable decryption algorithm (e.g., tweakable version of a 32-bit block size cipher such as SIMON, SPECK, K-cipher, or other variable block size cipher, or for larger addresses, PRINCE, XTS-AES block cipher, LRW, AES-CTR mode, etc. may be used) as noted herein.

When the ciphertext 304 portion of the encoded linear address has been decrypted into a decrypted address slice 324 by tweakable block cipher 320, then a decoded linear address 330 can be formed in Phase II. If the tag/version portion 301 was included as part of the encrypted portion of the address (i.e., ciphertext 304), then the tag/version portion in the decrypted address slice 324 may be overwritten with sign extension bits 322 when forming the decoded linear address 330. In at least one embodiment, the uppermost bits (e.g., tag/version portion 301 and size/power metadata portion 302) can be set to the same bit value (e.g., 0 or 1). In addition, the bits of the immutable plaintext portion 306 and mutable plaintext portion 308 make up the lower bits of the decoded linear address 330. In some embodiments, the processor may check whether a slice of the upper bits in decrypted address slice 324 has an expected value as an indication of whether the decrypted address slice 324 was decrypted incorrectly. For example, in some paging modes, some number of upper address bits are required to all have the same value (i.e. all 0's or all 1's). If the corresponding bits in the decrypted address slice 324 have differing values, then that indicates that decrypted address slice 324 was decrypted incorrectly. Some embodiments may generate a fault in that case. Some other embodiments may rely on existing canonicality checks to generate a fault in that case when the decoded linear address 330 is used. Even if the upper bits do all have the same value, that may not conclusively indicate that decrypted address slice 324 was decrypted correctly. Some embodiments may perform the aforementioned checks for expected bit values for both the minimum and maximum addresses to be accessed in the current operation so that a fault will likely be generated if any portion of the access is out-of-bounds. Other embodiments may only require that a particular portion of the access, e.g. the first byte, be within the bounds of the pointer, and thus only perform the aforementioned checks for expected bit values on the pointer for that portion of the access. Other embodiments may check both the minimum and maximum addresses for write operations but only check a single pointer value for reads, relying on data cryptography to likely prevent partially out-of-bounds reads from returning correct plaintext.

The decoded linear address 330 is used to find the memory location of the encrypted data to be decrypted in Phase III. The encrypted data is decrypted by a decryption algorithm such as keystream generator 350. In at least one embodiment, keystream generator 350 can be implemented as an AES-CTR mode block cipher, at a particular size granularity (any suitable size). In this embodiment, the contents of the cryptographically encoded pointer are used as the initialization vector (IV) or data tweak 344, with the plaintext offset (e.g., 308) being used as the counter value (CTR). Generation of keystream 351 may commence without waiting for encrypted address slice (i.e., ciphertext 304) to complete. Keystream generator 350 encrypts data tweak 344 based on a data key 342 to generate a keystream 351. The value of data tweak 344 may be adjusted to be congruent to 0 (modulo the block size of the keystream generator 350) prior to being used as an input to the keystream generator. The value of the data tweak 344 may have some suitable number of least significant bits set to 0 to satisfy this requirement and a prefix of the keystream 351 may be discarded to account for that adjustment. The number of bytes of the keystream 351 to discard may be computed by subtracting the adjusted value of the data tweak 344 from the unadjusted value of the data tweak 344. This adjustment may modify the values of immutable plaintext 306 in pointers to objects smaller than the block size. However, the data encryption may be indirectly bound to the values of the modified immutable bits, since those bits may be incorporated in the tweak used to generate ciphertext 304. If the memory to be encrypted crosses one or more block-aligned boundaries, the keystream generator 350 may be re-invoked for the subsequent blocks with the data tweak 344 being increased by an amount equal to the block size each time that it is re-invoked. A suffix of the generated keystream 2351 may be unneeded and thus discarded. An XOR operation 352 may then be performed on keystream 351 and an encrypted input data block (or cache line) 346 selected from the memory location referenced by the decoded linear address 330. The granularity of the encrypted input data block 346 matches the keystream 351 output from of the keystream generator 350, and the XOR operation 352 produces a decrypted output data block 354. Likewise, when storing data back to cache/memory the same operations may be performed, where the plaintext data from a processor register may be XORed with the keystream output 351 for the encoded address (which is the data tweak 344) and the resulting encrypted data written back to memory.

Figure 4A:
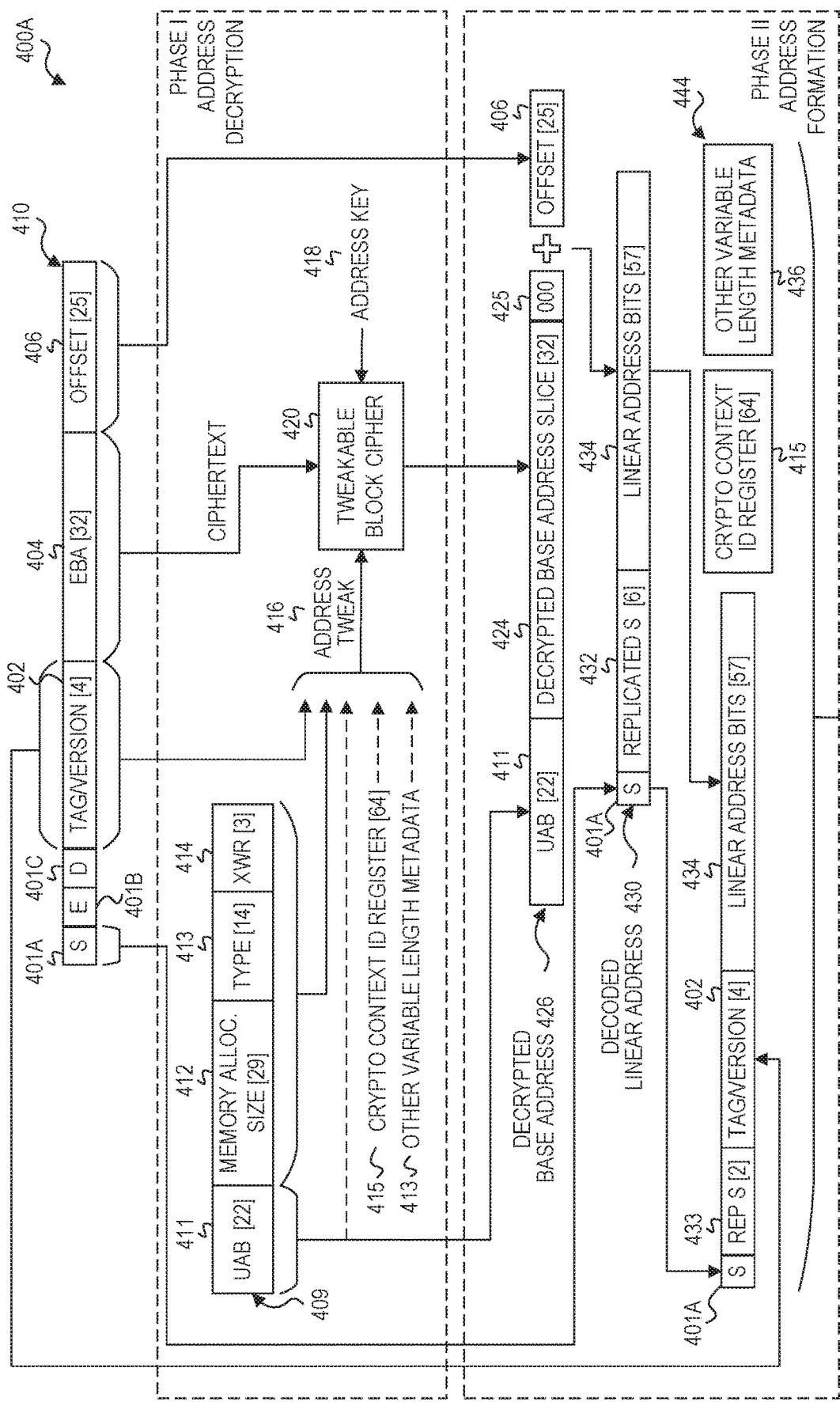
FIGS. 4A-4B show a flow diagram illustrating a process another encoded pointer to encryption of data referenced by that pointer according to at least one embodiment.
Figure 4B:
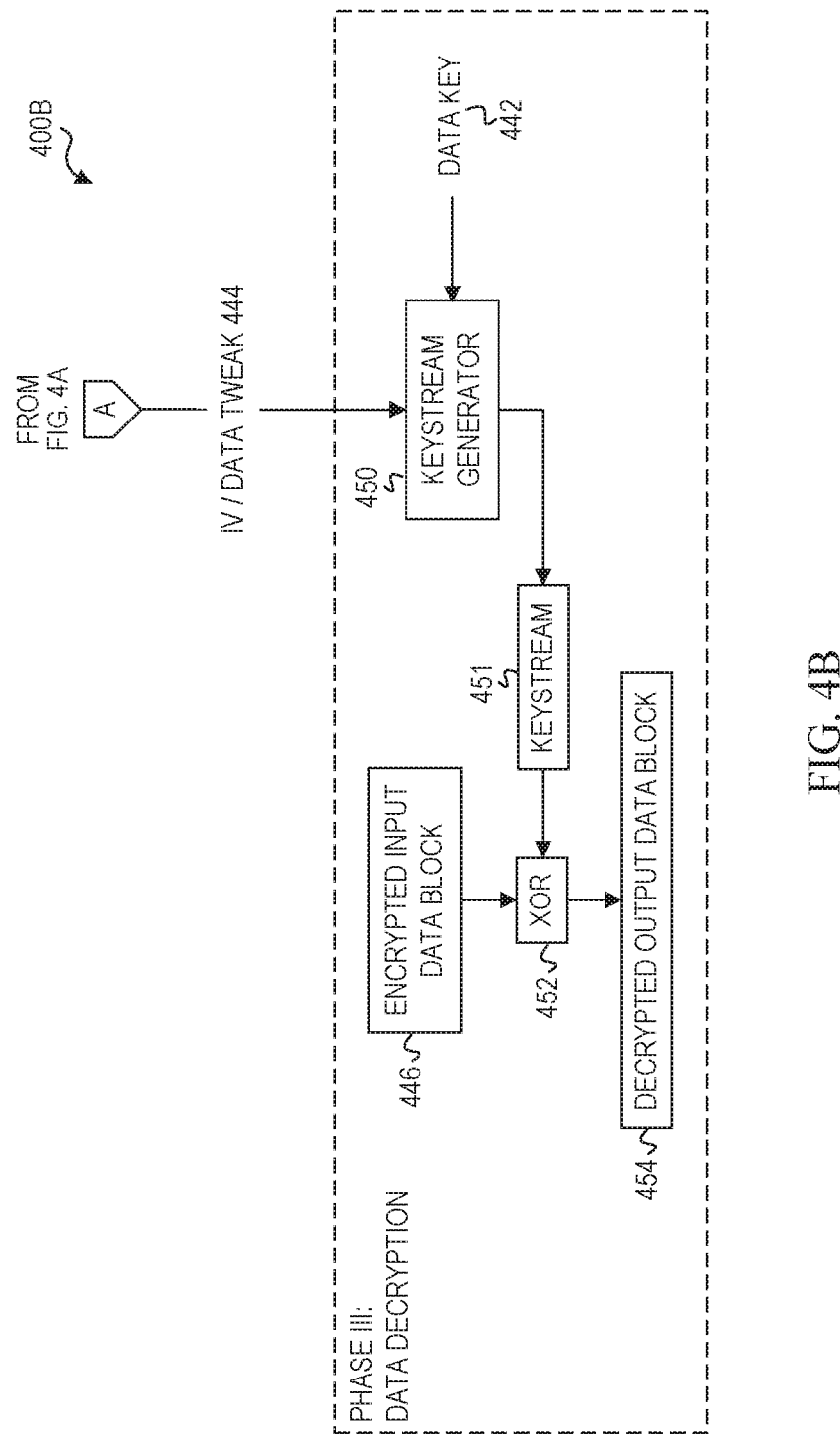

FIGS. 4A-4B show a flow diagram illustrating an example process 400 of cryptographic computing based on embodiments of a pointer 410, which is cryptographically encoded with a linear base address. Process 400 illustrates obtaining (e.g., reading, loading, fetching) data that is referenced by cryptographically encoded pointer 410, where encryption and decryption of the data is bound to the contents of the pointer. At least some portions of process 400 may be executed by hardware, firmware, and/or software of the computing device 100.

In the example shown, pointer 410 is embodied as a cryptographically encoded 64-bit pointer 410 (address) in an encrypted base address (EBA) format (also referred to herein as "EBA pointer"). In the example shown, the EBA pointer includes reserved bits (e.g., a supervisor bit (S-bit) 401A, an encoded indicator bit (E-bit) 401B, a dynamic context lookup bit (D-bit) 401C), a 4-bit tag/version portion 402, a 32-bit encrypted base address (EBA) portion 404, and a 25-bit offset portion 406. With typical canonical encoding, the bits that are adjacent to the most significant bit, and that are not part of the encoded address, have the same value as the most significant bit in order to be considered canonical (e.g., conventional or non-cryptographically encoded pointers). In a 64-bit register used for 57-bit paging, the most significant seven bits are not used as part of the 57 address bits. In an embodiment of EBA pointer 410, the seven most significant bits can include three upper bits 401A-401C and four bits in tag/version portion 402.

Two upper bits (e.g., 401A, 401B) of a pointer can be encoded to indicate that the pointer is a cryptographically encoded pointer rather than a conventional pointer, so that both types of pointers can potentially be used in a single address space. For example, the supervisor bit 401A is used to indicate whether the encoded linear address is in the supervisor address space (e.g., "1") or within the user mode address space (e.g., "0"). The encoded indicator bit 401B can indicate whether the pointer is a cryptographically encoded pointer or a legacy pointer (i.e., not cryptographically encoded). For example, the encoded indicator bit 401B can be set to the opposite value of the supervisor bit 401A to indicate that the pointer is cryptographically encoded or can be set to the same value of the supervisor bit 401A to indicate that the pointer is not cryptographically encoded. In other embodiments, the upper bits 401A and 401B may not be used. Instead, the legacy encoding could be achieved without dedicated bits by encoding special values in the tag/version portion 402 (e.g., all 1s, all 0s) to indicate that the pointer is not cryptographically encoded. These special values (i.e., all 1s, all 0s) are the legacy non-canonical encodings for the upper linear address bits between user and supervisor space. Any other values in the tag/version portion can indicate that the pointer is encoded as a cryptographically encoded pointer with a tag/version portion. Thus, both types of pointers (e.g., conventional and cryptographically encoded with a tag/version portion) can potentially be used in the same address space. In yet other embodiments, legacy encoding may be eliminated entirely if, for example, the concepts are not implemented to be compatible with legacy programs. The optional dynamic context lookup bit 401C can be used to indicate how context information is to be obtained for use in an address tweak to decrypt the encoded linear base address slice in the pointer and/or in a data tweak to decrypt the encrypted data. For example, the dynamic context lookup bit 401C can indicate whether the context information is to be obtained statically (e.g., in registers, embedded in code) or dynamically (e.g., in memory). This feature is optional, however, and in at least some embodiments, the context information may be stored in a consistent location (e.g., storage structure in memory).

Tag/version portion 402 can be used in the address tweak and the data tweak, and can be a number or value that is unique to the memory allocation or memory region referenced by a particular valid pointer. In one example, tag/version portion 402 is a randomized string of bits (e.g., 4 bits or any other suitable size). In another example, tag/version portion 402 is a deterministic value such as a sequential number that is incremented by a predefined amount each time a pointer is generated for a particular memory allocation. Versioning may be implemented at any suitable granularity (e.g., by program, by particular linear address, etc.). The tag/version portion adds diversity to the encryption of an address tweak and/or a data tweak. However, the address encryption and data encryption may be sufficiently secure using the context information in the tweaks or using the context information and upper address bits in the tweaks, without the tag/version portion.

In EBA pointer 410, a linear base address of the data is encoded. A 64-bit pointer may not have enough space to encode the entire base address of the data. Therefore, a slice of the base address is encrypted and stored in the pointer. In this example, bits 3 through 34 of the base address are encrypted and compose the encrypted base address portion 404 of EBA pointer 410. The upper address bits (UAB) that are not embedded in pointer 410 are stored separately from the pointer. When decoding the pointer, the upper address bits can be pulled from a table entry associated with the data (or code), from a separate register, from an operand in the data access instruction, or from a register that covers multiple objects (or code segments). The remaining 25 bits in the pointer comprise an offset within the data. The offset specifies the number of bytes beyond the base address to which the pointer 410 is pointing. Typically, the offset portion 406 is initially set to zeros. It should be apparent, however, that instructions could be defined to initialize the offset portion 406 to any desired number based on particular needs and implementations. The offset may be manipulated by software, e.g. for pointer arithmetic or other operations. The encrypted base address portion 404 (e.g., 32 bits in the example shown) of the EBA pointer 410 may be encrypted with a small tweakable block cipher (e.g., SIMON, SPECK, or K-cipher at a 32-bit block size, or other variable bit size tweakable block cipher).

Context information 409 may also be used when encoding and decoding a pointer with an encrypted base address, such as EBA pointer 410. In at least one embodiment, context information 409 is one table entry that is stored separately from the pointer and that can be dynamically accessed to retrieve context information needed to encrypt or decrypt a slice of an encoded linear address and possibly data referenced by the linear address. In this example, context information 409 includes upper address bits (UAB) field 411, memory allocation size field 412, type field 413, and permission (XWR) field 414.

UAB field 411 includes the upper bits that are to be concatenated with the decrypted base address from the pointer 410. For example, the encrypted base address portion 404 may contain only 32 bits (encrypted) of the linear address (e.g., bits 3 to 34), the UAB field 411 in context information 409 may contain 22 bits, and the lowest three bits (bits 0-2) can be set to "0" to align the base address to an 8-byte boundary. The lowest three bits may not be encoded in the pointer. Once the encrypted base address portion 404 is decrypted, the bits in the UAB field 411 can be obtained from context information 409 stored in memory or from a register and concatenated with the decrypted base address slice. The lower three bits set to "0" may also be concatenated at the end of the address.

Context information may be embedded in code (e.g., in an instruction operand) or may be stored in memory. It should be noted that if larger registers (e.g., 128-bit register, 256-bit register, etc.) are used for the cryptographically encoded pointers, then the entire base address may be encoded in the pointer. For 64-bit registers, however, the encrypted base address portion (e.g., 404) may be too narrow to specify a complete base address. Consequently, upper address bits can be pulled from another storage location during a memory access request (e.g., load, store). In some scenarios, upper address bits may be stored in memory for example, with other context information. In other scenarios, upper address bits (e.g., 402) may be stored in a register, while some or all of the other context information is stored in memory. In this scenario, the UAB field 411 in context information 409 may be fixed to zero since the upper address bits to be concatenated with the decrypted base address slice can be supplied implicitly by a control register.

The memory allocation size field 412 can be encoded with the exact size of the data at the memory location referenced by pointer 410. The memory allocation size field 412 may be limited to 25 bits to match the width of the offset portion 406 in pointer 410. When a data access is being performed, the offset portion 406 in the pointer 410 can be checked by the processor to ensure that it does not exceed the value in memory allocation size field 412.

The type field 413 may contain fourteen bits and may be used for programming languages that specify different classes. In certain programming languages, an error can result by using a pointer to an object of a particular class to obtain data (or an object) of a different class and then attempting to treat the data based on the different class. Accordingly, type of data (e.g., object type) can be determined and stored as part of in context information 409 for a pointer when memory is allocated for the data and a pointer is generated. When the pointer is accessed in the program, the type information specified as part of context information 409 can be matched against an expected type ID specified in the program to mitigate type confusion vulnerabilities.

The permission field 414 may contain three permissions bits (XWR). This is a layer of permissions on top of the paging permissions such as read, write, and execute. Permissions can be determined based on an intersection operation performed on the paging permissions and the context permissions. For example, if the permission bits indicate that a pointer is only readable, then even if the page table says the memory that is mapped is writeable, then write access is going to be denied by the processor because the most restrictive permissions are chosen. In another example, if the context permissions indicate that memory is readable and writeable, but the page table says it is only readable, the write access could be denied.

Generally, the operations of process 400 are identified in three phases: address decryption (Phase I), address formation (Phase II), and data decryption (Phase III). In Phase I, the linear address embedded in pointer 410 is decrypted. Specifically, the EBA portion 404 of the encoded linear address is decrypted by a decryption algorithm such as a tweakable block cipher 420 using an address key 418 and an address tweak 416. The address tweak 416 can include bits of tag/version portion 402. Alternatively, the tag/version portion 402 may be encrypted as part of the EBA portion 404 as long as the tag/version portion 402 is not used in the address tweak. In this alternative embodiment, the block cipher would have a correspondingly larger block size to fit the tag/version portion, or a longer slice of upper address bits may be supplied from the context information. Whether encrypted or not, the tag/version portion 402 may be used in a data tweak for the data encryption. Additionally, one or more items of context information 409 may be included in the address tweak 416. For example, bits of memory allocation size field 412, type field 413, and permission field 414 from context information 409 can be included in address tweak 416. In further embodiments, the plaintext upper address bits 411 may also be used as part of address tweak 416. In yet further embodiments, a crypto context identifier register 415 may be used as part of address tweak 416. The crypto context identifier register 415 may contain a unique value (e.g., randomly or deterministically generated) associated with a particular functional group (e.g., processes, subset of processes, virtual machines (VM), subset of VMs, etc.). In at least some embodiments, an additional one or more items of variable length metadata 417 may also be used as part of address tweak 416 for the tweakable block cipher 420. For example, the variable length metadata may include other context information or metadata (e.g., privilege level, location, ownership, etc.) as previously described herein. The block cipher 420 may be any suitable decryption algorithm (e.g., XTS-AES block cipher, LRW, AES-CTR mode, etc.) as noted herein.

When the EBA portion 404 of the encoded linear address has been decrypted into a decrypted base address slice 424 by tweakable block cipher 420, then a decoded linear address 430 can be formed in Phase II. First, if the tag/version portion 402 was encrypted as part of the EBA portion 404, then the tag/version portion should be excluded from the decrypted base address slice 424 when forming the decoded linear address 430. Next, upper address bits 411 can be obtained from context information in a register (or from other storage as previously described herein) and concatenated to the decrypted base address slice 424. In at least some embodiments, base alignment bits 425 are concatenated with the decrypted base address slice 424 to form the least significant bits. This could also be accomplished by a left-shifting operation that performs an appropriate number of bit shifts. In this example, base alignment bits 425 include three bits. The base alignment bits 425 are set to zero in order to align the address to an 8-byte boundary. A decoded linear address 430 is formed by adding the offset in offset portion 406 of the pointer 410 to the decrypted base address 426 to obtain linear address bits 434. Also, the supervisor bit 401A may be replicated in the unused/non-canonical bits (e.g., adjacent six bits 432), and all unused/non-canonical bits are concatenated with the linear address bits 434. In some embodiments, it is the most significant bit of the linear address bits 434 that is replicated to fill the more significant bits in the decoded linear address 430.

The decoded linear address 430 is used to find the memory location of the encrypted data to be decrypted in Phase III. In addition, the decoded linear address 430 and the encoded pointer 410 can be used to create a data tweak 444 for decrypting the encrypted data. As shown in Phase II of FIG. 4A, data tweak 444 can include the tag/version portion 402 of the encoded pointer 410 and the linear address bits 434 of the decoded linear address 430. In addition, the S-bit 401A may be included and replicated as needed, for example, to fill any remaining unused/non-canonical bits 433. In addition, other context information may be included in data tweak 444. For example, the crypto context ID register 415 may be included in the tweak and/or any other variable length metadata 436 may also be included in the tweak. Variable length metadata 436 may include other context information or metadata (e.g., privilege level, location, ownership, type, permissions, memory allocation size, etc.) as previously described herein. It may be particularly advantageous for data tweak 444 to include the memory allocation size and linear address bits 434 combined with one or more of the following: (1) type; (2) tag/version; (3) type and tag/version; (4) crypto context ID; or (5) crypto context ID and permission level. Using the plaintext linear address bits 434 in the IV/data tweak 444 rather than encrypted pointer bits, e.g., EBA 404, enables multiple pointers with different bounds, permissions, or other metadata to simultaneously reference the same allocation and to all correctly encrypt and decrypt data such that it can be accessed using any pointer in that group. Metadata that is not permitted to vary within groups of pointers that may be used simultaneously to access the same memory may be included in IV/data tweak 444, since including metadata that is permitted to vary within that group may cause data to be incorrectly decrypted when accessed using some pointer in that group if it was previously encrypted using another pointer in that group with differing metadata that is included in IV/data tweak 444.

In some embodiments, it may be advantageous to add a copy of the decrypted base address 426 (or the decrypted base address slice 424) as part of the data tweak 444. To illustrate the advantages of this approach, consider sequential overlapping memory allocations where an object A is allocated and freed, and subsequently, an object B is allocated at an overlapping location. Even though the two allocations overlapped at separate times, but with different base addresses having the same tag/version, using a dangling pointer to the overlapping memory location will not enable correct decryption of even the overlapping parts of the object B since they have different base addresses.

The encrypted data obtained by the decoded linear address 430, is decrypted in Phase III shown in FIG. 4B. The data decryption may commence once the data key 442 becomes available and the IV/data tweak 444 has been computed, which may require waiting for EBA 404 to be decrypted. The encrypted data is decrypted by a decryption algorithm such as keystream generator 450. In at least one embodiment, keystream generator 450 can be implemented as an AES-CTR mode block cipher, at a particular size granularity (any suitable size). In this embodiment, the data tweak 444 (or initialization vector) for the keystream generator 450 is derived from the decoded linear address 430 (e.g., linear address bits 434, supervisor bit 401A, two replicated bits 433) and from the encoded pointer (e.g., tag bits of tag/version portion 402). Data tweak 444 may additionally include external context information (e.g., crypto context ID register 415 and/or other variable length metadata 436).

Keystream generator 450 encrypts the data tweak 444 based on data key 442 to generate a keystream 451. The value of data tweak 444 may be adjusted to be congruent to 0 (modulo the block size of the keystream generator 450) prior to being used as an input to the keystream generator. The value of the data tweak 444 may have some suitable number of least significant bits set to 0 to satisfy this requirement and a prefix of the keystream 451 may be discarded to account for that adjustment. The number of bytes of the keystream 451 to discard may be computed by subtracting the adjusted value of the data tweak 444 from the unadjusted value of the data tweak 444. If the memory to be encrypted crosses one or more block-aligned boundaries, the keystream generator 450 may be re-invoked for the subsequent blocks with the data tweak 444 being increased by an amount equal to the block size each time that the keystream generator 450 is re-invoked. A suffix of the generated keystream 451 may be unneeded and thus discarded. An XOR operation 452 is then performed on the keystream 451 and an encrypted input data block (or cache line) 446 selected from the memory location referenced by the decoded linear address. The granularity of the encrypted input data block 446 matches the keystream 451 output from the keystream generator 450, and the XOR operation 452 produces a decrypted output data block 454.

Figure 5:
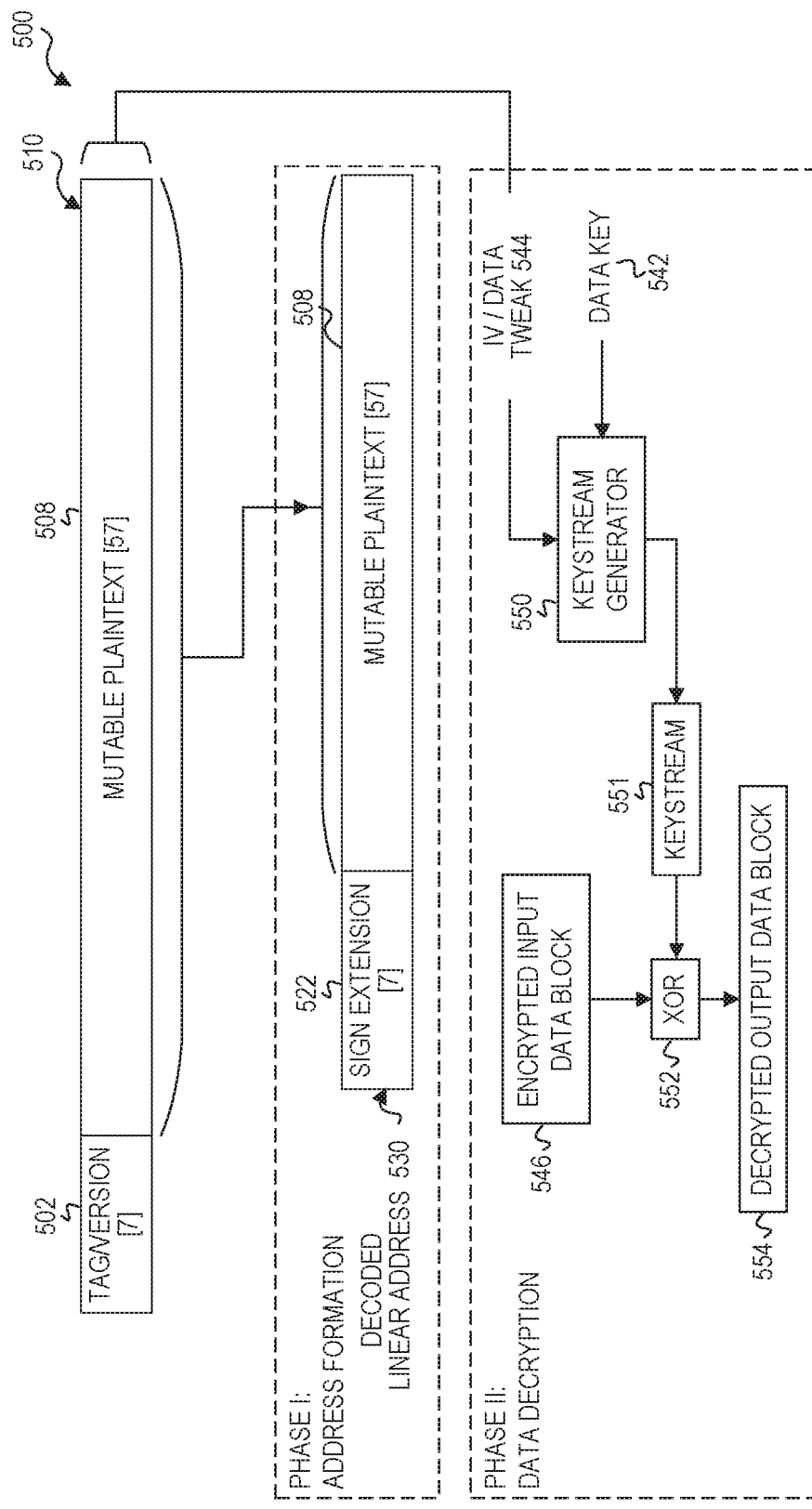
FIG. 5 is flow diagram illustrating a process of binding yet another encoded pointer to encryption of data referenced by that pointer according to at least one embodiment.

FIG. 5 is a flow diagram illustrating an example process 500 of obtaining data referenced by another embodiment of a pointer 510, which is encoded with a linear address of a memory location. Process 500 illustrates obtaining (e.g., reading, loading, fetching) data that is referenced by cryptographically encoded pointer 310, where encryption of the data is bound to the contents of the pointer. At least some portions of process 500 may be executed by hardware, firmware, and/or software of the computing device 100. In the example shown, pointer 510 is embodied as a 64-bit encoded linear address including a 7-bit tag/version portion 502 and a 57-bit mutable plaintext address portion 508. Tag/version portion 502 can comprise temporal safety bits, which are randomly generated each time a pointer is encoded for a requested memory allocation. Alternatively, tag/version portion 502 can comprise a version number or any deterministically unique value for a requested memory allocation. For example, a tag/version portion 502 may be a sequentially incremented number that is generated each time a pointer is encoded for a requested memory allocation. Although either approach may be used, in this embodiment in which none of the address bits are encrypted, a tag with randomly generated bits may provide greater protection against an attack as randomly generated bits are more difficult to determine than deterministically different values such as sequentially incremented numbers. For other embodiments disclosed herein, in which a portion of the address is encrypted, a version may be more desirable as the encryption provides protection against an attack, and the version number uses less resources to generate.

It should be noted that the tag/version portion 502 and address portion 508 may be configured with different numbers of bits (e.g., 5-bit tag/version portion and 59-bit address portion 508, etc.). In other embodiments, additional bits may be encoded to allow encoded pointer 510 to be used concurrently with legacy pointers. For example, encoded pointer could be allocated with a 2-bit reserved portion, 5-bit tag/version portion, and 57-bit plaintext address portion. In this embodiment, the 2-bit reserved portion can be designated as a supervisor bit and an encoded bit indicator. The supervisor bit can indicate whether the address is located within the supervisor address space (e.g., "1") or within the user mode address space (e.g., "0"). The encoded bit indicator can be set to the opposite value of the supervisor bit to indicate that the pointer is encoded (e.g., with tag/version bits) or can be set to the same value of the supervisor bit to indicate that the pointer is not encoded. In other embodiments, the legacy encoding may be achieved without dedicated bits. Instead, legacy encoding can be achieved by encoding particular values in the tag/version portion 502 (e.g., all 1s, all 0s). In yet other embodiments, legacy encoding may be eliminated entirely if, for example, the concepts are not implemented to be compatible with legacy programs.

Generally, the operations of process 500 are identified in two phases: address formation (Phase I), and data decryption (Phase II). Process 500 does not include an address decryption phase because the encoded linear address is not encrypted. Instead, the linear address is encoded in the pointer as mutable plaintext address portion 508.

In Phase I, a decoded linear address 530 can be formed from the encoded pointer 510. In at least one embodiment, the uppermost bits 522 (tag/version portion 502) that are not part of the linear address can be set to the same bit value (e.g., 0 or 1). The bits of the mutable plaintext address portion 508 make up the lower bits of the decoded linear address 530.

The decoded linear address 530 is used to find the memory location of the encrypted data to be decrypted in Phase II. The encrypted data is decrypted by a decryption algorithm such as keystream generator 550. In at least one embodiment, keystream generator 550 can be implemented as an AES-CTR mode block cipher, at a particular size granularity (any suitable size). In this embodiment, the contents of the encoded pointer are used as the initialization vector (IV) or data tweak 544. In particular, the randomly or deterministically generated bits of tag/version portion 502 concatenated with the bits of plaintext address portion 508 form the data tweak (or IV) for decrypting the encrypted data. Keystream generator 550 encrypts data tweak 544 based on a data key 542 to generate a keystream 551. An XOR operation 552 is then performed on keystream 551 and an encrypted input data block (or cache line) 546 selected from the memory location referenced by the decoded linear address 530. The granularity of the encrypted input data block 546 matches the keystream 551 output from of the keystream generator 550, and the XOR operation 552 produces a decrypted output data block 554. Additionally, in some embodiments, other context information could also be used in the data tweak 544 including, for example, memory allocation size, type, permissions, privilege level, location, ownership, crypto context ID register, or any combination thereof.

It should be noted that that descriptions of the various embodiments of encoded pointers (e.g., 210, 310, 410, 510), illustrate processes involving memory accesses to obtain (e.g., read, fetch, load, move, etc.) encrypted data from cache/memory. Likewise, when storing data back to cache/memory the same operations may be performed, where the plaintext data from a processor register may be XORed with the keystream output (e.g., 251, 351, 451, 551) for the data tweak (e.g., 244, 344, 444, 544) and the resulting encrypted data written back to memory. Additionally, for ease of illustration, the descriptions of the cryptographic computing processes (e.g., 200, 300, 400, 500) illustrate pointers to data; however, the concepts presented herein are also applicable to code. Accordingly, pointers 210, 310, 410, 510 may reference code or data stored in memory/cache, and processes 200, 300, 400, and 500 may be used to cryptographically bind a pointer to the code it references. Furthermore, as previously noted herein, although several different embodiments of encoded pointers (e.g., 310, 410, and 510) are illustrated and described with reference to 64-bit memory addressing, such embodiments, and variations thereof, may be adapted to any address range an alternate architecture may require (e.g., 32-bit, 128-bit, 512-bit, etc.). In particular, the field sizes and formatting may be adjusted to accommodate a larger or smaller pointer format, field positions may change, field positions be swapped, formatting may change, etc., all of which are included within the broad concepts of this disclosure.

Generally, a cipher selected for encryption in the embodiments described herein, can be implemented in hardware, using an algorithm that has a bit-selectable or otherwise variable block size (e.g., any block cipher or similar diffusion algorithm with appropriate block sizes that may be constructed to utilize a tweak), or an algorithm that allows a fixed block size with a tweak using the remaining unencrypted bits (e.g., the extra bits outside the fixed block size). A cipher that has a bit-selectable block size may accept as an input (in some cases, along with the plaintext to be encrypted) a bit-length parameter that specifies how many bits of the plaintext are to be encrypted. In some cases, the bit-length parameter specifies the same number of bits that are in the plaintext, and in other cases, the bit-length parameter specifies a number of bits in the plaintext less than the length of the entire plaintext. The cipher encrypts the plaintext bits using an encryption key (which may be of the same or different length from the bit-length parameter). In cases where the encryption key is longer than the bit-length parameter, a subset of the bits of the key equal to the bit-length parameter may be used in the cipher. The cipher encrypts as many bits from the plaintext as specified by the bit-length parameter using a sequence of logical operations that include at least two logical AND operations and two logical XOR operations. Each of the operations is performed both on the bits of the plaintext and on the bits of the key; that is, each of the operations is performed on at least one plaintext bit and at least one key bit. In this manner, both confusion and diffusion between the plaintext and the ciphertext may be achieved. This bit-length parameterizable cipher according to the present disclosure may be referred to as a K-cipher.

A K-cipher may also be configured to receive a tweak input so that encryption (and decryption) is based on the encryption key and the tweak input. For example, the tweak input may be added to a certain number of round keys in a key schedule generated by the K-cipher. The tweak input may have the same length as the round keys and may be configured in any suitable manner, including tweak inputs that are described herein with reference to various embodiments.

Figure 6:
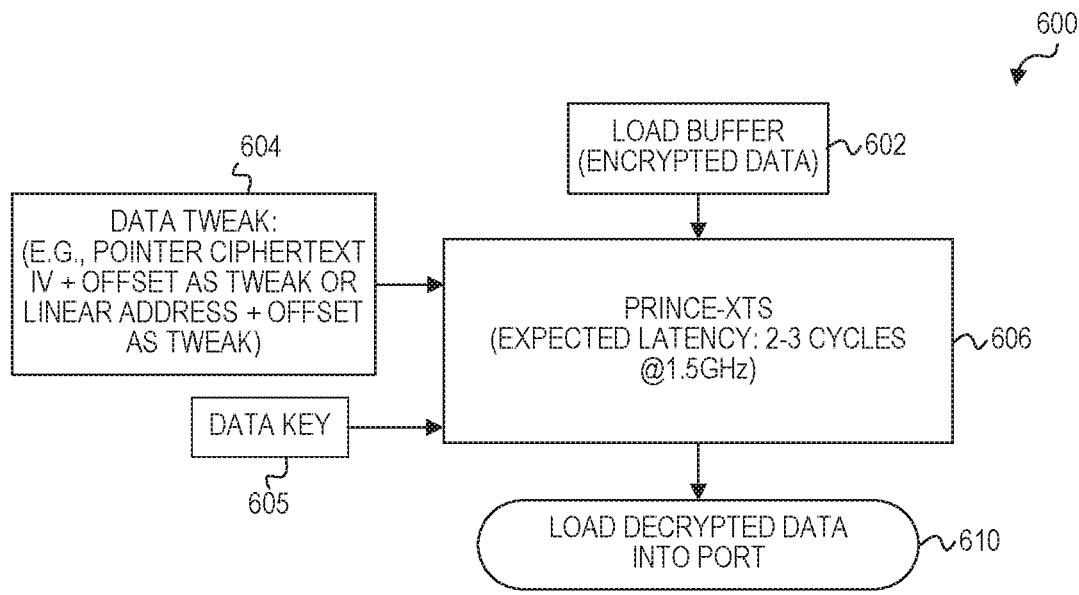
FIG. 6 is a block diagram of an XEX-based Tweaked CodeBook Mode with ciphertext stealing (XTS) block cipher that may be used for encryption and decryption according to at least one embodiment.

FIG. 6 illustrates a data decryption flow 600 using another block cipher known as an Advanced Encryption Standard (AES) XEX-based tweaked codebook mode with ciphertext stealing (XTS-AES). The data decryption flow 600 decrypts data that is referenced by an encoded pointer, such as encoded pointers 310, 410, and 510. AES is a block cipher that operates on blocks (e.g., fixed-length groups of bits) of data. The XTS-AES algorithm is a mode of operation of the AES algorithm. XTS-AES is a tweakable block cipher that performs an XTS-AES encryption procedure and an XTS-AES decryption procedure using the same secret data key and the same data tweak. For example, a Prince-XTS block cipher 606 can perform encryption of data based on a data tweak 604 and a secret data key 605 and can also perform the counterpart decryption of the encrypted data using the same data tweak 604 and the same data key 605.

With reference to decryption flow 600, after data is encrypted by Prince-XTS block cipher 606, when the encrypted data is subsequently accessed by software (e.g., load or store instructions, etc.), the encrypted data is loaded in a buffer at 602 and fed into Prince-XTS block cipher 606. Data tweak 604 and data key 605 are also input to the block cipher 606. Data tweak 604 can include any suitable tweak (e.g., 344, 444, 544) based on the particular encoded pointer used to reference the data. For example, a data tweak for pointer 310 can include a ciphertext portion (e.g., 304) and an offset (e.g., 306 and 308), and a data tweak for pointer 410 can include at least a portion of the decoded linear address (e.g., 430) with an offset. The block cipher 606 decrypts the encrypted data using the data tweak 604 and the data key 605, which can involve full diffusion and confusion. The decrypted data can be loaded into a port at 610 for use by the software.

Figure 7:
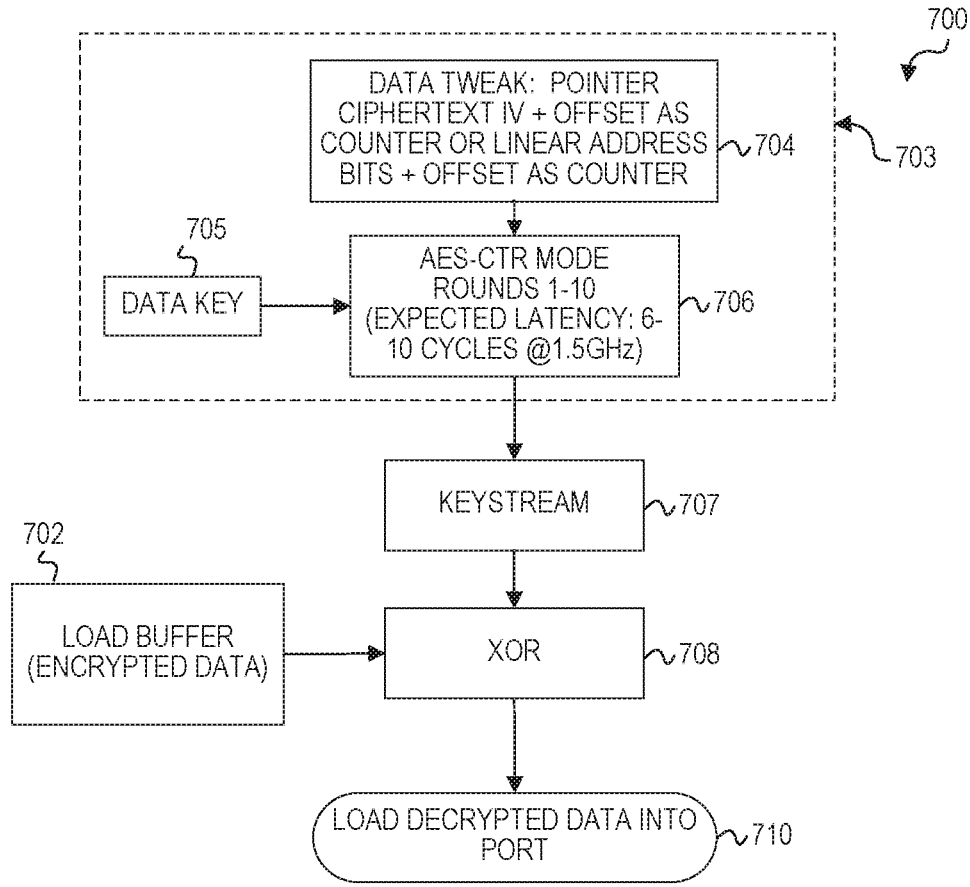
FIG. 7 is a block diagram of an Advanced Encryption Standard (AES) counter mode block cipher that may be used for encryption and decryption according to at least one embodiment.

FIG. 7 illustrates a data decryption flow 700 using yet another block cipher known as an Advanced Encryption Standard (AES) counter mode (AES-CTR). Decryption flow 700 illustrates decryption of encrypted data that is referenced by a cryptographically encoded pointer, such as pointer 310 or 410. An AES-CTR algorithm is a mode of operation of the AES algorithm. AES-CTR is a block cipher that can be used in an AES-CTR mode encryption procedure and an AES-CTR mode decryption procedure using the same secret data key and the same data tweak. For example, in an AES-CTR mode encryption procedure, an AES-CTR block cipher encrypts a data tweak based on a secret data key to create a keystream that then encrypts a block of data using an XOR operation. In a counterpart AES-CTR decryption procedure, the AES block cipher encrypts the same data tweak based on the same secret data key to create the keystream that then decrypts the corresponding block of encrypted data using an XOR operation.

In an example, prior to decryption flow 700 being invoked, data is encrypted in an AES-CTR mode encryption procedure. In the AES-CTR mode encryption procedure, an AES-CTR mode block cipher 706 encrypts a data tweak/initialization vector (IV) 704 based on a secret data key 705 to create a keystream 707. The keystream 707 is used in an XOR operation 708 to encrypt a block of data. This may be performed for multiple blocks of data with AES-CTR block cipher 706 encrypting a new data tweak for each block of data to be encrypted. The new data tweak may be computed by incrementing a counter in the data tweak.

The counter (or tweak/IV) 704 can include any suitable tweak (e.g., 344, 444, 544) based on the particular encoded pointer used to reference the data. For example, a counter (or data tweak/IV) for pointer 310 may include a ciphertext portion (e.g., 304) and an offset (e.g., 306 and 308), a counter (or data tweak/IV) for pointer 410 may include at least a portion of the decoded linear address (e.g., 430) with an offset added, a counter (or data tweak/IV) for pointer 510 may include the plaintext linear address (e.g., 508) with an offset included.

After the AES-CTR mode encryption procedure is completed and encrypted data is generated, decryption flow 700 may be invoked when the encrypted data is accessed by software (e.g., load or store instructions, etc.). In the decryption flow 700, the encrypted data generated by the AES-CTR mode encryption procedure is loaded into a buffer at 702. The AES-CTR mode block cipher 706 encrypts the same data tweak 704 based on the same secret data key 705 to create the keystream 707. The keystream 707 is used in the XOR operation 708 to decrypt the corresponding block of encrypted data that was previously generated by the AES-CTR mode encryption procedure. This may be performed for each block of encrypted data using a new data tweak (e.g., computed by incrementing the counter in the data tweak) for each block. The decrypted data can be loaded into a port at 710 for use by the software.

It should also be noted that in some embodiments, operations indicated at 703 may be performed in parallel to operations to obtain encrypted data to be decrypted. The operations for obtaining the encrypted data include decoding a cryptographically encoded pointer to form a linear base address and using the linear base address to locate and retrieve the encrypted data. The encrypted data may then be stored in the buffer at 702. Also, it should be further noted that the block ciphers shown and described with reference to FIGS. 6-7 could also be adapted to perform cryptographic operations on linear base addresses (e.g., a slice of a linear base address) that are formed into cryptographically encoded pointers (e.g., 310, 410). Additionally, the cryptographic operations described with reference to data in FIGS. 6 and 7 are also applicable to code referenced by an encoded pointer, and cryptographically bound to the encoded pointer.

Generally, when encrypting/decrypting data, it is advantageous to avoid using the same tweak/IV for every block of data within a given allocation. Thus, a value in the tweak/IV varies depending on the position of the particular block being processed. In certain block ciphers, such as AES-CTR mode (e.g., 706), an initialization vector (IV) embodies this concept as it is transformed (e.g., incremented) when generating subsequent blocks of a keystream. However, embodiments herein allow software to access any block of an allocation from any memory access instruction. Thus, the relative offset of the access has to be incorporated in the tweak/IV. Incorporating an offset of the linear address encoded in the pointer is one possible way to achieve this in various embodiments using offsets, which are described herein.

Figure 8:
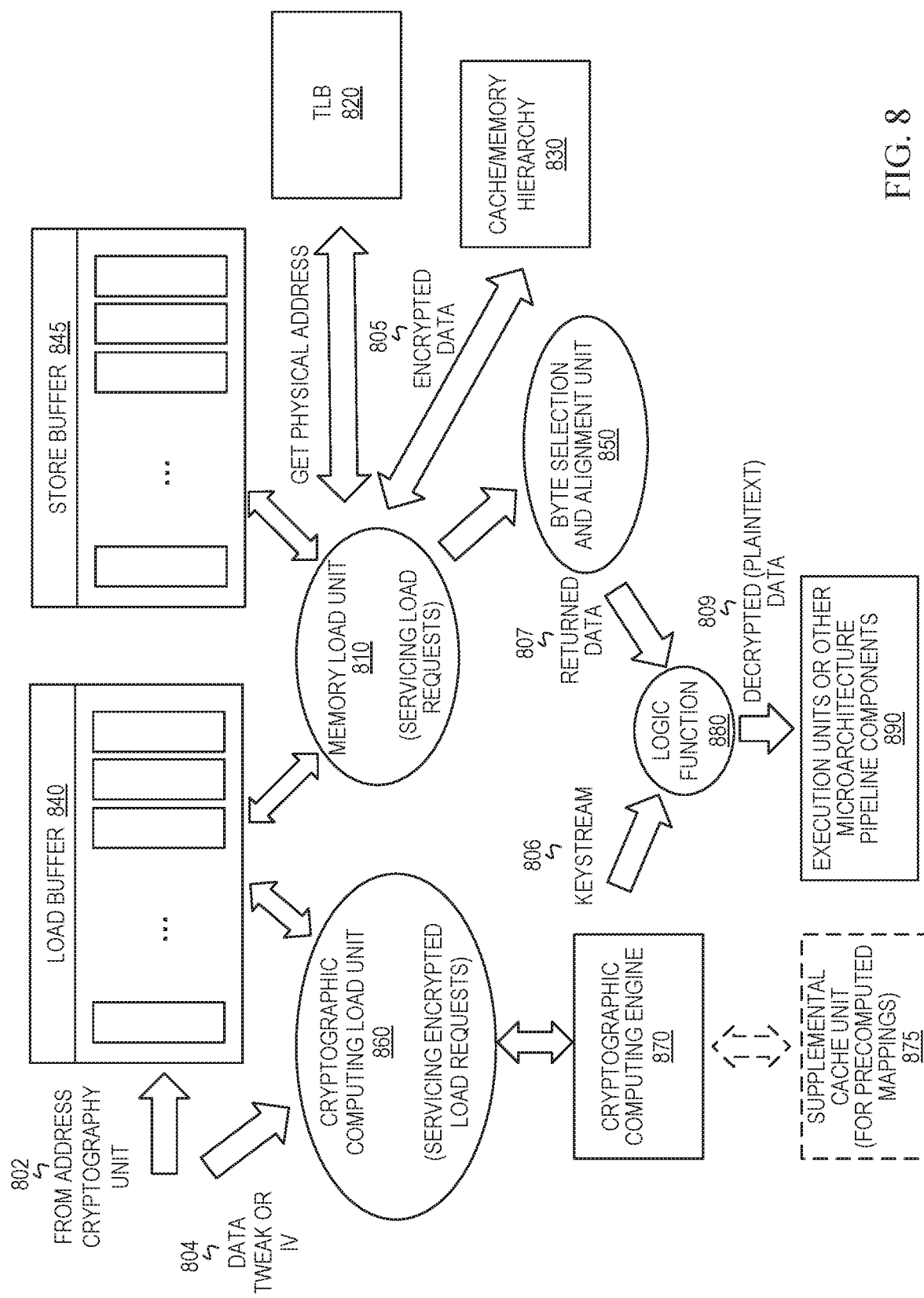
FIG. 8 is a simplified block diagram illustrating an example memory load system for cryptographic computing with parallel operations according to at least one embodiment.

FIG. 8 illustrates a memory load system 800 for cryptographic computing where encryption and decryption of data or code are bound to the contents of an encoded pointer. Memory load system 800 illustrates one or more memory access operations (e.g., load, read, move, fetch, etc.) being performed, at least partly, in parallel with one or more data or code decryption operations. Any one of the encoded pointers (or variations thereof) described herein may be used in memory load system 800. For ease of illustration and description only, memory load system 800 of FIG. 8 will be described with reference to encoded pointers for data. It should be noted however, that memory load system 800 may also be implemented for encoded pointers to code, which may be configured like any of the encoded pointers (or variations thereof) described herein (e.g., 210, 310, 410, 510, etc.).

Memory load system 800 may comprise one or more components (e.g., hardware, software, and/or firmware) as shown and described with reference to computing device 100 for performing operations depicted in FIG. 8. In at least one embodiment, memory load system 800 can include a load buffer 840, a store buffer 845, a memory load unit 810, a cryptographic computing load unit 860, a cryptographic computing engine 870, and an optional supplemental cache unit 875. These components may be the same or similar to load buffer 182, store buffer 184, memory load unit 150, cryptographic computing load unit 172, cryptographic computing engine 170, and supplemental cache unit 187, respectively, of computing device 100. Memory load system 800 may also include a translation lookaside buffer (TLB) 820, which may be implemented as a data translation lookaside buffer (dTLB) (e.g., 186A) and a shared translation lookaside buffer (sTLB) (e.g., 186B) in at least one embodiment. Memory load system 800 may further include a cache/memory hierarchy 830, which can include both on-chip memory and off-chip memory (e.g., data cache unit 188, L2 cache unit 189, main memory 120, etc.). Additional components of memory load system 800, which are not shown in computing device 100, may include a byte selection and alignment unit 850 and execution units or other microarchitecture pipeline components 890.

Memory load system 800 illustrates memory access operations and data decryption operations being performed at least partly in parallel when an encoded pointer (e.g., 210, 310, 410, 510) to data is used in a memory access instruction. Some operations shown in FIG. 8 can be performed before an address cryptography unit 802 has fully decoded the encoded pointer to reveal a decoded (plaintext) linear address.

At 802, a decoded linear address (e.g., 230, 330, 430, 530) generated from an encoded pointer in an operand of a memory access instruction is received by load buffer 840 from an address cryptography unit. Load buffer 840 can also receive and store a size of the memory access request, an identifier (ID) of the memory access instruction, and context information associated with the encoded pointer. The context information in the load buffer 840 may contain metadata encoded in the pointer and, in some embodiments, additional external context information. Once a keystream is generated, it may also be stored in load buffer 840. Once the requested data is retrieved by memory load unit 810, it may be stored in load buffer 840. If the retrieved data is encrypted, then once it is decrypted, the decrypted data may be stored in load buffer 840. In one or more embodiments, the data may be indexed in the load buffer by the encoded pointer.

In some embodiments, a cryptographic computing state buffer, such as cryptographic computing state buffer 185 shown in computing device 100, may be provisioned in memory load system 800 to hold some of the information associated with the memory access instruction (e.g., the encoded pointer, context information encoded in the pointer, additional context information not encoded in the encoded pointer, and a keystream generated to decrypt the encrypted data). The cryptographic computing state buffer may contain state information associated with memory access instructions and which could otherwise be stored in load buffer 840. In other embodiments, the cryptographic computing state buffer may contain state information that is associated with memory store instructions and which could otherwise be stored in store buffer 845. In yet further embodiments, the cryptographic computing state buffer may contain both state information that is associated with memory access instructions and state information that is associated with memory store instructions.

Cryptographic computing load unit 860 and memory load unit 810 may perform, respectively, data decryption operations and memory access operations at least partly in parallel. Memory load unit 810 may perform the memory access operations by servicing load requests from load buffer 840. Cryptographic computing load unit 860 is responsible for generating a keystream, which can be used to decrypt the encrypted data. Cryptographic computing load unit 860 can receive an encoded pointer or portions of the encoded pointer and possibly other information (e.g., context information from load buffer 840, etc.) to be used to form a data tweak (or initialization vector (IV)) 804 from the AGU (e.g., 802), or from load buffer 840. The data tweak is derived, at least in part, from the encoded pointer and therefore, may vary depending on the particular encoded pointer embodiment. For example, the data tweak/IV 804 may be embodied as the encoded pointer itself (e.g., 344, 544) or portions of the encoded pointer. In other embodiments, the data tweak/IV 804 may be a combination of various information (e.g., 444) such as context information stored in the encoded pointer, a portion of the decoded linear address, other context information not stored in the encoded pointer, and/or a crypto context ID register.

Cryptographic computing load unit 860 obtains a data key for encrypting the data tweak/IV 804. Once the data key is available, cryptographic computing load unit 860 invokes cryptographic computing engine 870, which is placed into the pipeline to encrypt the data tweak/IV and produce a keystream 806 representing the encrypted data tweak/IV. In one or more embodiments of memory load system 800, cryptographic computing engine 870 may be implemented as a counter mode block cipher (e.g., AES-CTR) to enable the keystream to be computed at least partially in parallel with retrieving the encrypted data from memory/cache hierarchy 830.

While the data decryption operations to produce the keystream are being performed, memory access operations may also be performed. Memory load unit 810 services load requests and can receive the decoded linear address from load buffer 840, which is to be used to fetch the encrypted data from cache/memory 830. Memory load unit 810 can first get the physical address corresponding to the decoded linear address by performing a TLB lookup in TLB 820. Once the physical address is obtained, it can be used to fetch the data from the cache/memory hierarchy 830. If the data has been accessed recently or if the processor anticipated the memory access request for the data, then the data may be stored in cache closer to the processor. Otherwise, the data may be stored in other memory, such as main memory, which can take longer to access. Once encrypted data 805 is retrieved from cache/memory hierarchy 830, the byte selection and alignment unit 850 may be used to select the correct bytes of the data to be decrypted by the keystream. This may be needed, for example, when a memory access reads just a portion of one or more cachelines so that the values of other bytes within those cacheline(s) are not included in the decryption.

In at least some embodiments, memory load unit 810 may check for special inline indicators when reading ciphertext. For example, an indicator value may be defined for memory blocks that should cause an exception to be generated when such a block is read, where a memory block is one that is aligned to a cryptographic block boundary. For example, providing a special indicator value for blocks that should fault on reads may be useful for detecting buffer overflows and underruns, since software may place those values between allocations. Software may also fill freed allocations with those values to detect accesses through dangling pointers. When the memory load unit 810 encounters a ciphertext block set to the indicator value for a memory block that should fault on loads and stores, it may generate an exception. Although a real ciphertext data value could potentially collide with a special indicator value, such occurrences are likely to be rare, since actual encrypted data should typically be random independent and identically-distributed ciphertext. The software exception handler can detect whether the faulting access is within the bounds of a valid allocation, e.g., by checking the heap allocator's data structures, and then instruct the processor to treat the ciphertext block as actual ciphertext rather than a special inline indicator. The exception handler can invoke a userspace routine in the allocator to check its data structures. For example, the allocator may place a chunk header prior to each allocation to indicate its size, and it can jump over each allocation in turn based on the value of the chunk header until it reaches the location of the attempted access. If the access is within an active allocation with a valid chunk header, then the allocator may indicate to the operating system that the access should be allowed. In some embodiments, the operating system can set a new "ignore special indicator value" flag, e.g., in an MSR, to treat the colliding value as actual ciphertext, as well as a flag to single-step the program. The operating system may then resume the program to re-attempt the faulting instruction. In this scenario, the operating system treats the memory block as ciphertext rather than a special indicator value and decrypts the memory block to produce a decrypted value of the memory. The operating system may then be invoked after the access has been completed. The operating system may then clear the "ignore special indicator value" flag as well as the flag for single-stepping the program and resume the program. If the allocator indicates that the access is not within a valid allocation, then the operating system can react appropriately, e.g., by terminating the program.

Once the keystream 806 is generated and returned data 807 is available, then logic function 880 may perform one or more logic operations to merge the keystream 806 and returned data 807 to produce decrypted data 809. In one or more embodiments, the logic function 880 can include a single exclusive-OR (XOR) operation (e.g., 352, 452, 552). In other embodiments, however, logic function 880 may be a complex logic function with a plurality of logic operations. The plurality of logic operations may include (but is not necessarily limited to) exclusive-OR (XOR) operation(s), AND operation(s), NOT-AND (NAND) operation(s), NOT-OR (NOR) operation(s), inverter operation(s), or any suitable combination thereof. The decrypted data 809 produced by the logic function 880 can be loaded, read, re-encrypted or otherwise manipulated by software as needed. Accordingly, decrypted data 809 may be fed into execution units or other microarchitecture pipeline components 890.

In one or more embodiments, a shortcut optimization may be provided between the load buffer 840 and the store buffer 845 to fetch encrypted data requested in a memory access instruction. The store buffer 845 stores entries containing data to be stored in memory (or cache). Each entry may be indexed (or otherwise mapped to) an encoded pointer corresponding to the memory location where the data in that entry is to be stored. In memory load system 800, when a load request is made, memory load unit 810 determines whether the requested data is stored in an entry of the store buffer, waiting to be stored back to memory. This determination can be made by the memory load unit 810 using the encoded pointer obtained from the load buffer 840 (or a separate state buffer) to perform a look-up on the entries of the store buffer 845. If a match is found, then the data in the entry of the store buffer 845 that corresponds to the encoded linear address can be loaded into the load buffer 840 directly from the store buffer 845. Thus, the memory load unit 810 can avoid having to wait for the store to complete and then fetching the data from memory, which is significantly more time consuming and less efficient.

In some embodiments, the look-up performed on the store buffer 845 can be performed in two parts. Initially, the look-up can identify a partial match in the store buffer. For example, a designated number of least significant bits (e.g., eleven bits in some embodiments) in the encoded linear address obtained from the load buffer 840 can be used by the memory load unit 810 to search the encoded pointers in the store buffer 845. If a match is found (e.g., eleven least significant bits of an encoded pointer match the eleven least significant bits of the encoded pointer), then a full match can be performed to confirm the identified encoded pointer matches the encoded pointer from the memory access instruction that is stored in the load buffer 840 (or a separate state buffer).

It may provide more security for the data stored in the store buffer 845 to be encrypted. In this implementation, when a match is found in the store buffer, the memory load unit 810 fetches the encrypted data from the store buffer 845 and provides it to the logic function 880 to be decrypted once keystream 806 is generated. In other implementations, however, the data may be stored in the store buffer 845 in plaintext. In this implementation, when a match is found in the store buffer, the memory load unit 810 fetches the plaintext data from the store buffer 845 and provides it to execution units or other microarchitecture pipeline components 890. In this scenario, the store buffer look-up may be performed before the cryptographic computing load unit 860 initiates the encryption of data tweak/IV 804 in order to avoid unnecessary processing overhead in the event that the plaintext data is available from the store buffer.

In one or more embodiments, accessing the TLB 820 may be optimized. For example, TLB 820 may be implemented to enable a search using an encoded pointer (without the offset bits or with the offset bits overwritten with all zeros or ones) to find a corresponding physical address (e.g., dTLB 186A). In this case, the memory load unit 810 can perform the lookup for a physical address to fetch the encrypted data (e.g., from memory or cache) before the encoded pointer is decoded to generate the decoded linear address. Decrypting the bits of an encoded pointer may take several clock cycles (e.g., 3 clock cycles for some block ciphers). Thus, enabling data access before the decoded linear address has been generated from the encoded pointer (e.g., 230, 330, 430) can save processing time.

In other embodiments, TLB lookups for data referenced by encoded pointers may be performed based on plaintext linear addresses (e.g., decoded linear addresses and canonical linear addresses for legacy compatibility). When using cryptographically encoded pointers, however, TLB lookups may be optimized by performing a partial address match using plaintext linear address bits from the cryptographically encoded pointer to select a likely physical address. If a partial match is found, memory load system 800 may proceed with operations to access the encrypted data in memory using the likely physical address. Once the cryptographically encoded pointer is decoded, the resulting decoded linear address may be compared to the linear address that was identified as a partial match in the prior TLB lookup. This comparison enables a determination of whether the likely physical address obtained from the partial linear address match is the correct physical address. If the two full linear addresses match, then the likely physical address is the correct physical address, and processing can proceed without interruption. If the two full linear addresses do not match, then the likely physical address is not the correct physical address, and the processor pipeline operations may be aborted and restarted using the correct linear address (i.e., the decoded linear address).

In a further possible embodiment, supplemental cache unit 875 may be provisioned in memory load system 800 to allow for at least some keystreams to be precomputed and mapped to encoded pointers. Thus, when a memory access instruction with an encoded pointer is executed, the keystream mapped to the encoded pointer can be retrieved without any delay for computing the keystream, which potentially could otherwise require generating a data tweak/IV and encrypting data tweak/IV to produce the keystream.

Figure 9:
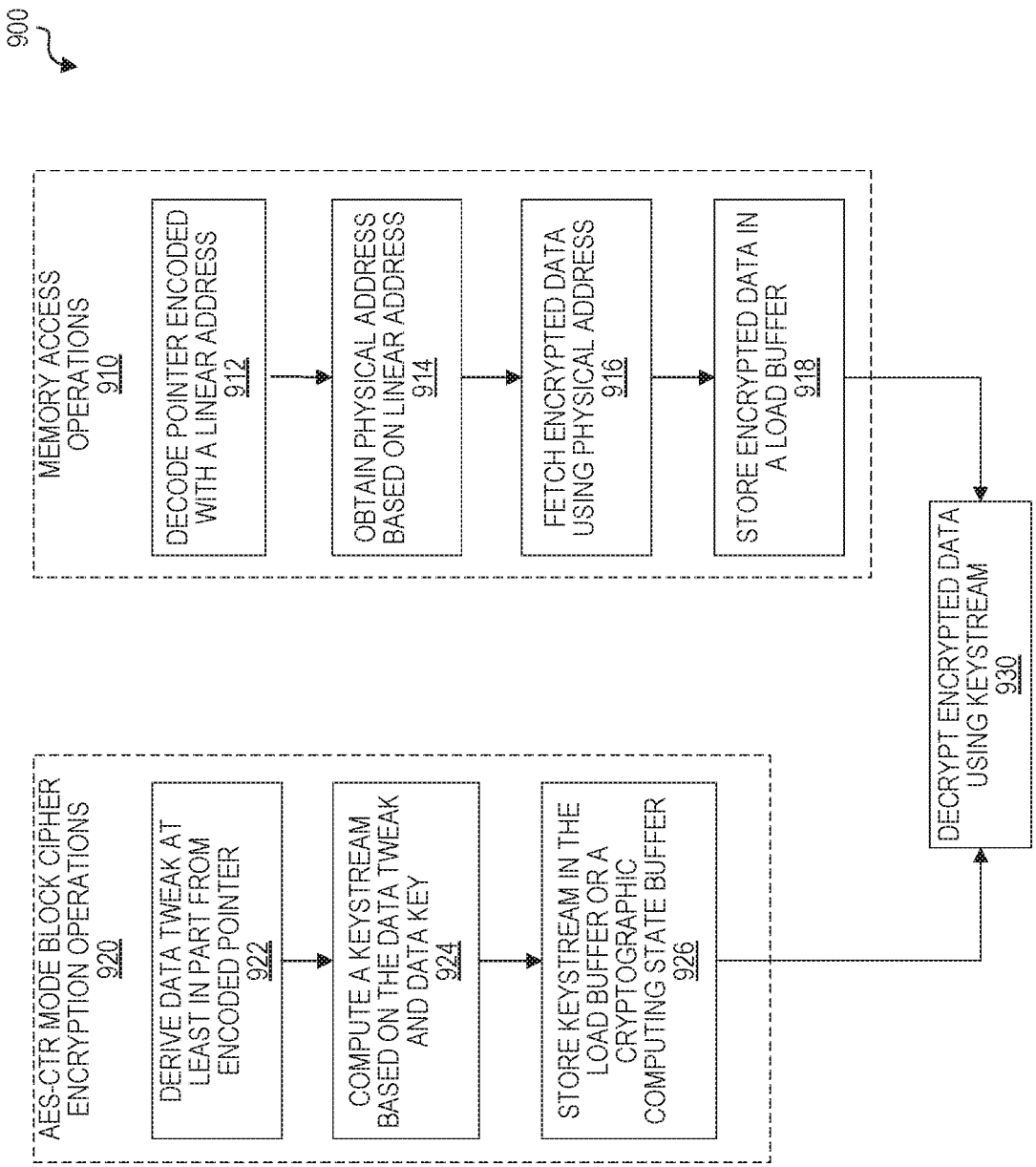
FIG. 9 is a simplified flow chart illustrating possible operations that may occur in the memory load system of FIG. 8 according to at least one embodiment.

FIG. 9 is a simplified flow diagram illustrating an example process 900 for accessing encrypted data, where the encryption is bound to an encoded pointer that includes at least part of a linear address of a memory location where the encrypted data is stored and at least one item of context information (e.g., size/power metadata, tag/version metadata, etc.), such as encoded pointers described herein (e.g., 310, 410, 510). The flow diagram of FIG. 9 illustrates parallel processing that is possible when certain types of encryption/decryption techniques are implemented for memory access instructions in one or more embodiments. In particular, if an embodiment uses an AES-CTR mode of operation for encrypting and decrypting data, then some of the counter mode operations for decrypting data (e.g., AES-CTR mode keystream encryption operations 920) can be performed in parallel with other operations for accessing the data to be decrypted (e.g., memory access operations 910). At least some portions of process 900 may be executed by hardware, firmware, and/or software of a computing device (e.g., 100). One or more operations of process 900 may be performed as part of the execution of the memory load instruction (e.g., by memory load unit 150, 810, load buffer 182, 840, store buffer 184, 845, translation lookaside buffer 186A, 186B, 820, cryptographic computing load unit 860, cryptographic computing engine 170, 870, address cryptography unit 102, etc.).

At 912, a pointer encoded with a linear address (e.g., 210, 310, 410, 510) is decoded to obtain the plaintext linear address of the memory location where the encrypted data is stored. If the pointer is cryptographically encoded with the linear address (e.g., 310, 410), in which an encrypted address slice (e.g., 304, 404) is embedded in the pointer, then decoding the pointer includes decrypting the encrypted address slice and generating a decoded (plaintext) linear address based at least in part on the decrypted address slice, as previously described herein with reference to pointers 210, 310 and 410 for example. If the pointer is not cryptographically encoded, then no decryption is needed to obtain the plaintext linear address. In this embodiment, the noncanonical bits (including the encoded context information) may be overwritten with zeros, as previously described with reference to pointers 210 (generally) and 510 for example.

Once the pointer is decoded and the plaintext linear address is obtained, at 914, the physical address for the memory location from which the encrypted data is to be fetched is obtained. The physical address can be obtained using any appropriate operations, such as a translation lookaside buffer look-up using the plaintext linear address. At 916, the physical address can be used to locate the encrypted data in memory and fetch the encrypted data. At 918, the encrypted data can be stored in a load buffer.

To increase efficiency in processing, the AES-CTR mode block cipher encryption operations 920 may be performed in parallel with one or more of the memory access operations 910. The AES-CTR mode block cipher encryption operations include, at 922, deriving a data tweak (e.g., initialization vector) at least in part from the encoded pointer. As previously described, for some encoded pointers, a data tweak may include the entire encoded pointer (e.g., 310, 510). In other embodiments using other encoded pointers, such as pointer 410, a data tweak may include some parts that are derived from the encoded pointer (e.g., decoded linear address bits, tag/version metadata portion 401) and possibly other external context information. Generally, embodiments may generate a data tweak using different combinations of encrypted and/or plaintext linear address bits from the encoded pointer, other information derived from the encoded pointer (e.g., decrypted portion(s) of the pointer, encrypted and/or plaintext context information stored in the pointer), and/or external context information (i.e., context information not stored in the encoded pointer).

At 924, the counter mode block cipher uses the data tweak and a secret data key to compute a counter mode cipher stream (also referred to as "keystream"). In one example, the block cipher can compute the keystream by encrypting the data tweak based on the data key. At 926, the keystream is stored in a buffer. In some embodiments, the keystream is stored in a load buffer, where the encrypted data is stored when it is fetched. In other embodiments, the keystream is stored in a separate cryptographic computing buffer. Additional keystreams may be computed based on incrementing the data tweak value and encrypting the new data tweak with the secret data key. The keystreams can be stored in the buffer so that all of the blocks (or cache lines) of the encrypted data can be decrypted.

Once the encrypted data is stored in the load buffer at 918 and the keystream is stored in the load buffer (or other buffer) at 926, at 930, the encrypted data is decrypted using the keystream. Any suitable merging operation may be used to decrypt the encrypted data. For example, an exclusive-OR (XOR) operation may be performed on each buffered keystream and corresponding block or cache line of encrypted data stored at 918. Each XOR operation produces a block of decrypted data for the associated block or cache line, which can be loaded, read, re-encrypted, or otherwise manipulated by the software as needed. In other embodiments, the merging operation may include a complex logic function, which involves a plurality of logic operations. The plurality of logic operations may include (but is not necessarily limited to) exclusive-OR (XOR) operation(s), AND operation(s), NOT-AND (NAND) operation(s), NOT-OR (NOR) operation(s), inverter operation(s), or any suitable combination thereof.

It should be noted that, although memory access instructions (e.g., load) are discussed with reference to data accessed from memory, the concepts disclosed in FIG. 9 also apply to accessing code that is stored in memory.

Figure 10:
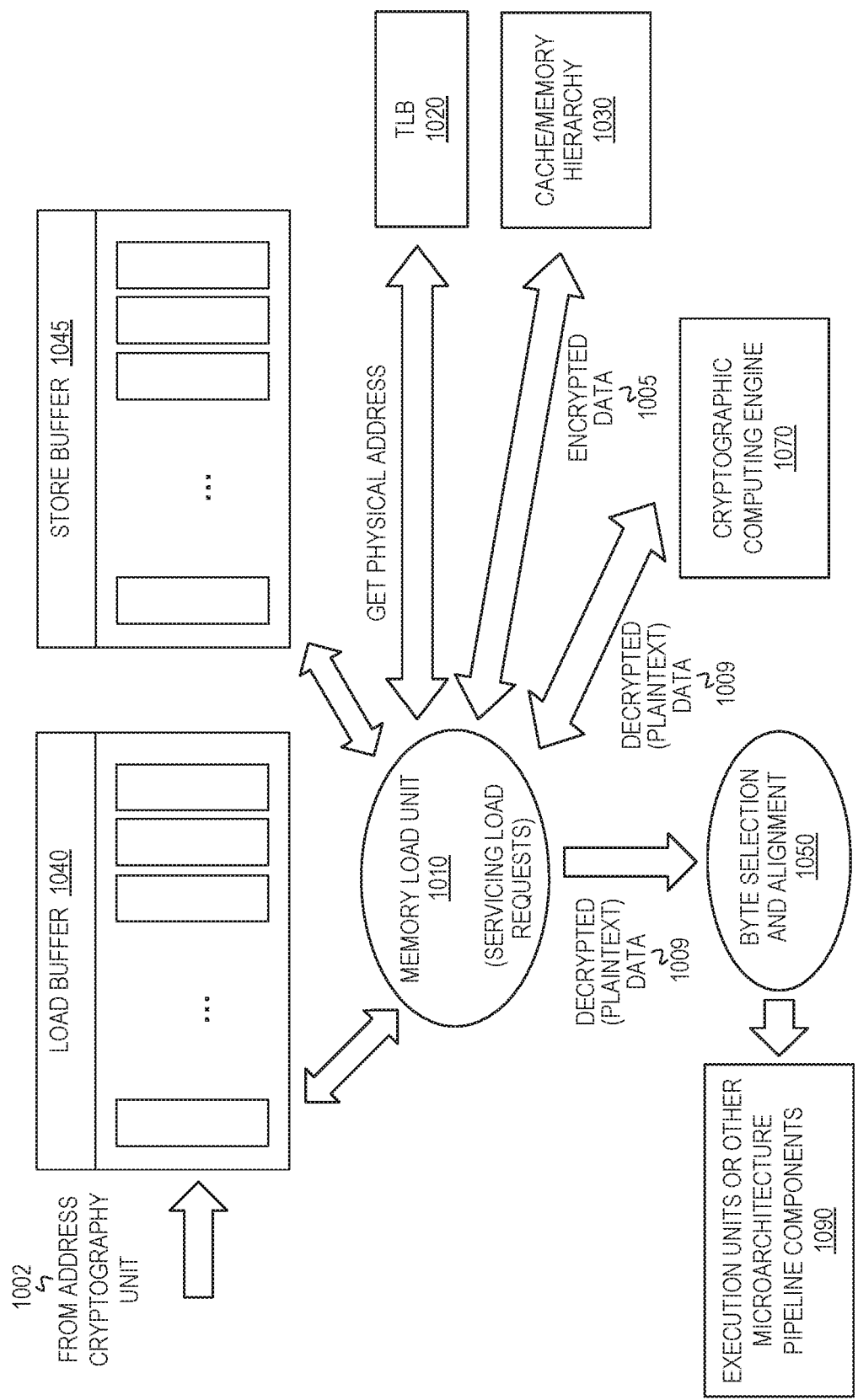
FIG. 10 is a simplified block diagram illustrating another example memory load system with cryptographic computing with asynchronous operations according to at least one embodiment.

FIG. 10 illustrates a memory load system 1000 for cryptographic computing where encryption and decryption of data or code are bound to the contents of an encoded pointer. Memory load system 1000 illustrates data decryption operations being performed serially with memory access operations (e.g., load, read, move, fetch, etc.). Any one of the encoded pointers (or variations thereof) described herein may be used in memory load system 1000. For ease of illustration and description only, memory load system 1000 of FIG. 10 will be described with reference to encoded pointers for data. It should be noted however, that memory load system 1000 may also be implemented for encoded pointers to code, which may be configured like any encoded pointers (or variations thereof) described herein (e.g., 210, 310, 410, 510, etc.).

Memory load system 1000 may comprise one or more components (e.g., hardware, software, and/or firmware) as shown and described with reference to computing device 100 for performing operations depicted in FIG. 10. In at least one embodiment, memory load system 1000 can include a load buffer 1040, a store buffer 1045, a memory load unit 1010, and a cryptographic computing engine 1070. These components may be the same or similar to load buffer 182, store buffer 184, memory load unit 150, cryptographic computing load unit 172, and cryptographic computing engine 170, respectively, of computing device 100. Memory load system 1000 may also include a translation lookaside buffer (TLB) 1020, which may be implemented as a data translation lookaside buffer (dTLB) (e.g., 186A) and a shared translation lookaside buffer (sTLB) (e.g., 186B) in at least one embodiment. Memory load system 1000 may further include a cache/memory hierarchy 1030, which can include both on-chip memory and off-chip memory (e.g., data cache unit 188, L2 cache unit 189, main memory 120, etc.). Additional components of memory load system 1000, which are not shown in computing device 100, may include a byte selection and alignment unit 1050 and execution units or other microarchitecture pipeline components 1090. Furthermore, a complex logic function 1072 may be incorporated as part of cryptographic computing engine 1070 or may be implemented separately.

Memory load system 1000 illustrates memory access operations and data decryption operations being performed serially when an encoded pointer (e.g., 210, 310, 410, 510) to data is used in a memory access instruction. Generally, the memory access operations and data decryption operations shown in FIG. 10 are performed subsequent to address decryption and address formation shown in cryptographic computing processes 300, 400, and 500 using encoded pointers 310, 410, and 510, respectively. If TLB lookup optimizations are implemented, however, the TLB lookups shown in FIG. 10 can be performed before an address cryptography unit 1002 has fully decoded the encoded pointer to reveal a decoded (plaintext) linear address.

At 1002, a decoded linear address (e.g., 230, 330, 430, 530) generated from an encoded pointer in an operand of a memory access instruction is received by load buffer 1040 from an address cryptography unit. Load buffer 1040 can also receive and store a size of the memory access request, an identifier (ID) of the memory access instruction, and context information associated with the encoded pointer. The context information in the load buffer 1040 may contain metadata encoded in the pointer and, in some embodiments, additional external context information. Once the requested data is retrieved by memory load unit 1010, it may be stored in load buffer 1040. If the retrieved data is encrypted, then once it is decrypted, the decrypted data may be stored in load buffer 1040. In one or more embodiments, the data may be indexed in the load buffer by the encoded pointer. In one or more embodiments, a memory load system that implements serialized encryption and store operations may use a block cipher that does not generate a keystream. Examples of block ciphers that may be used include, but are not necessarily limited to, cryptographically strong block ciphers such as Simon, Speck, tweakable K-cipher, PRINCE, or Gimli.

In some embodiments, a cryptographic computing state buffer, such as cryptographic computing state buffer 185 shown in computing device 100, may be provisioned in memory load system 1000 to hold some of the information associated with the memory access instruction (e.g., the encoded pointer, context information encoded in the pointer, and additional context information not encoded in the pointer. The cryptographic computing state buffer may contain state information associated with memory access instructions and which could otherwise be stored in load buffer 1040. In other embodiments, cryptographic computing state buffer may contain state information that is associated with memory store instructions and which could otherwise be stored in store buffer 1045. In yet further embodiments, the cryptographic computing state buffer may contain both state information that is associated with memory access instructions and state information that is associated with store instructions.

Memory load unit 1010 may perform memory access operations by servicing load requests from load buffer 1040. Once the load buffer 1040 receives the decoded linear address, memory load unit 1010 can receive the decoded linear address from load buffer 1040, which is to be used to fetch the encrypted data from cache/memory 1030. Memory load unit 1010 can first get the physical address corresponding to the decoded linear address by performing a TLB lookup in TLB 1020. Once the physical address is obtained, it can be used to fetch the data from the cache/memory hierarchy 1030. If the data has been accessed recently or if the processor anticipated the memory access request for the data, then the data may be stored in cache closer to the processor. Otherwise, the data may be stored in other memory, such as main memory, which can take longer to access.

Once encrypted data 1005 is retrieved from cache/memory hierarchy 1030, memory load unit 1010 may initiate cryptographic computing engine 1070 to decrypt the encrypted data. The cryptographic computing engine 1870 may be implemented as block cipher or other suitable encryption algorithm other than a counter mode block cipher. For example, block ciphers that may be used to implement cryptographic computing engine 1870 may include, but are not necessarily limited to Simon, Speck, tweakable K-cipher, PRINCE, Gimli, or any other block cipher other than the counter mode block cipher (e.g., AES-CTR).

In at least one embodiment, memory load unit 1010 can provide the encrypted data to cryptographic computing engine 1070. Memory load unit 1010 may also provide a data key, along with the encoded pointer or portions of the encoded pointer and possibly other information (e.g., context information from load buffer 1040, etc.) to be used to generate a data tweak. The data tweak is derived, at least in part, from the encoded pointer and therefore, may vary depending on the particular encoded pointer embodiment. For example, the data tweak 1004 may be the encoded pointer (e.g., 344, 544). In other embodiments, the data tweak 1004 may be a combination of various information (e.g., 444) such as context information stored in the encoded pointer, a portion of the decoded linear address, other context information not stored in the encoded pointer, and/or a crypto context ID register. In some embodiments, memory load unit 1010 may generate the data tweak, but in other embodiments, cryptographic computing engine 1070 may generate the data tweak.

Memory load unit 1010 invokes cryptographic computing engine 1070, which is placed into the pipeline to decrypt the encrypted data. Once cryptographic computing engine 1070 has access to the encrypted data, the data tweak, and the data key, it can perform it decryption operations, which may include full diffusion and confusion operations on the encrypted data to generate the decrypted data.

The decrypted (plaintext) data 1009 produced by the logic function 1072 may be returned to memory load unit 1010 and provided to the byte selection and alignment unit 1050. Byte selection and alignment unit 1050 may be used to select the correct bytes of the decrypted data to be provided to execution units or other microarchitecture pipeline components 1090. This may be needed, for example, when a memory access reads just a portion of one or more cache-lines so that the values of other bytes within those cacheline(s) are not included in the decryption. The decrypted (plaintext) data that is output by byte selection and alignment unit 1050, can be loaded, read, re-encrypted or otherwise manipulated by software as needed. Accordingly, decrypted data 1009 may be fed into execution units or other microarchitecture pipeline components 1090.

Memory load system 1000 may also implement optimizations for accessing data, as previously described herein for example, with reference to memory load system 800. For example, a shortcut optimization may be provided between load buffer 1040 and store buffer 1045 to fetch encrypted data requested in a memory access instruction that is stored in store buffer 1045 waiting to be stored to memory. The look-up performed in the store buffer 1045 may be implemented in any suitable manner as previously described herein. In at least some embodiments, the data stored in the store buffer 1045 may be encrypted. However, in other embodiments, the data stored in the store buffer 1045 may be unencrypted. In this scenario, when a match is found in store buffer 1045, the memory load unit 1010 fetches the plaintext data from the store buffer 1045 and provides it to execution units or other microarchitecture pipeline components 1090. In further embodiments, the TLB accesses performed by memory load unit 1010 may be optimized in any manner as previously described herein. For example, TLB look-ups can be performed for full matches using encoded pointers or for partial matches using plaintext bits of encoded pointers.

Figure 11:
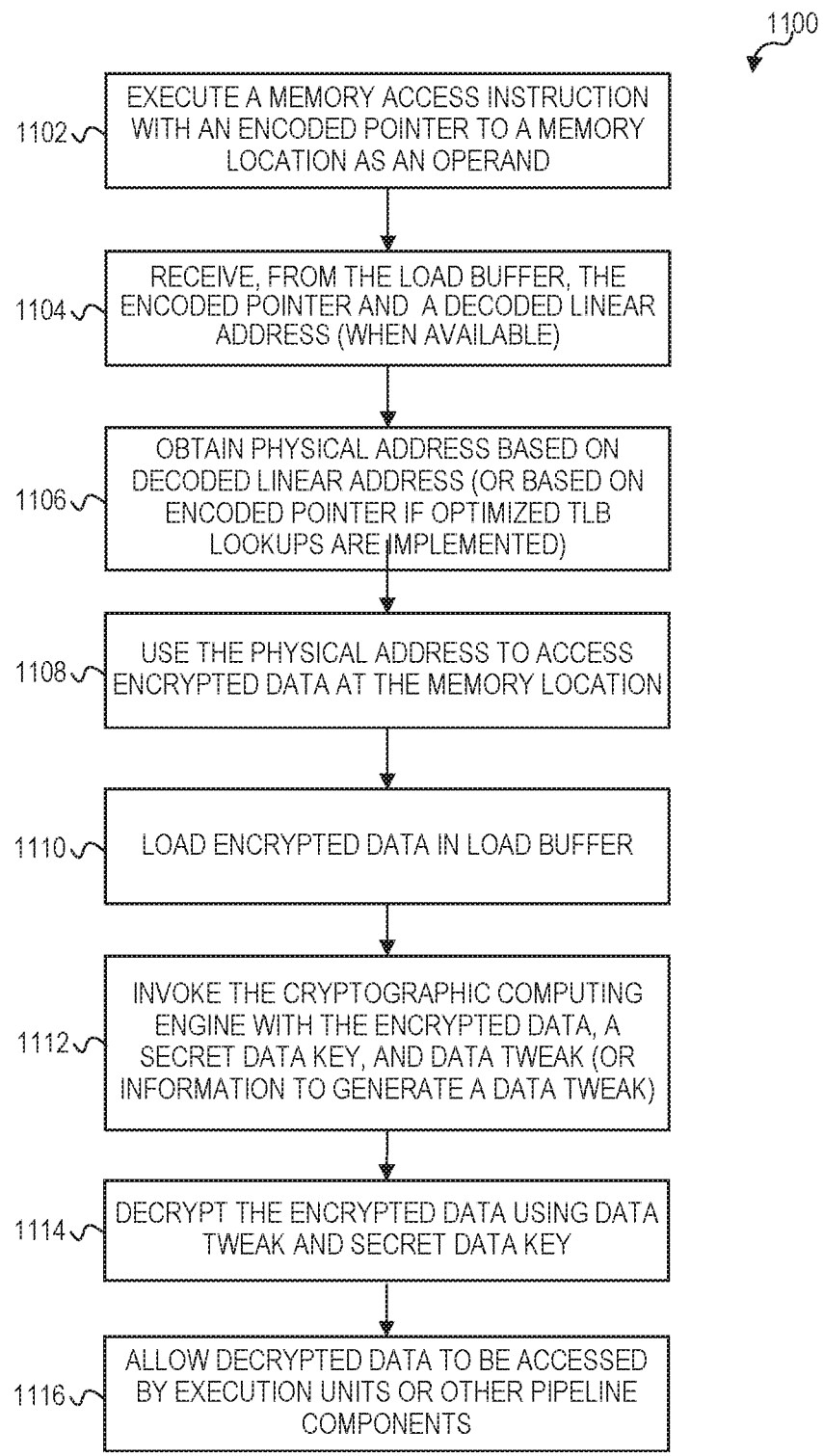
FIG. 11 is a simplified flow chart illustrating possible operations that may occur in the memory load system of FIG. 10 according to at least one embodiment.

FIG. 11 is a simplified flow diagram illustrating an example process 1100 for accessing encrypted data, where the encryption is bound to an encoded pointer that includes at least part of a linear address and at least one item of context information (e.g., size/power metadata, tag/version metadata, etc.), such as encoded pointers described herein (e.g., 310, 410, 510). The flow diagram of FIG. 11 illustrates serial processing that may be performed in one or more embodiments. At least some portions of process 1100 may be executed by hardware, firmware, and/or software of a computing device (e.g., 100). One or more operations of process 1100 may be performed as part of the execution of the memory load instruction (e.g., by memory load unit 150, 1110, load buffer 182, 1140, store buffer 184, 1145, translation lookaside buffer 186A, 186B, 1120, cryptographic computing engine 170, 1170, address cryptography unit 102, etc.).

At 1102, a memory access instruction to access data is executed. The memory access instruction includes an operand for an encoded pointer to a memory location from which the data is to be fetched.

At 1104, the encoded pointer can be stored in the load buffer, for example, from the address cryptography. In addition, an address cryptography unit decodes encoded pointer to reveal a decoded linear address. The decoded linear address is stored in the load buffer, and the load buffer provides the decoded linear address to memory load unit.

At 1106, the decoded linear address may be used to obtain a physical address for the memory location where the encrypted data is stored. This may be achieved using any appropriate operations, such as a translation lookaside buffer look-up based on the plaintext linear address. In other embodiments, the TLB lookup may be optimized. In this embodiment, a TLB lookup may be performed for full matches based on the encoded pointer or for a partial match using plaintext bits of the encoded pointer. This may be done before the memory load unit receives the decoded linear address.

At 1108, the physical address can be used to access encrypted data in memory. It should be noted, however, that the encrypted data may be stored in memory or may be stored in a cache closer to the processor for easier access. At 1110, the encrypted data may be loaded into the load buffer.

At 1112, the memory load unit can invoke the cryptographic computing engine and provide the encrypted data, a secret data key, and a data tweak (or information to generate a data tweak). The data tweak may be generated or obtained by memory load unit in some embodiments. In other embodiments, the memory load unit may provide information to generate a data tweak to the cryptographic computing engine, which may include enhanced circuitry and logic to generate the data tweak. The information needed to generate a data tweak may be different depending on the particular format of the encoded pointer. Such information may include the encoded pointer, context information embedded in the pointer, external context information, and/or linear address bits.

At 1114, the cryptographic computing engine uses the data tweak and the secret data key to decrypt the encrypted data. In at least one embodiment, full diffusion and confusion may be used in the decryption.

At 1116, the decrypted data is made available to execution units and other microarchitecture pipeline components.

Figure 12:
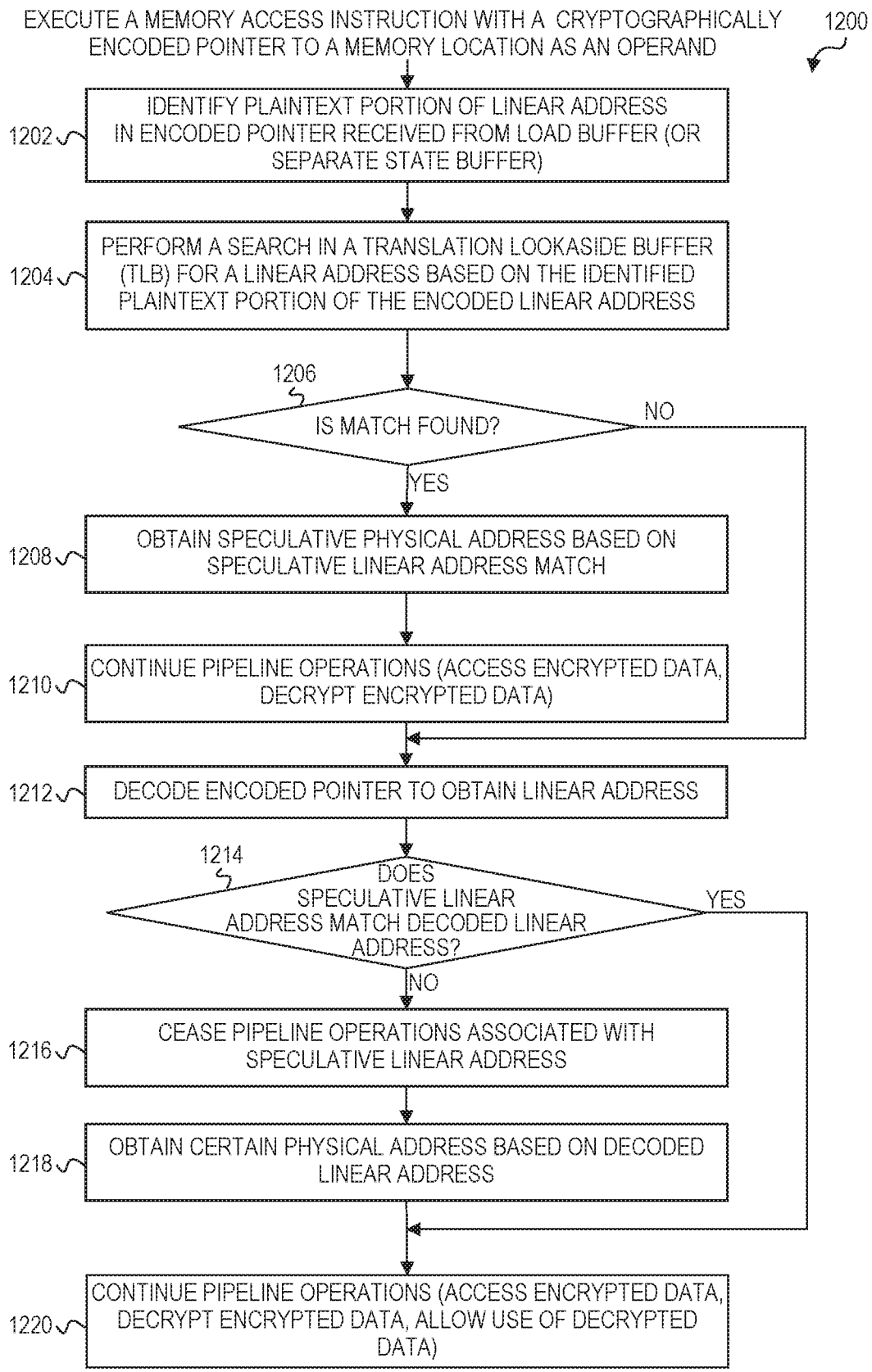
FIG. 12 is a simplified flow chart illustrating other possible operations that may occur in an embodiment of a memory load system for cryptographic computing.

FIG. 12 is a simplified flow diagram illustrating an example process 1200 for optimizing translation lookaside buffer (TLB) lookups during execution of a memory access instruction having an operand with a cryptographically encoded pointer. The cryptographically encoded pointer includes an encrypted portion of a linear address, at least one item of context information (e.g., size/power metadata, tag/version metadata, etc.), and possibly a plaintext portion of the linear address and/or an offset. For example, the encoded pointer could have a configuration that is the same or similar to cryptographically encoded pointers 310 or 410, as described herein. At least some portions of process 1200 may be executed by hardware, firmware, and/or software of a computing device (e.g., 100). One or more operations of process 1200 may be performed as part of the execution of the memory access instruction (e.g., by memory load unit 150, 810, 1010, and translation lookaside buffer 186A, 186B, 820, 1020).

In at least one embodiment, a memory load unit receives an encoded pointer from a load buffer. At 1202, a plaintext portion of a linear address embedded in the encoded pointer of the operand is identified. For example, for encoded pointer 310, immutable plaintext portion 306 may be identified. For encoded pointer 410, plaintext bits are not encoded in the pointer, but external context information (e.g., 409) may contain upper address bits (e.g., 411) in plaintext. In some scenarios, the upper address bits may be statically accessible (e.g., provided in another operand of the memory access instruction, stored in a statically-addressable memory region) and therefore, can be quickly retrieved. When the plaintext address bits can be quickly retrieved, they may be identified at 1202 and retrieved.

At 1204, a search may be performed in the TLB for a partial match to a linear address based on the identified plaintext bits in the encoded pointer. At 1206, a determination is made as to whether a match was found. If a partial match (also referred to herein as "speculative match") to a linear address is found, then at 1208, the physical address mapped to the linear address identified in the speculative match is obtained. At 1210, pipeline operations continue using the physical address. Such operations can include accessing encrypted data in memory based on the physical address and decrypting the encrypted data.

While the pipeline operations continue at 1210, at 1212, the encoded pointer is decoded to produce a decoded (plaintext) linear address. At 1214 a determination is made as to whether the speculative linear address matches the decoded linear address. If the speculative linear address matches the decoded linear address, then pipeline operations continue at 1220.

If the speculative linear address does not match the decoded linear address, however, then at 1216, pipeline operations are ceased or aborted. At 1218, the decoded linear address is used to perform another TLB lookup to identify and retrieve a correct physical address. Pipeline operations can continue at 1220.

Figure 13:
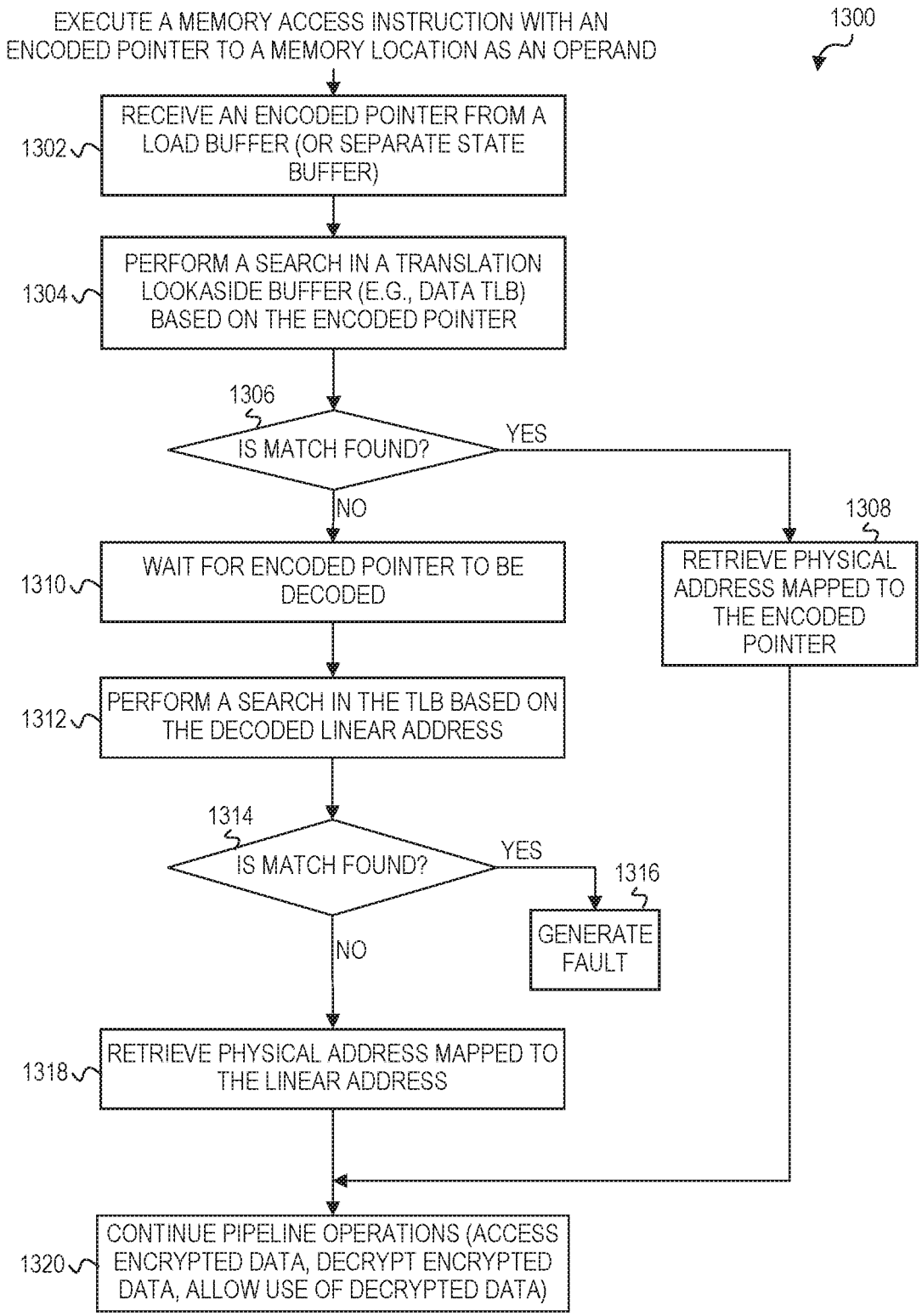
FIG. 13 is a simplified flow chart illustrating other possible operations that may occur in another embodiment of a memory load system for cryptographic computing.

FIG. 13 is a simplified flow diagram illustrating an example process 1300 for optimizing translation lookaside buffer (TLB) lookups during execution of a memory access instruction having an operand with an encoded pointer. The encoded pointer includes at least a portion of a linear address (encrypted or unencrypted) and at least one item of context information (e.g., size/power metadata, tag/version metadata, etc.). For example, the encoded pointer could have a configuration that is the same or similar to cryptographically encoded pointers 310, 410, or 510 as described herein. At least some portions of process 1300 may be executed by hardware, firmware, and/or software of a computing device (e.g., 100). One or more operations of process 1300 may be performed as part of the execution of the memory access instruction (e.g., by memory load unit 150, 810, 1010, and translation lookaside buffer 186A, 186B, 820, 1020).

At 1302, the memory load unit receives an encoded pointer from a load buffer, or a separate state buffer if state information for the memory access instruction is stored separately. At 1304, a search may be performed in the TLB for a physical address based on the encoded pointer received from the load buffer. In at least one embodiment, the TLB lookup may be performed for a page number. Accordingly, for a 4 KB page, a TLB lookup may ignore the twelve least significant bits since those addresses pertain to the same 4 KB page. In addition, the search may be performed using a dTLB (e.g., 186A) due to its speed and the use of the encrypted pointer for the search.

At 1306, a determination is made as to whether a match was found in the TLB. If a match to an encoded pointer was found, then the physical address mapped to the encoded pointer identified in the search is retrieved. At 1320, pipeline operations may continue using the physical address. Such operations can include, for example, accessing encrypted data in memory based on the physical address and decrypting the encrypted data.

With reference again to 1306, if a match to the encoded pointer received from the load buffer is not found, then at 1310, the memory load unit can wait until a decoded linear address is produced from decoding the encoded pointer. At 1312, the decoded linear address is used to perform another TLB lookup in the shared TLB to identify a linear address that matches the decoded linear address. At 1314, a determination is made as to whether a match was found. If a match to a linear address is not found, then a fault may be generated at 1316. If a match to a linear address was found, then at 1318, the physical address mapped to the linear address identified in the search is retrieved. At 1320, pipeline operations continue using the physical address. Such operations can include, for example, accessing encrypted data in memory based on the physical address and decrypting the encrypted data.

Figure 14:
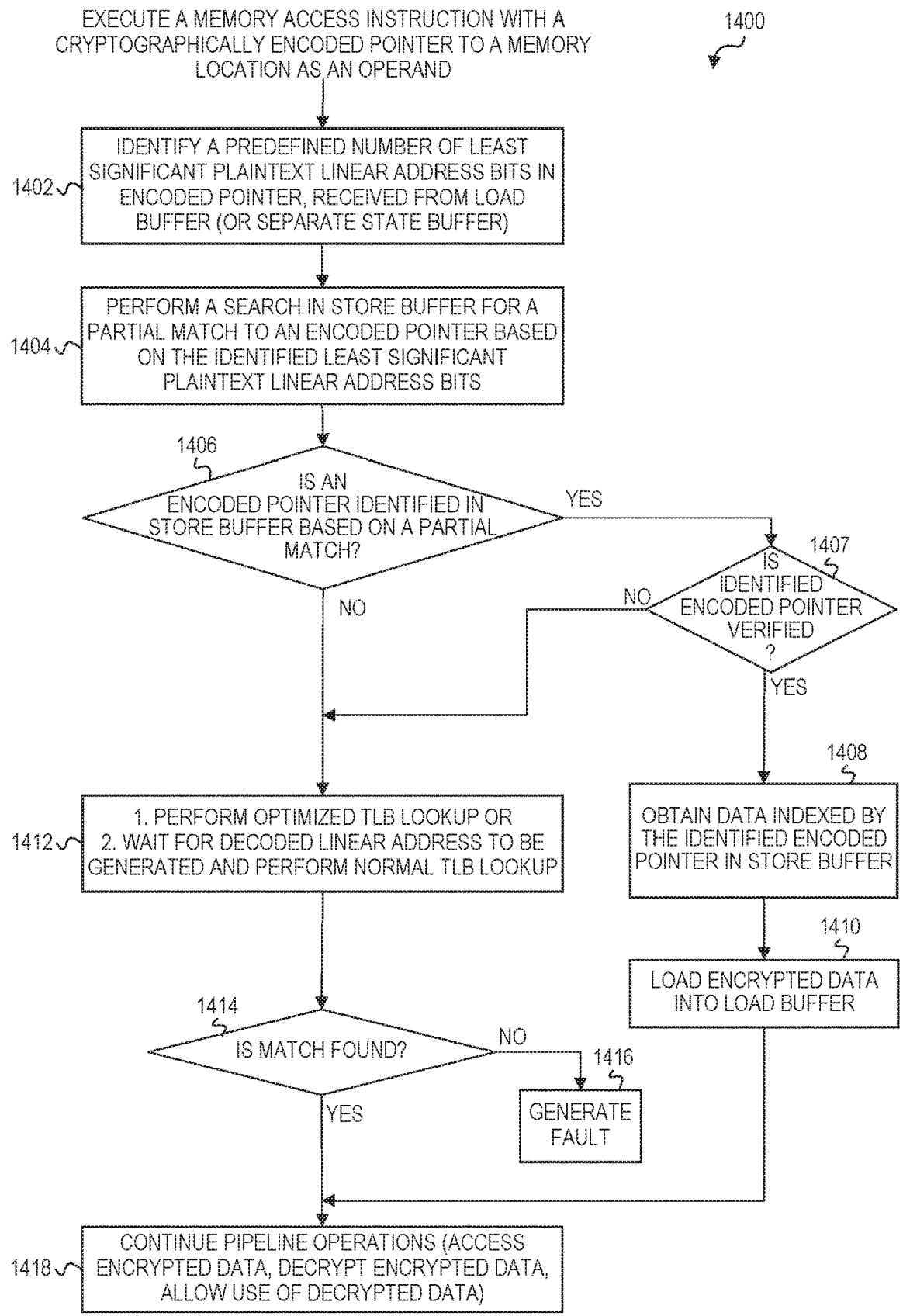
FIG. 14 is a simplified flow chart illustrating other possible operations that may occur in another embodiment of a memory load system for cryptographic computing.

FIG. 14 is a simplified flow diagram illustrating an example process 1400 for optimizing retrieval of requested data during execution of a memory access instruction having an operand with an encoded pointer. The encoded pointer includes at least a portion of a linear address (encrypted or unencrypted) and at least one item of context information (e.g., size/power metadata, tag/version metadata, etc.). For example, the encoded pointer could have a configuration that is the same or similar to cryptographically encoded pointers 310, 410, or 510 as described herein. At least some portions of process 1400 may be executed by hardware, firmware, and/or software of a computing device (e.g., 100). One or more operations of process 1400 may be performed as part of the execution of the memory access instruction (e.g., by memory load unit 150, 810, 1010, store buffer 184, 845, 1045, and possibly translation lookaside buffer 186A, 186B, 820, 1020).

Initially, the memory load unit receives an encoded pointer from a load buffer, or a separate state buffer if state information for the memory access instruction is stored separately. At 1402, a designated number of plaintext least significant bits are identified in the encoded pointer. The number of designated bits may depend upon the particular pointer encoding being used. In at least one example, eleven least significant bits are identified. In another embodiment, the identified plaintext bits may not necessarily be the least significant bits. For example, other portions of plaintext address bits embedded in the pointer (or potentially stored externally (e.g., UAB bits 411)) could be used.

At 1404, a search is performed in the store buffer entries for a partial match to an encoded pointer based on the identified (least significant) plaintext linear address bits. At 1406, a determination is made as to whether an encoded pointer is identified in the store buffer based on a partial match to the identified plaintext linear address bits. If an encoded pointer is identified in the store buffer based on a partial match, then at 1407, the identified encoded pointer match is verified. This may be achieved by performing a full comparison of the encoded pointer received from the load buffer and the identified encoded pointer from the store buffer. If the identified encoded pointer is verified as a match, then at 1408, the data to be stored that is indexed by the identified encoded pointer is retrieved from the store buffer. At 1410, the retrieved data is loaded into the load buffer. At 1418, pipeline operations continue, using the loaded data. Such operations can include decrypting the data, if the data is encrypted. However, if the data is unencrypted, then the unencrypted data may be provided to execution units or other microarchitecture pipeline components.

If an encoded pointer is not identified in the store buffer based on a partial match to the identified plaintext linear address bits at 1406, or if an identified encoded pointer match is not verified as a match at 1407, then the requested data is not waiting to be stored. Therefore, memory access operations are performed to retrieve the requested data. At 1412, a TLB lookup is performed. In one embodiment, an optimized TLB lookup based on the encoded pointer (or portions of the encoded pointer) may be performed as previously described herein (e.g., process 1200 of FIG. 12, process 1300 of FIG. 13, etc.). If an optimized TLB lookup is not performed, then a regular TLB lookup may be performed once a decoded (plaintext) linear address is generated from the encoded pointer.

As indicated at 1414, if a match is not found in the TLB lookup, then at 1416, a fault may be generated. Otherwise, if a match is found in the TLB lookup, the physical memory translation can be obtained and at 1418, pipeline operations can continue. Such operations can include retrieving the requested data based on the physical address from the TLB lookup, decrypting the data, and subsequently providing the unencrypted data to execution units or other microarchitecture pipeline components.

Figure 15:
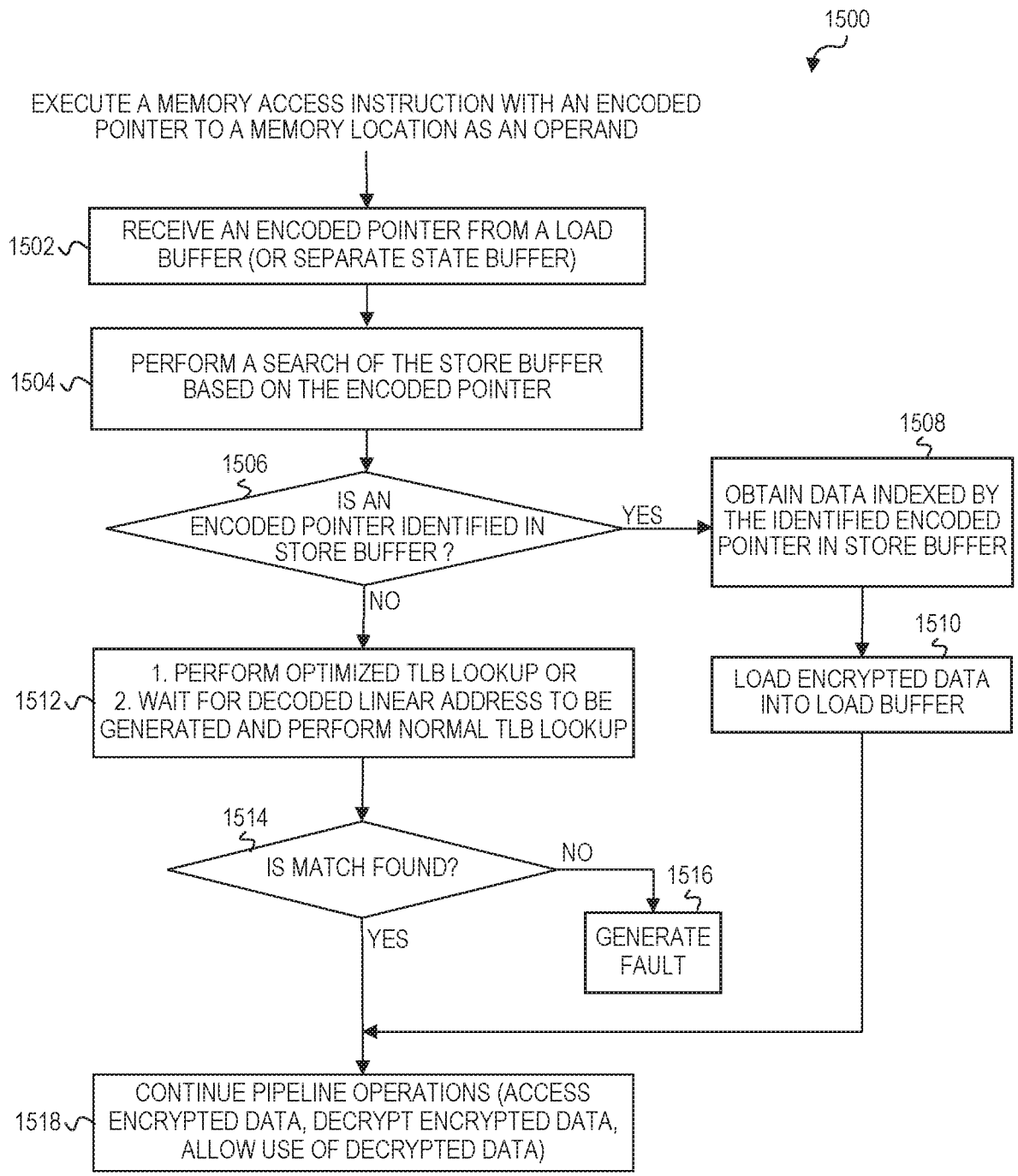
FIG. 15 is a simplified block diagram illustrating an example memory store system with cryptographic computing according to at least one embodiment.

FIG. 15 is a simplified flow diagram illustrating an example process 1500 for optimizing retrieval of requested data during execution of a memory access instruction having an operand with an encoded pointer. The encoded pointer includes at least a portion of a linear address (encrypted or unencrypted) and at least one item of context information (e.g., size/power metadata, tag/version metadata, etc.). For example, the encoded pointer could have a configuration that is the same or similar to cryptographically encoded pointers 310, 410, or 510 as described herein. At least some portions of process 1500 may be executed by hardware, firmware, and/or software of a computing device (e.g., 100). One or more operations of process 1500 may be performed as part of the execution of the memory access instruction (e.g., by memory load unit 150, 810, 1010, store buffer 184, 845, 1045, and possibly translation lookaside buffer 186A, 186B, 820, 1020).

At 1502, the memory load unit receives an encoded pointer from a load buffer, or a separate state buffer if state information for the memory access instruction is stored separately. At 1504, a search is performed in the store buffer entries for data indexed by an encoded pointer that corresponds to the encoded pointer received from the load buffer.

At 1506, a determination is made as to whether an encoded pointer is identified in the store buffer based on the search. If an encoded pointer is identified in the store buffer, then at 1508, the data to be stored that is indexed by the identified encoded pointer is retrieved from the store buffer. At 1510, the retrieved data is loaded into the load buffer. At 1518, pipeline operations continue, using the loaded data. Such operations can include decrypting the data, if the data is encrypted. However, if the data is unencrypted, then the unencrypted data may be provided to execution units or other microarchitecture pipeline components.

With reference to 1506, if an encoded pointer is not identified in the store buffer based on the search, then the requested data is not waiting to be stored. Therefore, memory access operations are performed to retrieve the requested data. At 1512, a TLB lookup is performed. In one embodiment, an optimized TLB lookup based on the encoded pointer (or portions of the encoded pointer) may be performed as previously described herein (e.g., process 1200 of FIG. 12, process 1300 of FIG. 13, etc.). If an optimized TLB lookup is not performed, then a regular TLB lookup may be performed once a decoded (plaintext) linear address is generated from the encoded pointer.

As indicated at 1514, if a match is not found in the TLB lookup, then at 1516, a fault may be generated. Otherwise, if a match is found in the TLB lookup, the physical memory translation can be obtained and at 1518, pipeline operations can continue. Such operations can include retrieving the requested data based on the physical address from the TLB lookup, decrypting the data, and subsequently providing the unencrypted data to execution units or other microarchitecture pipeline components.

Figure 16:
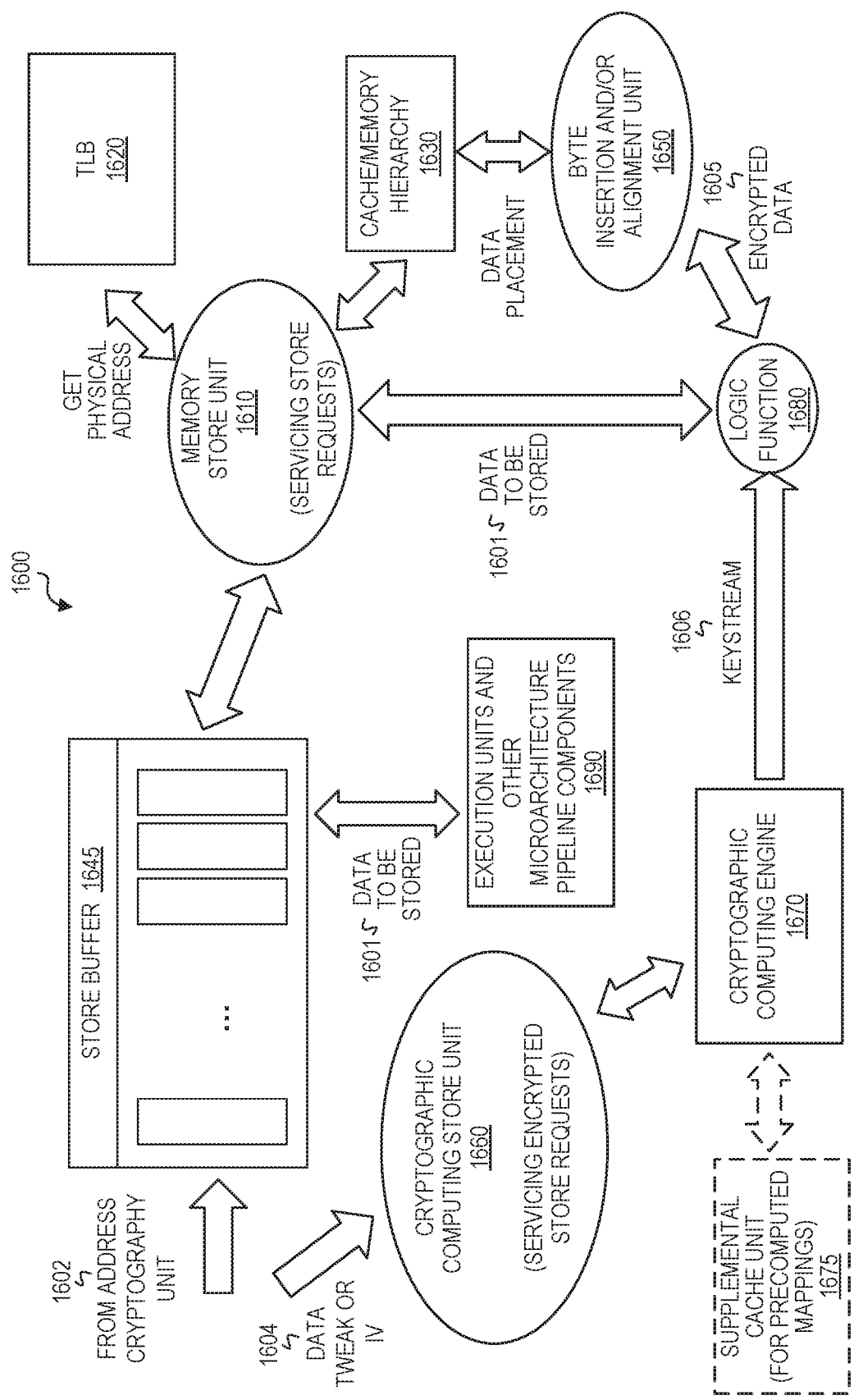
FIG. 16 is a simplified block diagram illustrating an example memory store system for cryptographic computing with parallel operations according to at least one embodiment.

FIG. 16 illustrates a memory store system 1600 for cryptographic computing where encryption and decryption of data or code are bound to the contents of an encoded pointer. Memory store system 1600 illustrates one or more memory store operations being performed, at least partly, in parallel with one or more data or code encryption operations. Any one of the encoded pointers (or variations thereof) described herein may be used in memory store system 1600. For ease of illustration and description only, memory store system 1600 of FIG. 16 will be described with reference to encoded pointers for data. It should be noted however, that memory store system 1600 may also be implemented for encoded pointers to code, which may be configured like any of the encoded pointers (or variations thereof) described herein (e.g., 210, 310, 410, 510, etc.).

Memory store system 1600 may comprise one or more components (e.g., hardware, software, and/or firmware) as shown and described with reference to computing device 100. In at least one embodiment, memory store system 1600 can include a store buffer 1645, a memory store unit 1610, a cryptographic computing store unit 1660, a cryptographic computing engine 1670, and an optional supplemental cache unit 1675. These components may be the same or similar to store buffer 184, memory store unit 160, cryptographic computing store unit 174, cryptographic computing engine 170, and supplemental cache unit 187, respectively, of computing device 100. Memory store system 1600 may also include a translation lookaside buffer (TLB) 1620, which may be implemented as a data translation lookaside buffer (dTLB) (e.g., 186A) and a shared translation lookaside buffer (sTLB) (e.g., 186B) in at least one embodiment. Memory store system 1600 may further include a cache/memory hierarchy 1630, which can include both on-chip memory and off-chip memory (e.g., data cache unit 188, L2 cache unit 189, main memory 120, etc.). Additionally, a complex logic function 1680 may be incorporated as part of cryptographic computing engine 1670 or may be implemented separately. Additional components of memory store system 1600, which are not shown in computing device 100, may include a byte selection and alignment unit 1650 and execution units or other microarchitecture pipeline components 1690.

FIG. 16 illustrates memory store operations and data encryption operations being performed at least partly in parallel when an encoded pointer (e.g., 310, 410, 510) to data is used in a memory store instruction. In one or more embodiments, some of the memory store operations and data encryption operations shown in FIG. 16 can be performed before an address cryptography unit has fully decoded the encoded pointer to reveal a decoded (plaintext) linear address.

At 1602, a decoded linear address (e.g., 230, 330, 430, 530) generated from an encoded pointer in an operand of a memory store instruction is received by load buffer 1640 from an address cryptography unit. Load buffer 1640 can also receive and store a size of the memory store request, an identifier (ID) of the memory store instruction, and context information associated with the encoded pointer. The context information in the store buffer 1645 may contain metadata encoded in the pointer and, in some embodiments, additional external context information. Once a keystream is generated, it may also be stored in store buffer 1645. The data to be stored 1601 may come from execution units and other microarchitecture pipeline components 1690 and may be loaded into store buffer 1645. Alternatively, the data may be stored in some other secure storage until it is encrypted and then loaded into store buffer 1645 in an encrypted form. In one or more embodiments, the data may be indexed in the store buffer 1645 by the encoded pointer.

As previously described herein, in some embodiments, a cryptographic computing state buffer, such as cryptographic computing state buffer 185 shown in computing device 100, may be provisioned in memory store system 1600 to hold state information associated with memory store instructions, state information associated with memory access instructions, or a combination of both.

Cryptographic computing store unit 1660 and memory store unit 1610 may perform, respectively, data encryption operations and memory store operations at least partly in parallel. Memory store unit 1610 may perform the memory store operations by servicing store requests from store buffer 1645. Cryptographic computing store unit 1660 is responsible for generating a keystream, which can be used to encrypt the unencrypted data. Cryptographic computing store unit 1660 can receive an encoded pointer or portions of the encoded pointer and possibly other information (e.g., context information from store buffer 1645, etc.) to be used to form a data tweak (or initialization vector (IV)) 1604 from the AGU (e.g., 1602), or from store buffer 1645. The data tweak is derived, at least in part, from the encoded pointer and therefore, may vary depending on the particular encoded pointer embodiment. For example, the data tweak/IV 1604 may be embodied as the encoded pointer itself (e.g., 344, 544) or portions of the encoded pointer. In other embodiments, the data tweak/IV 1604 may be a combination of various information (e.g., 444) such as context information stored in the encoded pointer, a portion of the decoded linear address, other context information not stored in the encoded pointer, and/or a crypto context ID register.

Cryptographic computing store unit 1660 obtains a data key for encrypting the data tweak/IV 1604. Once the data key is available, cryptographic computing store unit 1660 invokes cryptographic computing engine 1670, which is placed into the pipeline to encrypt the data tweak/IV and produce a keystream 1606 representing the encrypted data tweak/IV. In one or more embodiments of memory store system 1600, cryptographic computing engine 1670 may be implemented as a counter mode block cipher (e.g., AES-CTR) to enable the keystream to be computed at least partly in parallel with performing operations to obtain the physical address to store the encrypted data in memory/cache hierarchy 1630. When a memory store instruction stores data across a block alignment boundary, another keystream is needed to fully encrypt the data. When a memory store instruction stores data that does not fully overlap with a block-aligned keystream, the non-overlapping portion of the keystream may be discarded.

While the data encryption operations to produce the keystream are being performed, memory store operations may also be performed. Memory store unit 1610 services store requests and can receive the data to be stored 1601 from store buffer 1645. Memory store unit 1610 can provide the data to be stored 1601 to logic function 1680 to be encrypted once the keystream 1606 is generated.

Logic function 1680 may perform one or more logic operations to merge the keystream 1606 and data to be stored 1609 to produce encrypted data 1605. In one or more embodiments, the logic function 1680 can include a single exclusive-OR (XOR) operation (e.g., 352, 452, 552). In other embodiments, however, logic function 1680 may be a complex logic function with a plurality of logic operations. The plurality of logic operations may include (but is not necessarily limited to) exclusive-OR (XOR) operation(s), AND operation(s), NOT-AND (NAND) operation(s), NOT-OR (NOR) operation(s), inverter operation(s), or any suitable combination thereof. The encrypted data 1605 can be provided to byte insertion and/or alignment unit 1650 to select the correct bytes of the data to be stored. This may be needed, for example, when a memory store instruction accesses just a portion of one or more cachelines so that the values of other bytes within those cacheline(s) are retained.

Memory store unit 1610 can also receive the decoded linear address from store buffer 1645. While the encryption operations are being performed, memory store unit 1610 can use the decoded linear address from store buffer 1645, to determine the physical address in cache/memory 1630 where the encrypted data is to be stored. Memory store unit 1610 can get the physical address corresponding to the decoded linear address by performing a TLB lookup in TLB 1620. In some embodiments, memory store unit 1610 may detect whether any ciphertext block being written would overwrite a special inline indicator value, e.g., one that indicates that an exception should be generated when accessing that block. In that case, in some embodiments, memory store unit 1610 may generate an exception to prevent an adversary from performing a buffer overflow that overwrite indicator values. However, in some rare instances, an actual ciphertext value within a valid allocation may collide with the indicator value, and overwriting that value should be allowed. The software exception handler can detect whether the faulting access is within the bounds of a valid allocation, e.g., by checking the heap allocator's data structures, and then instruct the processor to allow that ciphertext block to be overwritten. The exception handler can invoke a userspace routine in the allocator to check its data structures. For example, the allocator may place a chunk header prior to each allocation to indicate its size, and it can jump over each allocation in turn based on the value of the chunk header until it reaches the location of the attempted access. If the access is within an active allocation with a valid chunk header, then the allocator may indicate to the operating system that the access should be allowed. In some embodiments, the operating system can set a new "ignore special indicator value" flag, e.g., in an MSR, to treat the colliding value as actual ciphertext, as well as a flag to single-step the program. The operating system may then resume the program to re-attempt the faulting instruction, which may then overwrite the ciphertext block in memory. The operating system may then be invoked after the access has been completed. The operating system may then clear the "ignore special indicator value" flag as well as the flag for single-stepping the program and resume the program. If the allocator indicates that the access is not within a valid allocation, then the operating system can react appropriately, e.g. by terminating the program.

Once the physical address is obtained and the data has been encrypted and processed by byte insertion and/or alignment unit 1650, the physical address can be used to store the encrypted data in memory (or in cache) of the cache/memory hierarchy 1630.

Memory store system 1600 may also implement optimizations to more efficiently perform the operations. In at least some embodiments, the TLB accesses performed by memory store unit 1610 may be optimized in any manner as previously described herein. For example, TLB look-ups can be performed for full matches using encoded pointers or for partial matches using plaintext bits of encoded pointers. Also, in one or more embodiments, a supplemental cache unit (e.g., 875) may be provisioned in memory store system 1600 to allow for at least some keystreams to be precomputed and mapped to encoded pointers. Thus, when a memory store instruction with an encoded pointer is executed, the keystream mapped to the encoded pointer can be retrieved without any delay for computing the keystream, which potentially could otherwise require generating a data tweak/IV and encrypting data tweak/IV to produce the keystream.

Figure 17:
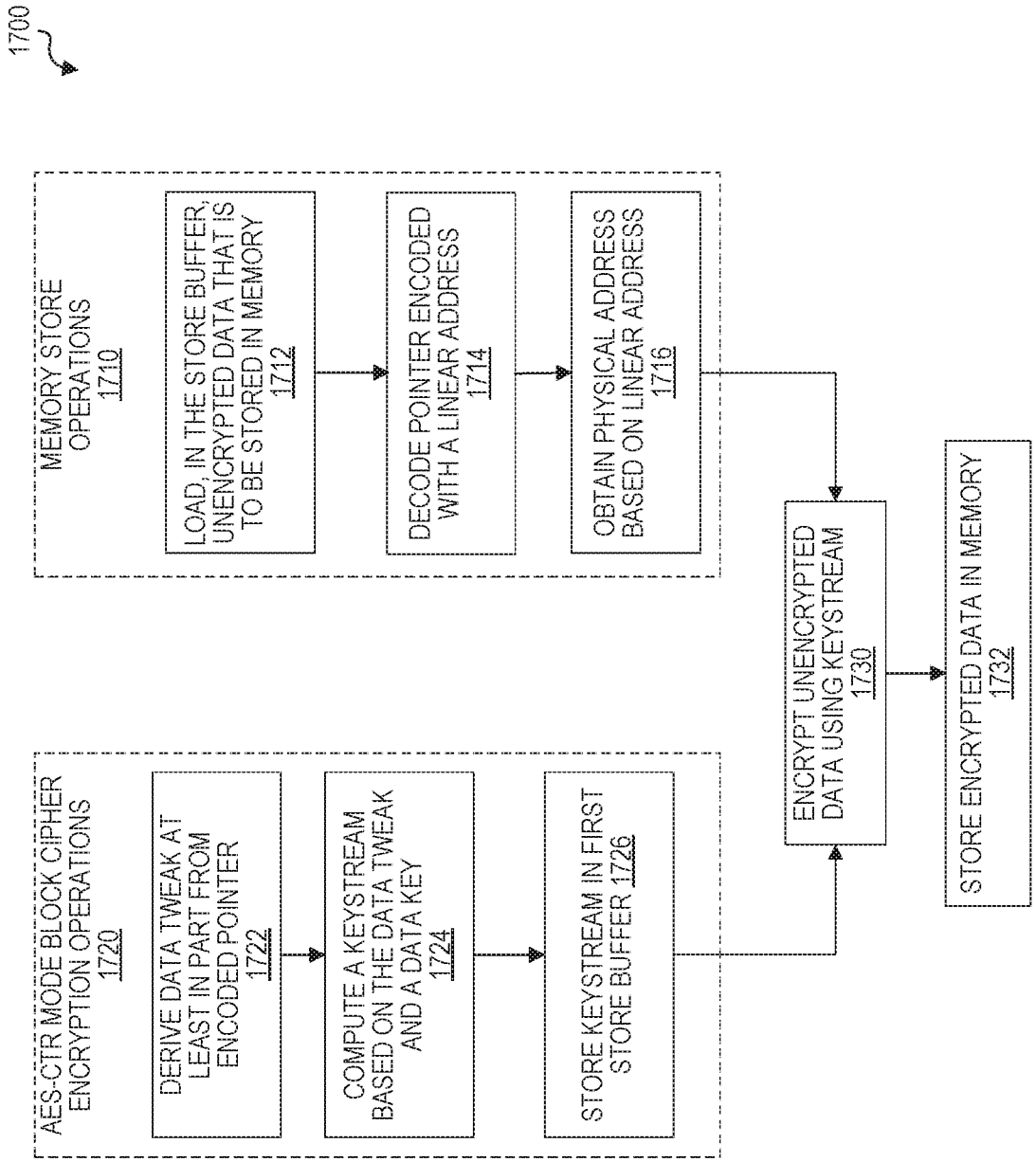
FIG. 17 is a simplified flow chart illustrating possible operations that may occur in the memory store system of FIG. 16 according to at least one embodiment.

FIG. 17 is a simplified flow diagram illustrating an example process 1700 for encrypting and storing encrypted data, where the encryption is bound to an encoded pointer that includes at least part of a linear address of a memory location and at least one item of context information (e.g., size/power metadata, tag/version metadata, etc.), such as encoded pointers described herein (e.g., 310, 410, 510). The flow diagram of FIG. 17 illustrates parallel processing that is possible when certain types of encryption/decryption techniques are implemented for memory store instructions in one or more embodiments. In particular, if an embodiment uses an AES-CTR mode of operation for encrypting and decrypting data, then some of the counter mode operations for encrypting data (e.g., AES-CTR mode keystream encryption operations 1720) can be performed in parallel with other operations for accessing the data to be decrypted (e.g., memory store operations 1710). One or more operations of process 1700 may be performed as part of the execution of the memory store instruction (e.g., by memory store unit 160, 1610, store buffer 184, 1645, translation lookaside buffer 186A, 186B, 1620, cryptographic computing engine 170, 1670, address cryptography unit 102, etc.).

At 1712, the data to be stored in memory is loaded into a store buffer by execution units and/or other microarchitecture pipeline components.

At 1714, a pointer encoded with a linear address (e.g., 210, 310, 410, 510) is decoded to obtain the plaintext linear address for the memory location where the data is to be stored. If the pointer is cryptographically encoded with the linear address (e.g., 310, 410), in which an encrypted address slice (e.g., 304, 404) is embedded in the pointer, then decoding the pointer includes decrypting the encrypted address slice and generating a decoded (plaintext) linear address based at least in part on the decrypted address slice, as previously described herein with reference to pointers 210, 310 and 410 for example. If the pointer is not cryptographically encoded, then no decryption is needed to obtain the plaintext linear address. In this embodiment, the noncanonical bits (including the encoded context information) may be overwritten with zeros, as previously described with reference to pointers 210 (generally) and 510 for example.

Once the pointer is decoded and the plaintext linear address is obtained, at 1716, the physical address for the memory location to which the data is to be stored is obtained based on the linear address. The physical address can be obtained using any appropriate operations, such as a translation lookaside buffer look-up.

To increase efficiency in processing, the AES-CTR mode block keystream encryption operations 1720 may be performed in parallel with one or more of the memory store operations 1710. The AES-CTR mode block cipher encryption operations include, at 1722, deriving a data tweak (e.g., initialization vector) at least in part from the encoded pointer. As previously described, for some encoded pointers, a data tweak may include the entire encoded pointer (e.g., 310, 510). In other embodiments using other encoded pointers, such as pointer 410, a data tweak may include some parts that are derived from the encoded pointer (e.g., decoded linear address bits, tag/version metadata portion 401) and possibly other external context information. Generally, embodiments may generate a data tweak using different combinations of encrypted and/or plaintext linear address bits from the encoded pointer, other information derived from the encoded pointer (e.g., decrypted portion(s) of the pointer, encrypted and/or plaintext context information stored in the pointer), and/or external context information (i.e., context information not stored in the encoded pointer).

At 1724, the counter mode block cipher uses the data tweak and a secret data key to compute a counter mode cipher stream (also referred to as "keystream"). In one example, the block cipher can compute the keystream by encrypting the data tweak based on the data key. At 1726, the keystream is stored in a buffer. In some embodiments, the keystream is stored in a store buffer, where the encrypted data is stored before it is moved to memory. In other embodiments, the keystream is stored in a separate cryptographic computing buffer. Additional keystreams may be computed based on incrementing the data tweak value and encrypting the new data tweak with the secret data key. The keystreams can be stored in the buffer so that all of the blocks (or cache lines) of the data can be encrypted.

Once the keystream is generated and the unencrypted data is stored in the store buffer (or other buffer) at 1712, at 1730, the unencrypted data is encrypted using the keystream. Any suitable merging operation may be used to encrypt the encrypted data. For example, an exclusive-OR (XOR) operation may be performed on each buffered keystream and corresponding block or cache line of encrypted data stored at 1712. Each XOR operation produces a block of decrypted data for the associated block or cache line, which can be loaded, read, re-encrypted, or otherwise manipulated by the software as needed. In other embodiments, the merging operation may include a complex logic function, which involves a plurality of logic operations. The plurality of logic operations may include (but is not necessarily limited to) exclusive-OR (XOR) operation(s), AND operation(s), NOT-AND (NAND) operation(s), NOT-OR (NOR) operation(s), inverter operation(s), or any suitable combination thereof.

At 1732, the encrypted data can be stored in memory using the physical address obtained at 1716. Also, it should be noted that, although memory access instructions (e.g., load) are discussed with reference to data accessed from memory, the concepts disclosed in FIG. 17 also apply to accessing code that is stored in memory.

Figure 18:
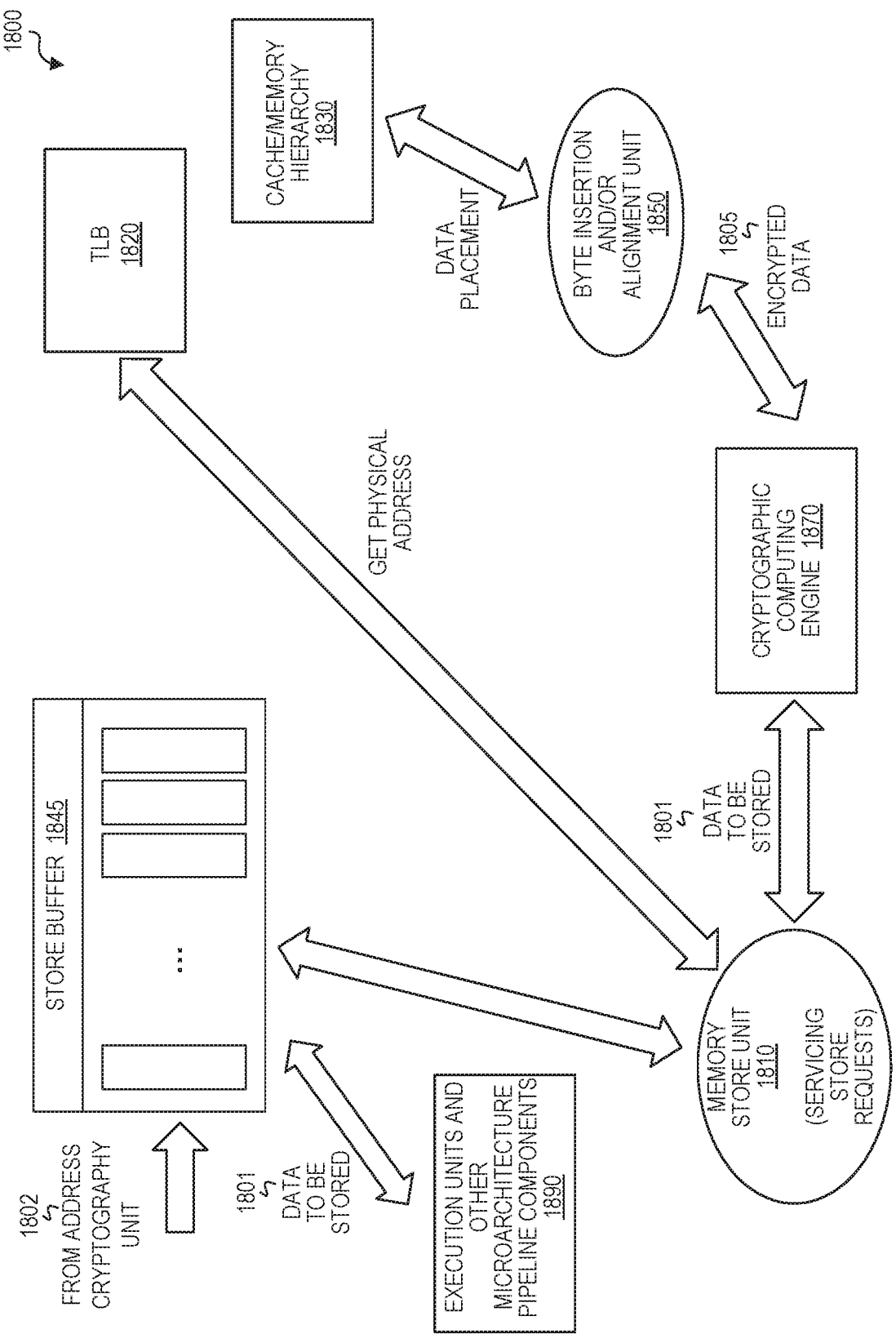
FIG. 18 is a simplified block diagram illustrating another example memory store system with cryptographic computing with asynchronous operations according to at least one embodiment.

FIG. 18 illustrates a memory store system 1800 for cryptographic computing where encryption and decryption of data or code are bound to the contents of an encoded pointer. Memory store system 1800 illustrates data encryption operations being performed serially with memory store operations. Any one of the encoded pointers (or variations thereof) described herein may be used in memory store system 1800. For ease of illustration and description only, memory store system 1800 of FIG. 18 will be described with reference to encoded pointers for data. It should be noted however, that memory store system 1800 may also be implemented for encoded pointers to code, which may be configured like any of the encoded pointers (or variations thereof) described herein (e.g., 210, 310, 410, 510, etc.).

Memory store system 1800 may comprise one or more components (e.g., hardware, software, and/or firmware) as shown and described with reference to computing device 100 for performing operations depicted in FIG. 18. In at least one embodiment, memory store system 1800 can include a store buffer 1845, a memory store unit 1810, and a cryptographic computing engine 1870. These components may be the same or similar to store buffer 184, memory store unit 160, cryptographic computing store unit 174, and cryptographic computing engine 170, respectively, of computing device 100. Memory store system 1800 may also include a translation lookaside buffer (TLB) 1820, which may be implemented as a data translation lookaside buffer (dTLB) (e.g., 186A) and a shared translation lookaside buffer (sTLB) (e.g., 186B) in at least one embodiment. Memory store system 1800 may further include a cache/memory hierarchy 1830, which can include both on-chip memory and off-chip memory (e.g., data cache unit 188, L2 cache unit 189, main memory 120, etc.). Additional components of memory store system 1800, which are not shown in computing device 100, may include a byte selection and alignment unit 1850 and execution units or other microarchitecture pipeline components 1890.

Memory store system 1800 illustrates memory store operations and data encryption operations being performed serially when an encoded pointer (e.g., 310, 410, 510) to data is used in a memory store instruction. Generally, the memory store operations and data encryption operations shown in FIG. 10 are performed subsequent to address decryption and address formation shown in cryptographic computing processes 300, 400, and 500 using encoded pointers 310, 410, and 510, respectively. If TLB lookup optimizations are implemented, however, the TLB lookups shown in FIG. 18 can be performed before an address cryptography unit 1802 has fully decoded the encoded pointer to reveal a decoded (plaintext) linear address.

At 1802, a decoded linear address (e.g., 230, 330, 430, 530) generated from an encoded pointer in an operand of memory store instruction is received by store buffer 1845 from an address cryptography unit. Store buffer 1845 can also receive and store a size of the memory store request, an identifier (ID) of the memory store instruction, and context information associated with the encoded pointer. The context information in the store buffer 1845 may contain metadata encoded in the pointer and, in some embodiments, additional external context information. The data to be stored 1801 may come from execution units and other microarchitecture pipeline components 1890 and may be loaded into store buffer 1845. Alternatively, the data may be stored in some other secure storage until it is encrypted and then loaded into store buffer 1845 in an encrypted form. In one or more embodiments, the data may be indexed in the store buffer 1845 by the encoded pointer. In one or more embodiments, a memory store system that implements serialized encryption and store operations may use a block cipher that does not generate a keystream. Examples of block ciphers that may be used include, but are not necessarily limited to, cryptographically strong block ciphers such as Simon, Speck, tweakable K-cipher, PRINCE, or Gimli. Accordingly, a keystream may not be stored in the store buffer 1845.

As previously described herein, in some embodiments, a cryptographic computing state buffer, such as cryptographic computing state buffer 185 shown in computing device 100, may be provisioned in memory store system 1800 to hold state information associated with memory store instructions, state information associated with memory access instructions, or a combination of both.

Memory store unit 1810 may perform memory store operations by servicing load requests from store buffer 1845. Memory store unit 1810 receives the encoded pointer from the memory store instruction operand and the data to be stored 1801 from the store buffer 1845. Once the store buffer 1845 receives the decoded linear address from the AGU 1802, the decoded linear address can also be provided to memory store unit 1810. Memory store unit 1810 can get the physical address corresponding to the decoded linear address by performing a TLB lookup in TLB 1820. In at least some embodiments, however, the TLB accesses performed by memory store unit 1810 may be optimized in any manner as previously described herein. For example, TLB look-ups can be performed for full matches using encoded pointers or for partial matches using plaintext bits of encoded pointers. This may be done before the memory store unit 1810 receives the decoded linear address.

Memory store unit 1810 may initiate cryptographic computing engine 1870 to encrypt the data to be stored 1801. The cryptographic computing engine 1870 may be implemented as block cipher or other suitable encryption algorithm other than a counter mode block cipher. For example, block ciphers that may be used to implement cryptographic computing engine 1870 may include, but are not necessarily limited to Simon, Speck, tweakable K-cipher, PRINCE, Gimli, or any other block cipher other than the counter mode block cipher (e.g., AES-CTR).

In at least one embodiment, memory store unit 1810 can provide the data to be stored 1801 to cryptographic computing engine 1870. Memory store unit 1810 may also provide a data key, along with the encoded pointer or portions of the encoded pointer and possibly other information (e.g., context information from store buffer 1845, etc.) to be used to generate a data tweak. The data tweak is derived, at least in part, from the encoded pointer and therefore, may vary depending on the particular encoded pointer embodiment, as previously described herein. In some embodiments, memory store unit 1810 may generate the data tweak, but in other embodiments, cryptographic computing engine 1870 may generate the data tweak.

Memory store unit 1810 invokes cryptographic computing engine 1870, which is placed into the pipeline to encrypt the data to be stored 1801. Once cryptographic computing engine 1870 has access to the data to be stored 1801, the data tweak, and the data key, it can perform encryption operations, which may include full diffusion and confusion operations on the data to be stored to generate encrypted data 1805. The encrypted data 1805 can be provided to byte insertion and/or alignment unit 1850 to select the correct bytes of the data to be stored. This may be needed, for example, when a memory store instruction accesses just a portion of one or more cachelines so that the values of other bytes within those cacheline(s) are retained.

The physical address obtained by memory store unit 1810 can be used to store the data in memory (or in cache) of the cache/memory hierarchy 1630.

Figure 19:
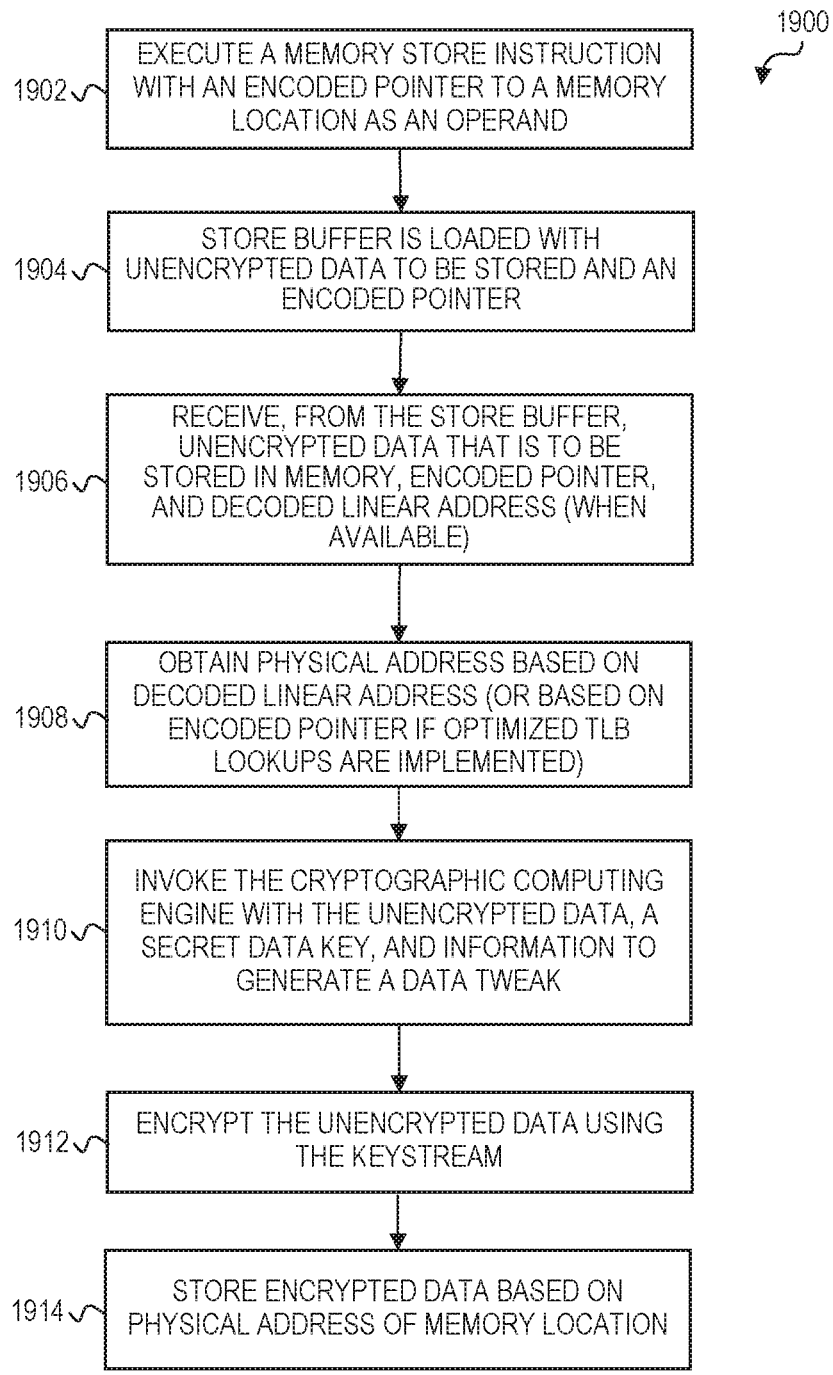
FIG. 19 is a simplified flow chart illustrating possible operations that may occur in the memory store system of FIG. 18 according to at least one embodiment.

FIG. 19 is a simplified flow diagram illustrating an example process 1900 for encrypting data and storing the encrypted data, where the encryption is bound to an encoded pointer that includes at least part of a linear address and at least one item of context information (e.g., size/power metadata, tag/version metadata, etc.), such as encoded pointers described herein (e.g., 310, 410, 510). The flow diagram of FIG. 19 illustrates serial processing that may be performed in one or more embodiments. At least some portions of process 1900 may be executed by hardware, firmware, and/or software of a computing device (e.g., 100). One or more operations of process 1900 may be performed as part of the execution of the memory store instruction (e.g., by memory store unit 160, 1810, store buffer 184, 1845, translation lookaside buffer 186A, 186B, 1820, cryptographic computing engine 170, 1870, address cryptography unit 102, etc.).

At 1902, a memory store instruction to store data in memory is executed. The memory store instruction includes an operand for an encoded pointer to a memory location where the data is to be stored. At 1904, unencrypted data to be stored in memory is loaded into a store buffer by execution units and/or other microarchitecture pipeline components. Also, the encoded pointer from the memory store instruction operand is used to index the data in the store buffer.

At 1906, the unencrypted data and the encoded pointer can be provided to a memory store unit by a store buffer. In addition, an address cryptography unit decodes encoded pointer to reveal a decoded linear address. The decoded linear address is stored in the store buffer, and the store buffer provides the decoded linear address to memory store unit.

At 1908, the decoded linear address may be used to obtain a physical address for the memory location where the encrypted data is to be stored. This may be achieved using any appropriate operations, such as a translation lookaside buffer look-up based on the plaintext linear address. In other embodiments, the TLB lookup may be optimized. In this embodiment, a TLB lookup may be performed for full matches based on the encoded pointer or for a partial match using plaintext bits of the encoded pointer. This may be done before the memory store unit receives the decoded linear address.

At 1910, the memory store unit can invoke the cryptographic computing engine and provide the unencrypted data, a secret data key, and a data tweak (or information to generate a data tweak). The data tweak may be generated or obtained by memory store unit in some embodiments. In other embodiments, the memory store unit may provide information to generate a data tweak to the cryptographic computing engine, which may include enhanced circuitry and logic to generate the data tweak. The information needed to generate a data tweak may be different depending on the particular format of the encoded pointer. Such information may include the encoded pointer, context information embedded in the pointer, external context information, and/or linear address bits.

At 1912, the cryptographic computing engine uses the data tweak and the secret data key to encrypt the unencrypted data. In at least one embodiment, full diffusion and confusion may be used in the encryption.

At 1914, the physical address can be used to store the encrypted data in memory. It should be noted, however, that the encrypted data may be stored in memory or may be stored in a cache closer to the processor for easier access.

Figure 20:
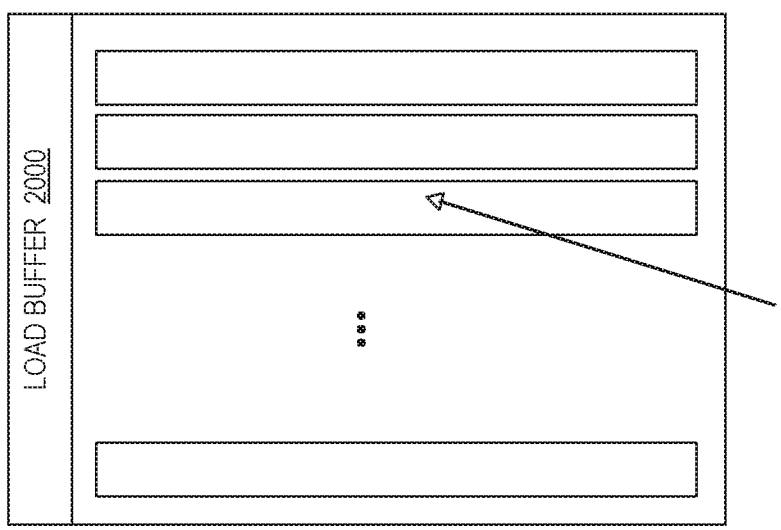
FIG. 20 is an illustration of a load buffer extended to contain cryptographic computing state information according to at least one embodiment.

FIG. 20 is a block diagram illustrating a possible embodiment of a load buffer 2000 that may be provisioned in a computing device in one or more embodiments. Load buffer 2000 is one possible embodiment of load buffers illustrated herein (e.g., 182, 840, 1040). Load buffer 2000 is one possible embodiment of load buffers illustrated herein (e.g., 182, 840, 1040). Load buffer 2000 includes a plurality of entries for data that is requested via a memory access instruction having an operand with an encoded pointer. In addition, load buffer 2000 is extended to include cryptographic computing state 2010 being stored as part of the load buffer. Cryptographic computing state is intended to include any information associated with a memory access instruction and the encoded pointer contained in its operand. In one example, the cryptographic computing state 2010 that is stored as part of load buffer 2000 may include, but is not necessarily limited to, a decoded (plaintext) linear address, a size of the access request, an identifier (ID) of the access request, context information (e.g., embedded in the encoded pointer and/or and possibly external context information that may be used as part of a data (or code) tweak), and a keystream.

Figure 21A:
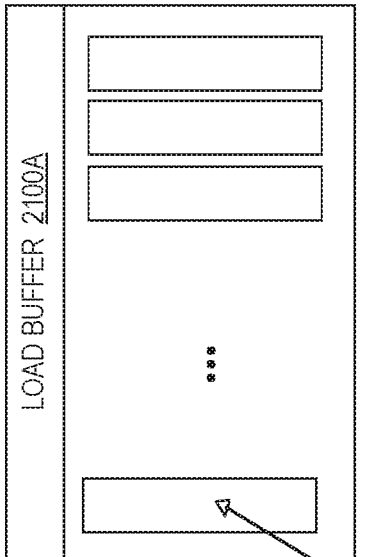
FIGS. 21A-21B are respective illustrations of a load buffer and a separate cryptographic computing state buffer.
Figure 21B:
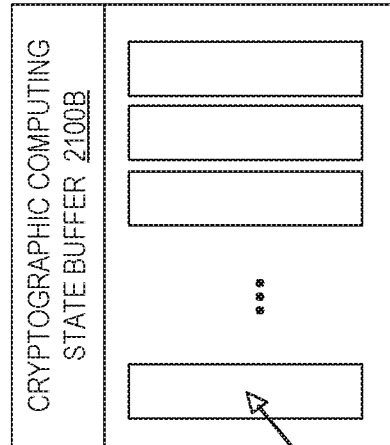

FIGS. 21A-21B are block diagrams illustrating another possible embodiment for maintaining cryptographic computing state information associated with a memory access instruction and an encoded pointer contained in its operand. FIG. 21A illustrates a load buffer 2100A with a plurality of entries for data that is requested via a memory access instruction having an operand with an encoded pointer. In addition, load buffer 2100A may certain other information 2110 related to the memory access instruction. For example, this other information 2110 can include, but is not necessarily limited to a decoded (plaintext) linear address, a size of the memory access request, an identifier (ID) of the memory access request. The cryptographic computing state information associated with the memory access instruction and its encoded pointer may be stored separately in cryptographic computing state buffer 2100B, shown in FIG. 21B. Examples of the cryptographic computing state 2120 that may be stored in the separate state buffer may include, but is not necessarily limited to, the encoded pointer, the ID of the access request, and context information (e.g., embedded in the encoded pointer and/or and possibly external context information that may be used as part of a data (or code) tweak), and a keystream. In this embodiment, the cryptographic computing state 2120 may be accessed separately from accesses to the load buffer 2100A.

Similarly, a store buffer (e.g., 184, 845, 1045, 1645, 1845) may also be extended to include at least some cryptographic computing state. This may be particularly important when memory store instructions are executed and data is encrypted before being stored to memory. For example, the encoded pointer may be used to index data stored in the store buffer. The store buffer may also include other items of cryptographic computing state including, for example, one or more of an ID of a memory store access request, context information (e.g., embedded in the encoded pointer and/or external context information that may be used as part of a data (or code) tweak), and a keystream. Additionally, a cryptographic computing state buffer (e.g., 185) may be implemented exclusively for cryptographic computing state associated with memory store instructions, or may be implemented for a combination of cryptographic computing state associated with memory access instructions and memory store instructions. The cryptographic computing state buffer 2100B may not contain a sufficient number and size of entries to cache the keystream and other state for every outstanding load and/or store in load buffer 2100A and/or a store buffer (e.g., 184, 845, 1045, 1645, 1845), especially since some processors support very large loads and stores (e.g. 512 bits). Each entry 2110 in load buffer 2100A and/or each entry in a store buffer may indicate whether the corresponding cryptographic computing state is currently cached in an entry (e.g., 2120) of cryptographic computing state buffer 2100B and the index of that entry. If a load or store becomes ready while its cryptographic computing state is not currently cached, then that load or store may be delayed while the necessary state is computed. When an entry 2120 becomes available, it may be populated with state for a load buffer entry or store buffer entry that was not previously assigned an entry 2120. When too few cryptographic computing state buffer entries are available for one to be assigned to each load buffer entry 2110 and store buffer entry, then sufficient state may need to be included in each load buffer entry 2110 and store buffer entry to compute the information in a corresponding cryptographic computing state buffer entry 2120 when such an entry becomes available. Otherwise, the processor may be unable to populate a load buffer entry 2110 or store buffer entry with information for an incoming load or store until a cryptographic computing state buffer entry 2120 becomes available. A single load buffer entry 2110 or store buffer entry may reference multiple cryptographic computing state buffer entries 2120 to handle large memory accesses. For example, if each entry 2120 stores 64 bits of keystream, then 8 entries 2120 may be referenced by a single load buffer entry 2110 that represents a 512-bit load. Even one more entry 2120 may be referenced so that unaligned loads can be handled with entirely cached keystreams if each entry 2120 contains an aligned keystream block. In alternative embodiments, the keystream block in each entry 2120 may be aligned to a block boundary relative to the corresponding memory access rather than the absolute linear address. In some embodiments, cryptographic computing state buffer entries 2100B may be shared by multiple load buffer entries 2110 and store buffer entries that all reference the same allocation.

FIGS. 22A and 22B are block diagrams illustrating a computational difference between generating a keystream from a single encryption engine in FIG. 22A versus multiple encryption engines in FIG. 22B. The data (or code) that is being read or stored could be different lengths such as bytes (8 bits), words (16 bits), doublewords (32 bits), quadwords (64 bits), 128 bits, 256 bits, and 512 bits, for example. In addition, the encryption that produces a keystream can be performed at different granularities. Thus, the length of a keystream may vary depending on different implementations and needs. A single computation can be performed to produce a keystream at a particular bit width (e.g., 512 bits) if the block cipher engine is configured with the same bit width. If encryption is performed at shorter lengths, however, then for certain operations, iterations may be performed multiple times to generate the desired keystream. For example, in FIG. 22A, a single 64-bit wide block cipher 2210 may be implemented to produce a 512-bit wide keystream 2212. Thus, eight iterations are required to produce the 512-bit wide keystream 2212. The throughput in this implementation is one clock cycle. For example, coalesced scratchpad or cache accesses by GPUs or vectorized CPU operations may require a wide keystream.

In an alternative implementation, the 64-bit wide block cipher may be replicated eight times to produce the 512-bit wide keystream. For example, a K-cipher may be replicated eight times. Eight 64-bit wide block cipher engines 2220(1)-2220(8) may be provided in parallel to produce 512-bit wide keystream 2222. In this implementation, a very high throughput, low latency engine is provided.

Figure 23A:
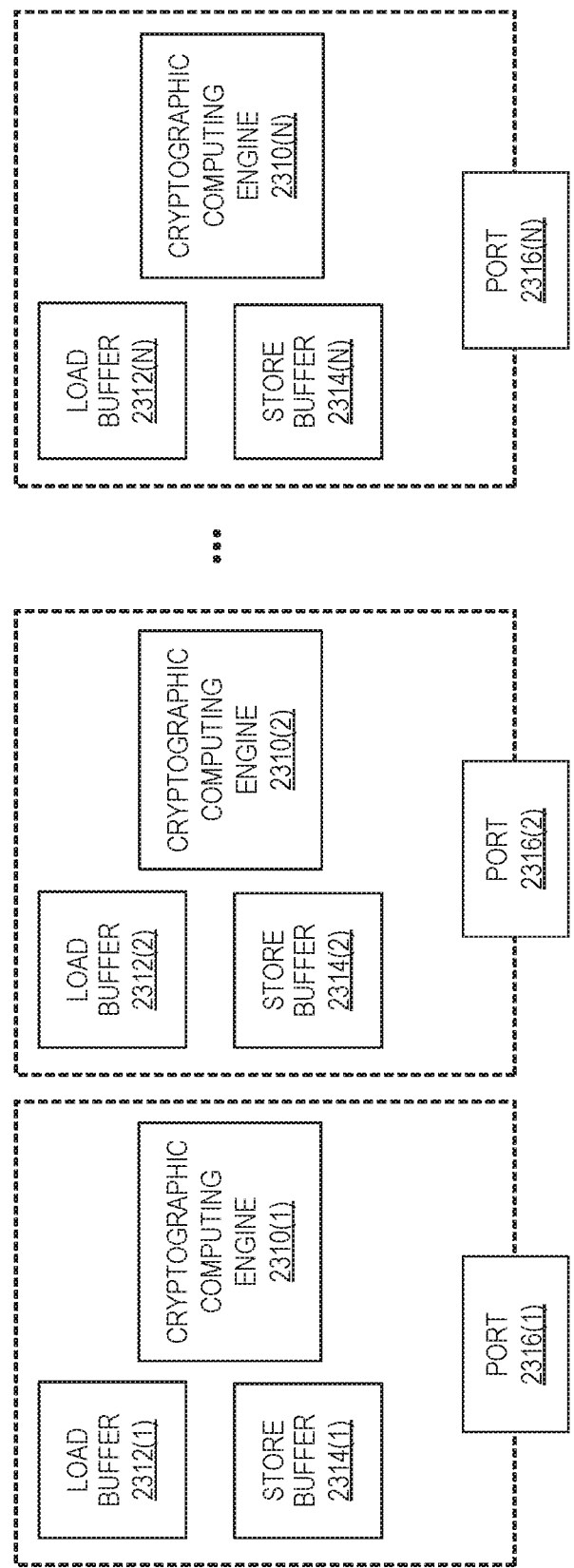
FIGS. 23A-23C are simplified block diagrams illustrating various possible implementations of cryptographic computing engines according to at least one embodiment.
Figure 23B:
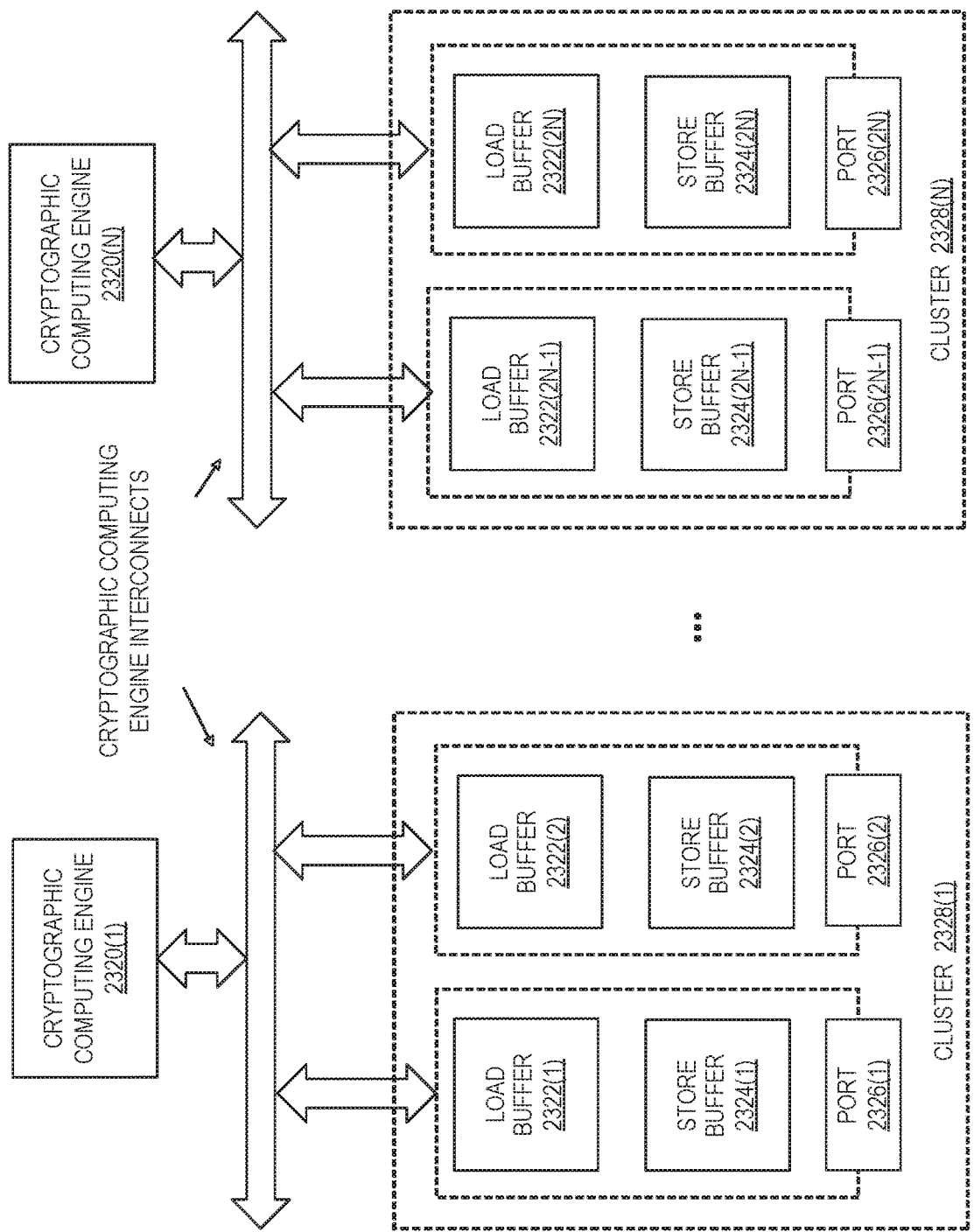
Figure 23C:
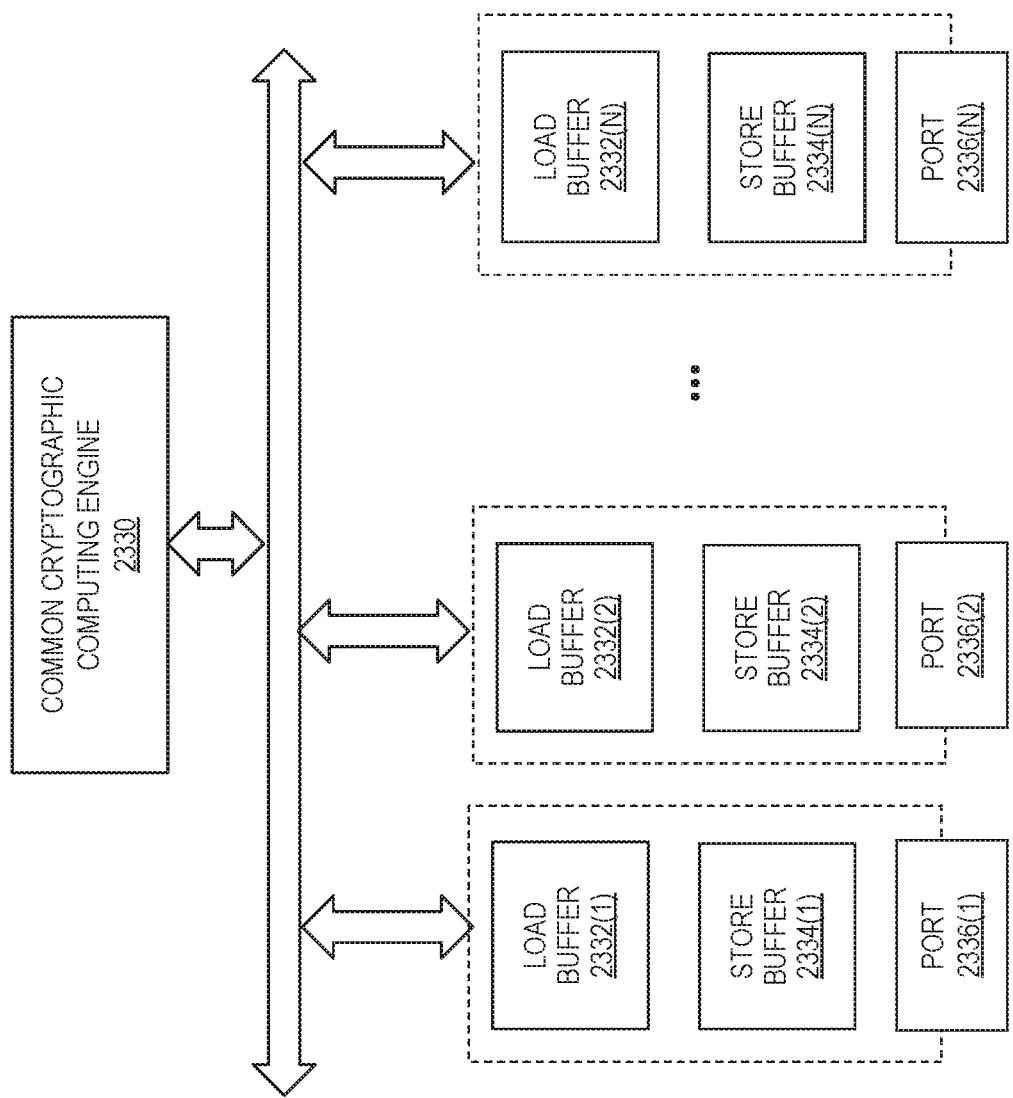

FIGS. 23A-23C are block diagrams illustrating possible placements of cryptographic computing engines in relation to ports for reading and storing data. In FIG. 23A, a separate cryptographic computing engine performs the cryptographic operations in every port. For example, cryptographic computing engines 2310(1)-2310(N) perform cryptographic operations for ports 2316(1)-2316(N), respectively. Load buffers 2312(1)-2312(N) are associated with cryptographic computing engines 2310(1)-2310(N) decrypt data (or code) from load buffers 2312(1)-2312(N), respectively. Similarly, cryptographic computing engines 2310(1)-2310(N) encrypt data (or code) that is stored in store buffers 2314(1)-2314(N), respectively.

In FIG. 23B, clusters 2328(1)-2328(N) of ports share the same cryptographic computing engine. A cryptographic computing engine interconnect connects the ports to the appropriate encryption engine. In addition, some arbitration unit may also be provided. For example, in cluster 2328(1), cryptographic computing engine 2320(1) is shared by ports 2326(1) and 2326(2). Port 2326(1) sends and receives data (or code) from load buffer 2322(1) and store buffer 2324(1), and port 2326(2) sends and receives data (or code) from load buffer 2322(2) and store buffer 2324(2). Similarly, in cluster (N), cryptographic computing engine 2320(N) is shared by ports 2326(2N-1) and 2326(2N). Port 2326(2N-1) sends and receives data (or code) from load buffer 2322(2N-1) and store buffer 2324(2N-1), and port 2326(2N) sends and receives data (or code) from load buffer 2322(2N) and store buffer 2324(2N).

In FIG. 23C, all ports 2336(1)-2336(N) of ports share the same cryptographic computing engine 2330. Port 2336(1). Port 2336(1) sends and receives data (or code) from load buffer 2332(1) and store buffer 2334(1), port 2336(2) sends and receives data (or code) from load buffer 2332(2) and store buffer 2334(2), and port 2336(N) sends and receives data (or code) from load buffer 2332(N) and store buffer 2334(N).

In one embodiment, cryptographic computing engine 2330 may be allocated for one or more ports to perform multiple functions. For example, engine 2330 may handle encryptions and decryptions for data, code, and pointers. In addition, engine 2330 may include a communication unit that can compute keystreams or pointer encodings once and then provide these in a cache (e.g., supplemental cache unit 187) to be available for every subsequent use of the same information.

Example Architectures

Figure 24:
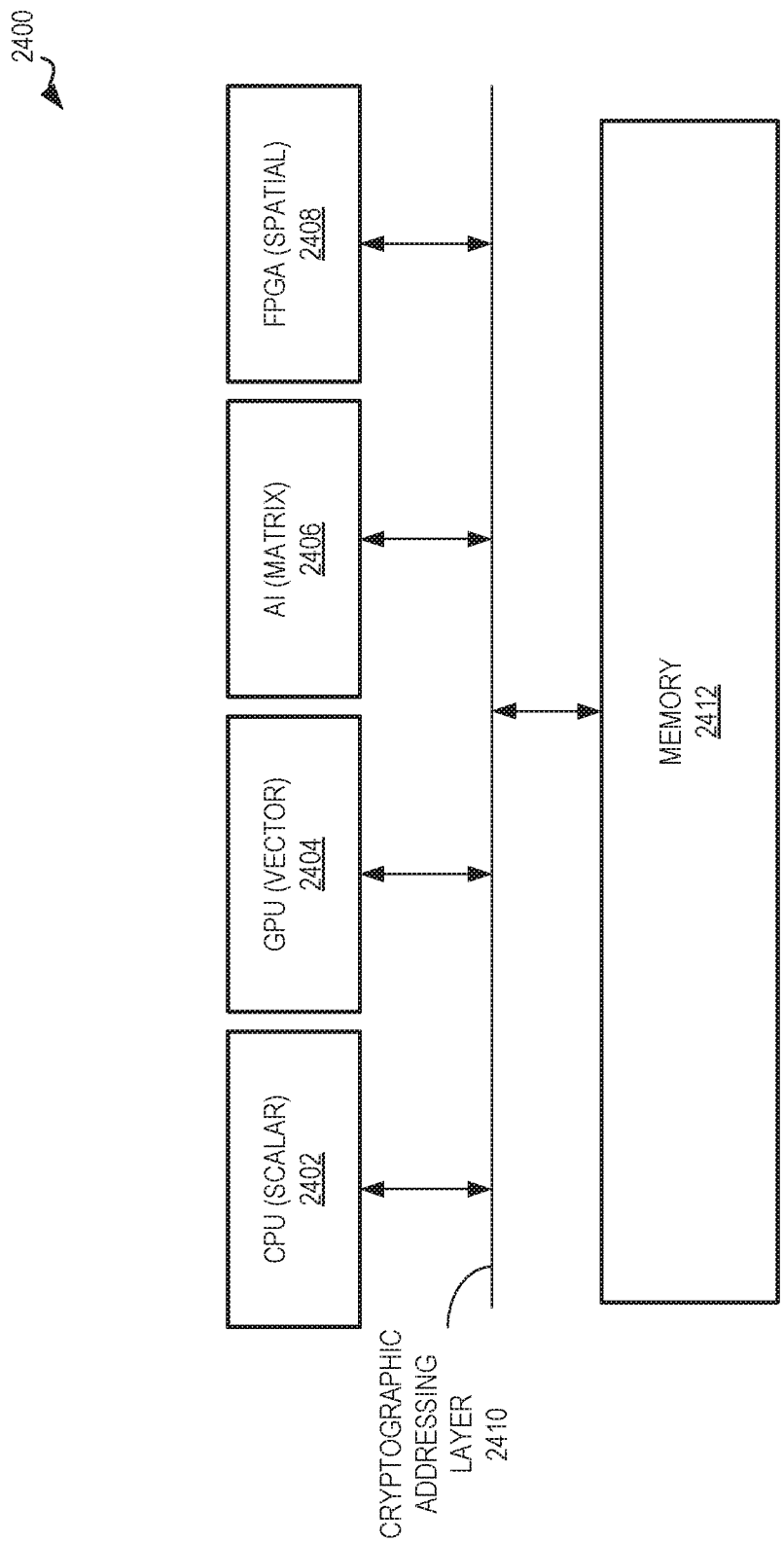
FIG. 24 is a block diagram illustrating an example cryptographic computing environment according to at least one embodiment.

FIG. 24 is a block diagram illustrating an example cryptographic computing environment 2400 according to at least one embodiment. In the example shown, a cryptographic addressing layer 2410 extends across the example compute vectors central processing unit (CPU) 2402, graphical processing unit (GPU) 2404, artificial intelligence (AI) 2406, and field programmable gate array (FPGA) 2408. For example, the CPU 2402 and GPU 2404 may share the same virtual address translation for data stored in memory 2412, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 2412 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 25:
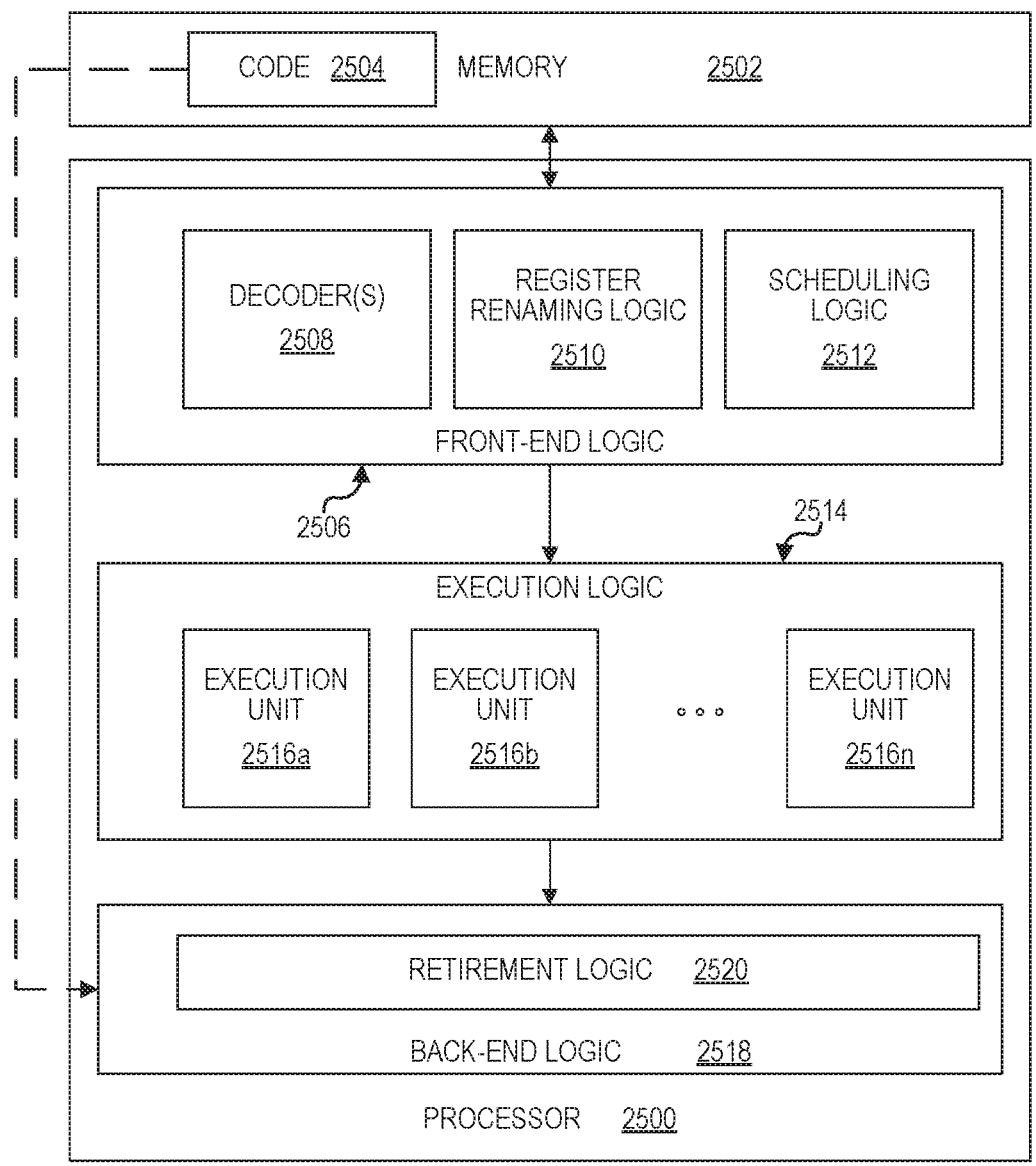
FIG. 25 is a block diagram illustrating an example processor core and memory according to at least one embodiment.
Figure 26:
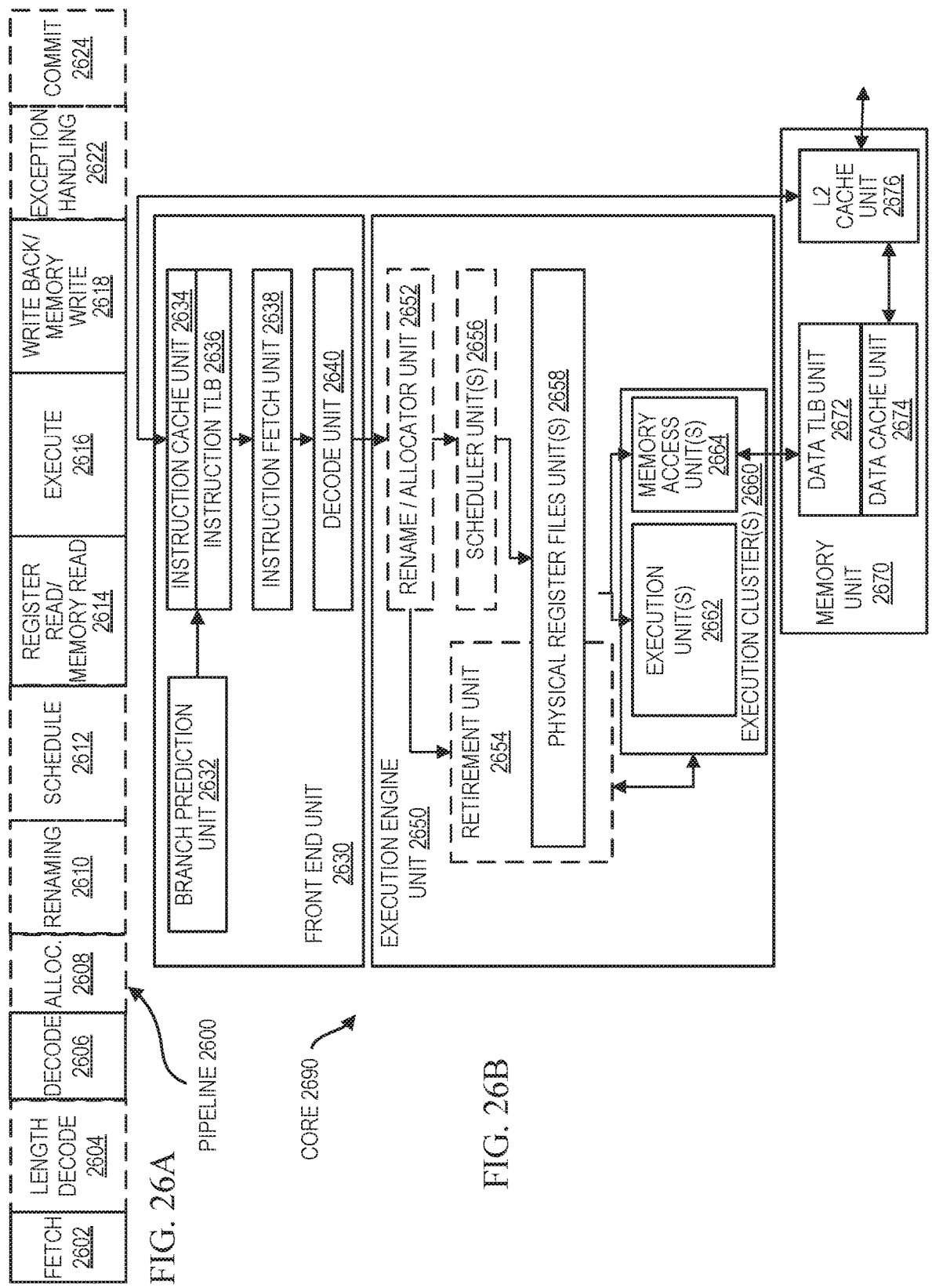
FIG. 26A is a block diagram illustrating both an exemplary in-order pipeline and an exemplary register renaming, out-of-order issue/execution pipeline in accordance with certain embodiments.
FIG. 26B is a block diagram illustrating both an exemplary embodiment of an in-order architecture core and an exemplary register renaming, out-of-order issue/execution architecture core to be included in a processor in accordance with certain embodiments.
Figure 27:
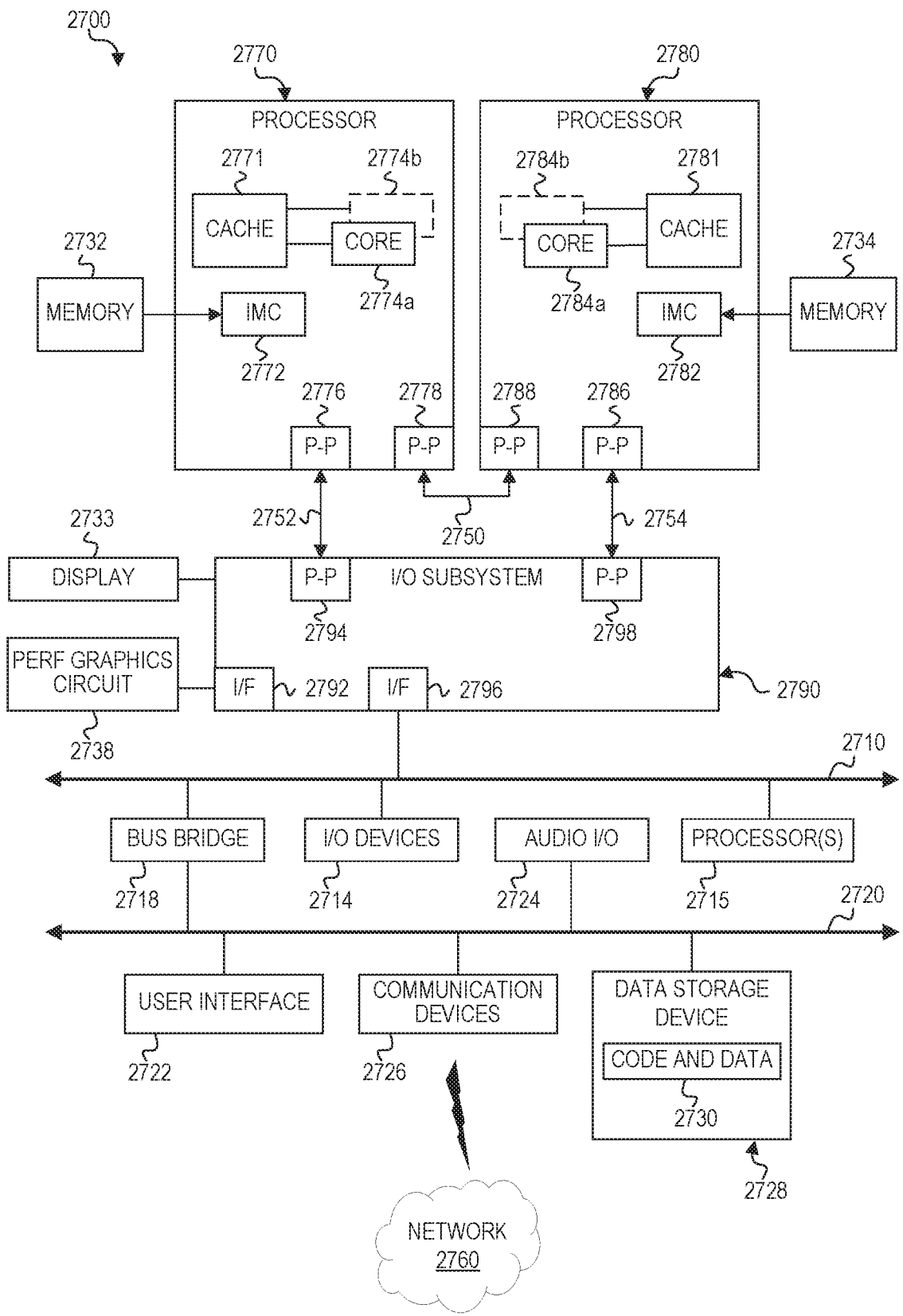
FIG. 27 is a block diagram of an example computer architecture according to at least one embodiment.

FIGS. 25-27 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 25-27.

FIG. 25 is an example illustration of a processor according to an embodiment. Processor 2500 is an example of a type of hardware device that can be used in connection with the implementations shown and described herein (e.g., processor 102). Processor 2500 may be any type of processor, such as a microprocessor, an embedded processor, a digital signal processor (DSP), a network processor, a multi-core processor, a single core processor, or other device to execute code. Although only one processor 2500 is illustrated in FIG. 25, a processing element may alternatively include more than one of processor 2500 illustrated in FIG. 25. Processor 2500 may be a single-threaded core or, for at least one embodiment, the processor 2500 may be multi-threaded in that it may include more than one hardware thread context (or "logical processor") per core.

FIG. 25 also illustrates a memory 2502 coupled to processor 2500 in accordance with an embodiment. Memory 2502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 2500 can execute any type of instructions associated with algorithms, processes, or operations detailed herein. Generally, processor 2500 can transform an element or an article (e.g., data) from one state or thing to another state or thing.

Code 2504, which may be one or more instructions to be executed by processor 2500, may be stored in memory 2502, or may be stored in software, hardware, firmware, or any suitable combination thereof, or in any other internal or external component, device, element, or object where appropriate and based on particular needs. In one example, processor 2500 can follow a program sequence of instructions indicated by code 2504. Each instruction enters a front-end logic 2506 and is processed by one or more decoders 2508. The decoder may generate, as its output, a micro operation such as a fixed width micro operation in a predefined format, or may generate other instructions, microinstructions, or control signals that reflect the original code instruction. Front-end logic 2506 also includes register renaming logic 2510 and scheduling logic 2512, which generally allocate resources and queue the operation corresponding to the instruction for execution.

Processor 2500 can also include execution logic 2514 having a set of execution units 2516a, 2516b, 2516n, etc. Some embodiments may include a number of execution units dedicated to specific functions or sets of functions. Other embodiments may include only one execution unit or one execution unit that can perform a particular function. Execution logic 2514 performs the operations specified by code instructions.

After completion of execution of the operations specified by the code instructions, back-end logic 2518 can retire the instructions of code 2504. In one embodiment, processor 2500 allows out of order execution but requires in order retirement of instructions. Retirement logic 2520 may take a variety of known forms (e.g., re-order buffers or the like). In this manner, processor 2500 is transformed during execution of code 2504, at least in terms of the output generated by the decoder, hardware registers and tables utilized by register renaming logic 2510, and any registers (not shown) modified by execution logic 2514.

Although not shown in FIG. 25, a processing element may include other elements on a chip with processor 2500. For example, a processing element may include memory control logic along with processor 2500. The processing element may include I/O control logic and/or may include I/O control logic integrated with memory control logic. The processing element may also include one or more caches. In some embodiments, non-volatile memory (such as flash memory or fuses) may also be included on the chip with processor 2500.

FIG. 26A is a block diagram illustrating both an exemplary in-order pipeline and an exemplary register renaming, out-of-order issue/execution pipeline according to one or more embodiments of this disclosure. FIG. 26B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 26A-26B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 26A, a processor pipeline 2600 includes a fetch stage 2602, a length decode stage 2604, a decode stage 2606, an allocation stage 2608, a renaming stage 2610, a schedule (also known as a dispatch or issue) stage 2612, a register read/memory read stage 2614, an execute stage 2616, a write back/memory write stage 2618, an exception handling stage 2622, and a commit stage 2624.

FIG. 26B shows processor core 2690 including a front end unit 2630 coupled to an execution engine unit 2650, and both are coupled to a memory unit 2670. Processor core 2690 and memory unit 2670 are examples of the types of hardware that can be used in connection with the implementations shown and described herein (e.g., processor 102, memory 122). The core 2690 may be a reduced instruction set computing (RISC) core, a complex instruction set computing (CISC) core, a very long instruction word (VLIW) core, or a hybrid or alternative core type. As yet another option, the core 2690 may be a special-purpose core, such as, for example, a network or communication core, compression engine, coprocessor core, general purpose computing graphics processing unit (GPGPU) core, graphics core, or the like. In addition, processor core 2690 and its components represent example architecture that could be used to implement logical processors and their respective components.

The front end unit 2630 includes a branch prediction unit 2632 coupled to an instruction cache unit 2634, which is coupled to an instruction translation lookaside buffer (TLB) unit 2636, which is coupled to an instruction fetch unit 2638, which is coupled to a decode unit 2640. The decode unit 2640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2690 includes a microcode ROM or other medium that stores microcode for certain macroinstructions (e.g., in decode unit 2640 or otherwise within the front end unit 2630). The decode unit 2640 is coupled to a rename/allocator unit 2652 in the execution engine unit 2650.

The execution engine unit 2650 includes the rename/allocator unit 2652 coupled to a retirement unit 2654 and a set of one or more scheduler unit(s) 2656. The scheduler unit(s) 2656 represents any number of different schedulers, including reservations stations, central instruction window, etc. The scheduler unit(s) 2656 is coupled to the physical register file(s) unit(s) 2658. Each of the physical register file(s) units 2658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2658 comprises a vector registers unit, a write mask registers unit, and a scalar registers unit. These register units may provide architectural vector registers, vector mask registers, and general purpose registers (GPRs). In at least some embodiments described herein, register units 2658 are examples of the types of hardware that can be used in connection with the implementations shown and described herein (e.g., registers 112). The physical register file(s) unit(s) 2658 is overlapped by the retirement unit 2654 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 2654 and the physical register file(s) unit(s) 2658 are coupled to the execution cluster(s) 2660. The execution cluster(s) 2660 includes a set of one or more execution units 2662 and a set of one or more memory access units 2664. The execution units 2662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 2662 may also include an address generation unit to calculate addresses used by the core to access main memory (e.g., memory unit 2670). In some embodiments, the AGU may incorporate, or communicate with an address cryptography unit (e.g., 102) for decoding encoded pointers.

The scheduler unit(s) 2656, physical register file(s) unit(s) 2658, and execution cluster(s) 2660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2664). It should also be understood that where separate pipelines are used, one or more of these pipelines may be out-of-order issue/execution and the rest in-order.

The set of memory access units 2664 is coupled to the memory unit 2670, which includes a data TLB unit 2672 coupled to a data cache unit 2674 coupled to a level 2 (L2) cache unit 2676. In one exemplary embodiment, the memory access units 2664 may include a load unit, a store address unit, and a store data unit, each of which is coupled to the data TLB unit 2672 in the memory unit 2670. The instruction cache unit 2634 is further coupled to a level 2 (L2) cache unit 2676 in the memory unit 2670. The L2 cache unit 2676 is coupled to one or more other levels of cache and eventually to a main memory. In addition, a page miss handler (e.g., page miss handler 826) may also be included in core 2690 to look up an address mapping in a page table if no match is found in the data TLB unit 2672.

By way of example, the exemplary register renaming, out-of-order issue/execution core architecture may implement the pipeline 2600 as follows: 1) the instruction fetch unit 2638 performs the fetch and length decoding stages 2602 and 2604; 2) the decode unit 2640 performs the decode stage 2606; 3) the rename/allocator unit 2652 performs the allocation stage 2608 and renaming stage 2610; 4) the scheduler unit(s) 2656 performs the schedule stage 2612; 5) the physical register file(s) unit(s) 2658 and the memory unit 2670 perform the register read/memory read stage 2614; the execution cluster 2660 perform the execute stage 2616; 6) the memory unit 2670 and the physical register file(s) unit(s) 2658 perform the write back/memory write stage 2618; 7) various units may be involved in the exception handling stage 2622; and 8) the retirement unit 2654 and the physical register file(s) unit(s) 2658 perform the commit stage 2624.

The core 2690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 2634/2674 and a shared L2 cache unit 2676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 27 illustrates a computing system 2700 that is arranged in a point-to-point (PtP) configuration according to an embodiment. In particular, FIG. 27 shows a system where processors, memory, and input/output devices are interconnected by a number of point-to-point interfaces. Generally, one or more of the computing systems or computing devices described (e.g., computing device 100) herein may be configured in the same or similar manner as computing system 2700.

Processors 2770 and 2780 may be implemented as single core processors 2774*a* and 2784*a* or multi-core processors 2774*a*-2774*b* and 2784*a*-2784*b*. Processors 2770 and 2780 may each include a cache 2771 and 2781 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 2700. Moreover, processors 2770 and 2780 are examples of the types of hardware that can be used in connection with the implementations shown and described herein (e.g., processor 102).

Processors 2770 and 2780 may also each include integrated memory controller logic (MC) 2772 and 2782 to communicate with memory elements 2732 and 2734, which may be portions of main memory locally attached to the respective processors. In alternative embodiments, memory controller logic 2772 and 2782 may be discrete logic separate from processors 2770 and 2780. Memory elements 2732 and/or 2734 may store various data to be used by processors 2770 and 2780 in achieving operations and functionality outlined herein.

Processors 2770 and 2780 may be any type of processor, such as those discussed in connection with other figures. Processors 2770 and 2780 may exchange data via a point-to-point (PtP) interface 2750 using point-to-point interface circuits 2778 and 2788, respectively. Processors 2770 and 2780 may each exchange data with an input/output (I/O) subsystem 2790 via individual point-to-point interfaces 2752 and 2754 using point-to-point interface circuits 2776, 2786, 2794, and 2798. I/O subsystem 2790 may also exchange data with a high-performance graphics circuit 2738 via a high-performance graphics interface 2739, using an interface circuit 2792, which could be a PtP interface circuit. In one embodiment, the high-performance graphics circuit 2738 is a special-purpose processor, such as, for example, a high-throughput MIC processor, a network or communication processor, compression engine, graphics processor, GPGPU, embedded processor, or the like. I/O subsystem 2790 may also communicate with a display 2733 for displaying data that is viewable by a human user. In alternative embodiments, any or all of the PtP links illustrated in FIG. 27 could be implemented as a multi-drop bus rather than a PtP link.

I/O subsystem 2790 may be in communication with a bus 2710 via an interface circuit 2796. Bus 2710 may have one or more devices that communicate over it, such as a bus bridge 2718, I/O devices 2714, and one or more other processors 2715. Via a bus 2720, bus bridge 2718 may be in communication with other devices such as a user interface 2722 (such as a keyboard, mouse, touchscreen, or other input devices), communication devices 2726 (such as modems, network interface devices, or other types of communication devices that may communicate through a computer network 2760), audio I/O devices 2724, and/or a data storage device 2728. Data storage device 2728 may store code and data 2730, which may be executed by processors 2770 and/or 2780. In alternative embodiments, any portions of the bus architectures could be implemented with one or more PtP links.

Program code, such as code 2730, may be applied to input instructions to perform the functions described herein and generate output information. The output information may be applied to one or more output devices, in known fashion. For purposes of this application, a processing system may be part of computing system 2700 and includes any system that has a processor, such as, for example; a digital signal processor (DSP), a microcontroller, an application specific integrated circuit (ASIC), or a microprocessor.

The program code (e.g., 2730) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 27 is a schematic illustration of an embodiment of a computing system that may be utilized to implement various embodiments discussed herein. It will be appreciated that various components of the system depicted in FIG. 27 may be combined in a system-on-a-chip (SoC) architecture or in any other suitable configuration capable of achieving the functionality and features of examples and implementations provided herein.

Figure 28:
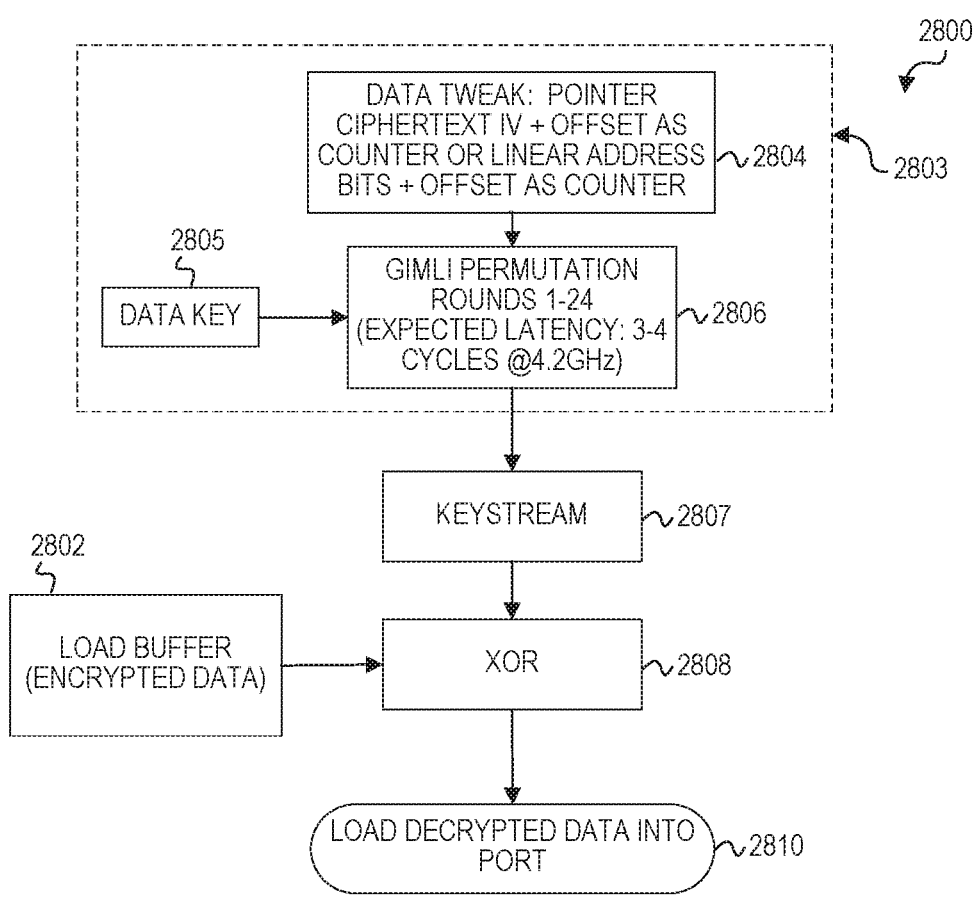
FIG. 28 is a block diagram of a Gimli counter mode block cipher that may be used for encryption and decryption according to at least one embodiment.

FIG. 28 illustrates a data decryption flow 2800 using yet another block cipher known as Gimli. Gimli is a new lightweight encryption technique, and its twenty-four rounds is expected to be completed in three to four cycles at at 4.2 GHz, instead of six to ten cycles for AES at 1.5 GHz clock. Decryption flow 2800 illustrates decryption of encrypted data that is referenced by a cryptographically encoded pointer, such as pointer 310 or 410. Gimli is a block cipher that can be used in a counter mode encryption procedure and a counter mode decryption procedure using the same secret data key and the same data tweak. For example, in a Gimli mode encryption procedure, a Gimli block cipher encrypts a data tweak based on a secret data key to create a keystream that then encrypts a block of data using an XOR operation. In a counterpart Gimli decryption procedure, the Gimli block cipher encrypts the same data tweak based on the same secret data key to create the keystream that then decrypts the corresponding block of encrypted data using an XOR operation.

In an example, prior to decryption flow 2800 being invoked, data is encrypted in Gimli mode encryption procedure. In the Gimli mode encryption procedure, Gimli block cipher 2806 encrypts a data tweak/initialization vector (IV) 2804 based on a secret data key 2805 to create a keystream 2807. The keystream 2807 is used in an XOR operation 2808 to encrypt a block of data. This may be performed for multiple blocks of data with Gimli block cipher 2806 encrypting a new data tweak for each block of data to be encrypted. The new data tweak may be computed by incrementing a counter in the data tweak.

The counter (or tweak/IV) 2804 can include any suitable tweak (e.g., 344, 444, 544) based on the particular encoded pointer used to reference the data. For example, a counter (or data tweak/IV) for pointer 310 may include a ciphertext portion (e.g., 304) and an offset (e.g., 306 and 308), a counter (or data tweak/IV) for pointer 410 may include at least a portion of the decoded linear address (e.g., 430) with an offset added, a counter (or data tweak/IV) for pointer 510 may include the plaintext linear address (e.g., 508) with an offset included.

After the Gimli mode encryption procedure is completed and encrypted data is generated, decryption flow 2800 may be invoked when the encrypted data is accessed by software (e.g., load or store instructions, etc.). In the decryption flow 2800, the encrypted data generated by the Gimli mode encryption procedure is loaded into a buffer at 2802. The Gimli mode block cipher 2806 encrypts the same data tweak 2804 based on the same secret data key 2805 to create the keystream 2807. The keystream 2807 is used in the XOR operation 2808 to decrypt the corresponding block of encrypted data that was previously generated by the Gimli encryption procedure. This may be performed for each block of encrypted data using a new data tweak (e.g., computed by incrementing the counter in the data tweak) for each block. The decrypted data can be loaded into a port at 2810 for use by the software.

It should also be noted that in some embodiments, operations indicated at 2803 may be performed in parallel to operations to obtain encrypted data to be decrypted. The operations for obtaining the encrypted data include decoding a cryptographically encoded pointer to form a linear base address and using the linear base address to locate and retrieve the encrypted data. The encrypted data may then be stored in the buffer at 2802. Also, it should be further noted that the block ciphers shown and described with reference to FIG. 28 could also be adapted to perform cryptographic operations on linear base addresses (e.g., a slice of a linear base address) that are formed into cryptographically encoded pointers (e.g., 310, 410). Additionally, the cryptographic operations described with reference to data in FIG. 28 are also applicable to code referenced by an encoded pointer, and cryptographically bound to the encoded pointer.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

Example A1 provides an apparatus, a system, a processor, a machine readable medium, a method, and/or hardware-, firmware-, and/or software-based logic, where the Example of A1 includes storing, in a register, an encoded pointer to a memory location, where first context information is stored in first bits of the encoded pointer and a slice of a linear address of the memory location is stored in second bits of the encoded pointer. Example A1 further includes executing a memory access instruction, the executing including: obtaining a physical address of the memory location; accessing encrypted data at the memory location; deriving a first tweak based at least in part on the encoded pointer; generating a keystream based on the first tweak and a key; storing, in a first buffer, state information associated with memory access instruction; and decrypting the encrypted data based on the keystream, where the keystream is to be generated at least partly in parallel with accessing the encrypted data.

In Example A2, the subject matter of Example A1 can optionally include where the state information includes the encoded pointer, the keystream, the first context information, and an identifier associated with the memory access instruction.

In Example A3, the subject matter of Example A2 can optionally include where the first buffer further includes the linear address of the memory location, a size of data requested by the memory access instruction, and the encrypted data.

In Example A4, the subject matter of Example A2 can optionally include storing, in a second buffer, the linear address, a size of data requested by the memory access instruction, the identifier associated with the memory access instruction, and the encrypted data.

In Example A5, the subject matter of any one of Examples A1-A4 can optionally include searching a translation lookaside buffer (TLB) based on the encoded pointer, determining that the physical address is mapped to the encoded pointer in the TLB, and retrieving the physical address from the TLB.

In Example A6, the subject matter of any one of Examples A1-A4 can optionally include identifying a plaintext portion of the linear address stored in the encoded pointer, searching a translation lookaside buffer (TLB) based on the plaintext portion of the linear address, identifying a speculative linear address based, at least in part, on a portion of the speculative linear address matching the plaintext portion of the linear address stored in the encoded pointer, retrieving a speculative physical address mapped to the speculative linear address in the TLB, decoding the encoded pointer to obtain a decoded linear address, and comparing the speculative linear address to the decoded linear address to determine whether to perform a new search in the TLB based on the decoded linear address.

In Example A7, the subject matter of Example A6 can optionally include in response to determining that the speculative linear address does not match the decoded linear address, ceasing pipeline operations associated with the speculative linear address.

In Example A8, the subject matter of Example A7 can optionally include performing a second search in the TLB using the decoded linear address, identifying a matching linear address, where the matching linear address is mapped to the physical address of the memory location, and retrieving the physical address from the TLB.

In Example A9, the subject matter of Example A6 can optionally include in response to a determination that the speculative linear address does match the decoded linear address, allowing pipeline operations associated with the speculative linear address to continue.

In Example A10, the subject matter of A9 can optionally include where the pipeline operations include using the speculative physical address to access the encrypted data at the memory location.

In Example A11, the subject matter of any one of Examples A6-A10 can optionally include where the slice of the linear address stored in the second bits of the encoded pointer includes the plaintext portion of the linear address.

In Example A12, the subject matter of any one of Examples A6-A11 can optionally include where the plaintext portion of the linear address is stored externally to the encoded pointer.

In Example A13, the subject matter of any one of Examples A1-A4 can optionally include storing temporarily in a store buffer, data to be stored to memory, and executing a second memory access instruction for a second encoded pointer to a second memory location, the executing including: searching the store buffer based on the second encoded pointer; identifying a matching encoded pointer based on the search; retrieving second data indexed by the matching encoded pointer from the store buffer; and storing the second data in the first buffer.

In Example A14, the subject matter of Example A13 can optionally include deriving a second tweak based at least in part on the second encoded pointer, generating a second keystream based on the second tweak and a second key, and decrypting the second data based on the keystream.

In Example A15, the subject matter of any one of Examples A1-A4 can optionally include storing temporarily in a store buffer, data to be stored to memory, and executing a third memory access instruction for a third encoded pointer to a third memory location, the executing including: identifying a plaintext portion of a third linear address stored in the third encoded pointer; searching the store buffer based on the plaintext portion of the third linear address; identifying a speculative encoded pointer based, at least in part, on a portion of the speculative encoded pointer matching the plaintext portion of the third linear address; and in response to identifying the speculative encoded pointer, determining whether the speculative encoded pointer corresponds to the third encoded pointer.

In Example A16, the subject matter of Example A13 can optionally include retrieving third data indexed by the speculative encoded pointer in response to determining that the speculative encoded pointer corresponds to the third encoded pointer, and storing the third data in the first buffer.

In Example A17, the subject matter of Example A13 can optionally include obtaining a second physical address for the third memory location from a translation lookaside buffer (TLB) in response to determining that the speculative encoded pointer does not correspond to the third encoded pointer, accessing second encrypted data at the third memory location, and decrypting the second encrypted data based on a second tweak and the key.

In Example A18, the subject matter of any one of Examples A1-A17 can optionally include where the decrypting the encrypted data based on the keystream includes merging the keystream and the encrypted data using one of an exclusive-or (XOR) operation or a logic function including a plurality of logic operations.

In Example A19, the subject matter of any one of Examples A1-A18 can optionally include where the executing the first memory access instruction further includes: prior to generating the keystream, searching a cache unit based on the encoded pointer to determine whether the encoded pointer is mapped to a precomputed keystream, where the keystream is generated in response to determining that the encoded pointer is not mapped to any of the precomputed keystreams stored in the cache unit.

Example B1 provides an apparatus, a system, a processor, a machine readable medium, a method, and/or hardware-, firmware-, and/or software-based logic, where the Example of B1 includes: storing, in a register, an encoded pointer to a memory location, where first context information is stored in first bits of the encoded pointer and a slice of a linear address of the memory location is stored in second bits of the encoded pointer; storing, in a cache unit, precomputed keystreams mapped to encoded pointers; and executing a memory access instruction, the executing including: accessing first encrypted data at the memory location; identifying, in the cache unit, a first precomputed keystream mapped to the encoded pointer, where the first precomputed keystream is generated based on a key and a first data tweak derived at least in part from the encoded pointer and a first offset; retrieving, from the cache unit, the first precomputed keystream; and decrypting the first encrypted data based at least in part on the first precomputed keystream.

In Example B2, the subject matter of Example B1 can optionally include where the cache unit includes a second precomputed keystream generated based on the key and a second tweak, where the second tweak is derived at least in part from the encoded pointer and a second offset.

In Example B3, the subject matter of Example B2 can optionally include where the first encrypted data includes more bits than the first precomputed keystream, where method further comprises retrieving, from the cache unit, the second precomputed keystream, where the first encrypted data is to be decrypted based, in part, on the second precomputed keystream.

In Example B4, the subject matter of Example B2 can optionally include where a first segment of the first encrypted data is contained in a first block of data, and where a second segment of the first encrypted data is contained in a second block of data that is adjacent to the first block of data, where method further comprises: retrieving, from the cache unit, the second precomputed keystream, and decrypting the second segment of the first encrypted data based at least in part of the second precomputed keystream.

In Example B5, the subject matter of any one of Examples B1-B4 can optionally include where the cache unit is content addressable memory (CAM).

An Example Y1 provides an apparatus, the apparatus comprising means for performing the method of any one of the Examples A1-A19 or B1-B5.

In Example Y2, the subject matter of Example Y1 can optionally include that the means for performing the method comprises at least one processor and at least one memory element.

In Example Y3, the subject matter of Example Y2 can optionally where the at least one memory element comprises machine readable instructions that when executed, cause the apparatus to perform the method of any one of Examples A1-A19 or B1-B5.

In Example Y4, the subject matter of any one of Examples Y1-Y3 can optionally include that the apparatus is one of a computing system or a system-on-a-chip.

An Example X1 provides at least one machine readable storage medium comprising instructions, where the instructions when executed realize an apparatus, realize a system, or implement a method in any one of the preceding Examples A1-A19 or B1-B5.

What is claimed is:

1. A processor, comprising:
   a first register to store an encoded pointer to a memory location, wherein first context information is stored in first bits of the encoded pointer and a slice of a linear address of the memory location is stored in second bits of the encoded pointer; and
   circuitry to execute a memory access instruction to:
      access encrypted data at the memory location;
      derive a first tweak based at least in part on the encoded pointer;
      generate a keystream based on the first tweak and a first key;
      and
      decrypt the encrypted data based on the keystream, wherein the keystream is to be generated at least partly in parallel with accessing the encrypted data.

2. The processor of claim 1, wherein the circuitry is to execute the memory access instruction to further:
   store, in a first buffer, state information associated with the memory access instruction, wherein the state information includes the encoded pointer, the keystream, the first context information, and an identifier associated with the memory access instruction.

3. The processor of claim 2, wherein the first buffer further includes the linear address of the memory location, a size of data requested by the memory access instruction, and the encrypted data.

4. The processor of claim 2, further comprising:
   a second buffer to store the linear address, a size of data requested by the memory access instruction, the identifier associated with the memory access instruction, and the encrypted data.

5. The processor of claim 1, wherein the circuitry is to execute the memory access instruction to further:
   search a translation lookaside buffer (TLB) based on the encoded pointer;
   determine that a physical address of the memory location is mapped to the encoded pointer in the TLB; and
   retrieve the physical address from the TLB.

6. The processor of claim 1, wherein the circuitry is to execute the memory access instruction to further:
   identify a plaintext portion of the linear address stored in the encoded pointer;
   search a translation lookaside buffer (TLB) based on the plaintext portion of the linear address;
   identify a speculative linear address based, at least in part, on a portion of the speculative linear address matching the plaintext portion of the linear address stored in the encoded pointer;

retrieve a speculative physical address mapped to the speculative linear address in the TLB;

decode the encoded pointer to obtain a decoded linear address; and compare the speculative linear address to the decoded linear address to determine whether to perform a new search in the TLB based on the decoded linear address.

7. The processor of claim 6, wherein the circuitry is to execute the memory access instruction to further:

cease pipeline operations associated with the speculative linear address in response to a determination that the speculative linear address does not match the decoded linear address.

8. The processor of claim 7, wherein the circuitry is to execute the memory access instruction to further:

perform a second search in the TLB using the decoded linear address;

identify a matching linear address, wherein the matching linear address is mapped to a physical address of the memory location; and retrieve the physical address from the TLB.

9. The processor of claim 6, wherein the circuitry is to execute the memory access instruction to further:

allow pipeline operations associated with the speculative linear address to continue in response to a determination that the speculative linear address does match the decoded linear address.

10. The processor of claim 9, wherein the pipeline operations include using the speculative physical address to access the encrypted data at the memory location.

11. The processor of claim 6, wherein the slice of the linear address stored in the second bits of the encoded pointer includes the plaintext portion of the linear address.

12. The processor of claim 6, wherein the plaintext portion of the linear address is stored externally to the encoded pointer.

13. The processor of claim 1, further comprising:

a store buffer to temporarily store data to be stored to memory, wherein the circuitry is to execute a second memory access instruction for a second encoded pointer to a second memory location, to:

search the store buffer based on the second encoded pointer;

identify a matching encoded pointer based on the search; and retrieve second data indexed by the matching encoded pointer from the store buffer.

14. The processor of claim 13, wherein the circuitry is to execute the second memory access instruction to further:

derive a second tweak based at least in part on the second encoded pointer;

generate a second keystream based on the second tweak and a second key; and decrypt the second data based on the keystream.

15. The processor of claim 1, further comprising:

a store buffer to temporarily store data to be stored to memory, wherein the circuitry is to execute a third memory access instruction for a third encoded pointer to a third memory location, to:

identify a plaintext portion of a third linear address stored in the third encoded pointer;

search the store buffer based on the plaintext portion of the third linear address;

identify a speculative encoded pointer based, at least in part, on a portion of the speculative encoded pointer matching the plaintext portion of the third linear address; and in response to identifying the speculative encoded pointer, determine whether the speculative encoded pointer corresponds to the third encoded pointer.

16. The processor of claim 15, wherein the circuitry is to execute the third memory access instruction to further:

retrieve third data indexed by the speculative encoded pointer in response to determining that the speculative encoded pointer corresponds to the third encoded pointer.

17. The processor of claim 15, wherein the circuitry is to execute the third memory access instruction to further:

obtain a second physical address for the third memory location from a translation lookaside buffer (TLB) in response to determining that the speculative encoded pointer does not correspond to the third encoded pointer;

access second encrypted data at the third memory location; and decrypt the second encrypted data based on a second tweak and the first key.

18. The processor of claim 1, wherein to decrypt the encrypted data based on the keystream is to include:

merging the keystream and the encrypted data using one of an exclusive-or (XOR) operation or a logic function including a plurality of logic operations.

19. The processor of claim 1, wherein the circuitry is to execute the memory access instruction to further:

prior to generating the keystream, search a cache unit based on the encoded pointer to determine whether the encoded pointer is mapped to a precomputed keystream, wherein the keystream is generated in response to determining that the encoded pointer is not mapped to any of the precomputed keystreams stored in the cache unit.

20. A non-transitory machine-readable medium with code stored thereon, wherein the code is executable to cause a machine to:

store, in a register, an encoded pointer to a memory location, wherein first context information is stored in first bits of the encoded pointer and a slice of a linear address of the memory location is stored in second bits of the encoded pointer; and execute a memory access instruction to:

access encrypted data at the memory location;

derive a first tweak based at least in part on the encoded pointer;

generate a keystream based on the first tweak and a key; and decrypt the encrypted data based on the keystream, wherein the keystream is to be generated at least partly in parallel with accessing the encrypted data.

21. The non-transitory machine-readable medium of claim 20, wherein the code is executable to cause the machine to further:

store, in a first buffer, state information associated with the memory access instruction; and store, in a second buffer, the linear address, a size of data requested by the memory access instruction, an identifier associated with the memory access instruction, and the encrypted data.

22. The non-transitory machine-readable medium of claim 20, wherein the code is executable to cause the machine to further:

search a translation lookaside buffer (TLB) based on the encoded pointer;

determine that a physical address of the memory location is mapped to the encoded pointer in the TLB; and retrieve the physical address from the TLB.

23. The non-transitory machine-readable medium of claim 20, wherein the code is executable to cause the machine to execute the memory access instruction to:
   prior to generating the keystream, search a cache unit based on the encoded pointer to determine whether the encoded pointer is mapped to a precomputed keystream, wherein the keystream is generated in response to determining that the encoded pointer is not mapped to any of the precomputed keystreams stored in the cache unit.

24. A method comprising:
   storing, in a register, an encoded pointer to a memory location, wherein first context information is stored in first bits of the encoded pointer and a slice of a linear address of the memory location is stored in second bits of the encoded pointer;
   executing a memory access instruction, the executing including:
      accessing encrypted data at the memory location;
      deriving a first tweak based at least in part on the encoded pointer;
      generating a keystream based on the first tweak and a key;
      and
      decrypting the encrypted data based on the keystream, wherein the keystream is to be generated at least partly in parallel with accessing the encrypted data.

25. The method of claim 24, further comprising:
   storing temporarily in a store buffer, data to be stored to memory; and
   executing a second memory access instruction for a second encoded pointer to a second memory location, including:
      searching the store buffer based on the second encoded pointer;
      identifying a matching encoded pointer based on the search; and
      retrieving second data indexed by the matching encoded pointer from the store buffer.

\* \* \* \* \*